United States Patent
Nam et al.

(10) Patent No.: US 10,048,878 B2
(45) Date of Patent: Aug. 14, 2018

(54) NONVOLATILE MEMORY MODULE AND STORAGE SYSTEM HAVING THE SAME

(71) Applicant: SAMSUNG ELECTRONICS CO., LTD., Suwon-si, Gyeonggi-Do (KR)

(72) Inventors: Hee Hyun Nam, Seoul (KR); Youngjin Cho, Seoul (KR)

(73) Assignee: Samsung Electronics Co., Ltd., Suwon-si, Gyeonggi-do (KR)

(*) Notice: Subject to any disclaimer, the term of this patent is extended or adjusted under 35 U.S.C. 154(b) by 149 days.

(21) Appl. No.: 15/132,466

(22) Filed: Apr. 19, 2016

(65) Prior Publication Data

US 2016/0357481 A1 Dec. 8, 2016

(30) Foreign Application Priority Data

| Jun. 8, 2015 | (KR) | 10-2015-0080747 |
| Jun. 8, 2015 | (KR) | 10-2015-0080844 |
| Jul. 8, 2015 | (KR) | 10-2015-0097289 |
| Jul. 16, 2015 | (KR) | 10-2015-0101100 |

(51) Int. Cl.
G06F 3/06 (2006.01)

(52) U.S. Cl.
CPC ............ G06F 3/0619 (2013.01); G06F 3/061 (2013.01); G06F 3/0661 (2013.01); G06F 3/0688 (2013.01)

(58) Field of Classification Search
CPC ...... G06F 3/061; G06F 3/0619; G06F 3/0661; G06F 3/0688
See application file for complete search history.

(56) References Cited

U.S. PATENT DOCUMENTS

| 5,978,858 A | 11/1999 | Bonola et al. |
| 6,128,669 A | 10/2000 | Moriarty et al. |
| 6,714,553 B1 | 3/2004 | Poole et al. |
| 7,460,768 B2 | 12/2008 | Tanner |
| 7,679,133 B2 | 3/2010 | Son et al. |
| 7,710,789 B2 | 5/2010 | Yeh et al. |
| 8,553,466 B2 | 10/2013 | Han et al. |
| 8,559,235 B2 | 10/2013 | Yoon et al. |
| 8,654,587 B2 | 2/2014 | Yoon et al. |
| 8,675,000 B2 | 3/2014 | Labour |
| 8,806,116 B2 | 8/2014 | Karamcheti et al. |
| 8,832,380 B2 | 9/2014 | Ishikawa et al. |
| 8,838,882 B1 | 9/2014 | Quong |
| 8,977,833 B2 | 3/2015 | Kazul et al. |

(Continued)

FOREIGN PATENT DOCUMENTS

| JP | H08-221312 A | 8/1996 |
| JP | 2012-234363 A | 11/2012 |

(Continued)

*Primary Examiner* — Aracelis Ruiz
(74) *Attorney, Agent, or Firm* — Volentine, Whitt & Francos, PLLC

(57) ABSTRACT

The nonvolatile memory module includes at least one nonvolatile memory, and a device controller including a RAM to store data exchanged between a host and the at least one nonvolatile memory and a DIMM controller to control data exchange between the RAM and the at least one nonvolatile memory. An allocation for an access area at an access to the RAM is performed during a write transaction in which data is recorded at the RAM and is released during a read transaction of the recorded data.

20 Claims, 51 Drawing Sheets

(56) References Cited

U.S. PATENT DOCUMENTS

| | | | |
|---|---|---|---|
| 9,003,102 B2 | 4/2015 | Lassa | |
| 9,009,391 B2 | 4/2015 | Aswadhati | |
| 2002/0163834 A1* | 11/2002 | Scheuerlein | G11C 5/025 365/185.17 |
| 2004/0100900 A1 | 5/2004 | Lines et al. | |
| 2010/0011261 A1* | 1/2010 | Cagno | G06F 11/1064 714/719 |
| 2011/0010508 A1* | 1/2011 | Miyazaki | G06F 12/0246 711/148 |
| 2011/0145676 A1 | 6/2011 | Nicholson | |
| 2011/0233648 A1 | 9/2011 | Seol et al. | |
| 2013/0067147 A1 | 3/2013 | Okita | |
| 2014/0156964 A1 | 6/2014 | Choi | |
| 2014/0181424 A1 | 6/2014 | Park | |
| 2014/0258808 A1 | 9/2014 | Akiduki | |
| 2014/0317333 A1 | 10/2014 | Dorst et al. | |
| 2015/0012339 A1 | 1/2015 | Onischuk | |
| 2015/0012690 A1 | 1/2015 | Bruce et al. | |
| 2015/0106557 A1 | 4/2015 | Yu et al. | |
| 2015/0113212 A1 | 4/2015 | Hiratsuka et al. | |
| 2015/0248935 A1* | 9/2015 | Moshayedi | G06F 3/0625 711/103 |

FOREIGN PATENT DOCUMENTS

| | | |
|---|---|---|
| JP | 2013-61795 A | 4/2013 |
| KR | 10-0249164 B1 | 12/1999 |
| KR | 10-0422141 B1 | 3/2004 |
| KR | 1020150080747 | 6/2015 |
| KR | 1020150080844 | 6/2015 |

* cited by examiner

NONVOLATILE MEMORY MODULE AND STORAGE SYSTEM HAVING THE SAME

CROSS-REFERENCE TO RELATED APPLICATIONS

A claim for priority under 35 U.S.C. § 119 is made to Korean Patent Application Nos. 10-2015-0080747 filed Jun. 8, 2015, 10-2015-0080844 filed Jun. 8, 2015, 10-2015-0097289 filed Jul. 8, 2015, and 10-2015-0101100 filed Jul. 16, 2015, in the Korean Intellectual Property Office, the entire contents of which are hereby incorporated by reference.

BACKGROUND

Embodiments of the inventive concept disclosed herein relate to a semiconductor memory device, and more particularly, to a nonvolatile memory module and a storage system including the same.

Semiconductor memory devices are generally divided into volatile semiconductor memory devices and nonvolatile semiconductor memory devices. The volatile semiconductor memory device is fast during a read/write operation, but when a power supply is interrupted, data stored in the volatile semiconductor memory device disappears. On the other hand, even though a power supply is interrupted, data stored in the nonvolatile semiconductor memory device does not disappear. Therefore, the nonvolatile semiconductor memory device may store contents to be preserved regardless of whether a power supply is supplied or not.

There are being developed a variety of techniques for improving a communication speed between a host and data storage. For example, a flash memory may be installed in a memory (e.g., a DRAM or the like) slot to improve the communication speed. In this case, there is a need to secure data integrity and maintain compatibility with a conventional interface. Accordingly, a flash memory device may be needed that is capable of securing data integrity and maintaining compatibility with a conventional interface.

SUMMARY

Embodiments of the inventive concept may provide a method which makes it possible to efficiently use a Random Access Memory (RAM) included in a physical layer of a nonvolatile memory module and having a relatively small capacity.

A nonvolatile memory module according to an embodiment of the inventive concept may include at least one nonvolatile memory and a device controller. The device controller may include a RAM to store data exchanged between a host and the at least one nonvolatile memory and a dual in-line memory module (DIMM) controller to control data exchange between the RAM and the at least one nonvolatile memory. An allocation for an access area at an access to the RAM may be performed during a write transaction in which data is recorded at the RAM and may be released during a read transaction of the recorded data.

During a write operation of the nonvolatile memory module, the host may allocate an area, at which the data is to be stored, when storing the data in the RAM, and the DIMM controller may release the allocation for the area, at which the data is stored, when reading the data from the RAM.

During a read operation of the nonvolatile memory module, the DIMM controller may allocate an area, at which the data is to be stored, when storing the data in the RAM, and the host may release the allocation for the area, at which the data is stored, when reading the data from the RAM.

The DIMM controller may include an area manager configured to generate status information associated with whether the DIMM controller reads the data stored in the RAM.

The RAM may include a status area to store status information.

An overwrite operation about the allocated area may be inhibited and an overwrite operation about the released area may be allowed.

The host and the nonvolatile memory module may communicate with each other through a dual data rate (DDR) interface.

The nonvolatile memory module may be a dual in-line memory module (DIMM).

The at least one nonvolatile memory may include a three-dimensional memory array.

A storage system according to an embodiment of the inventive concept may include a host and a nonvolatile memory module. The nonvolatile memory module may include at least one nonvolatile memory, a RAM to store data exchanged between the host and the at least one nonvolatile memory, and a device controller comprising a DIMM controller to control data exchange between the RAM and the at least one nonvolatile memory. An allocation for an access area at an access to the RAM may be performed during a write transaction in which data is recorded at the RAM and may be released during a read transaction of the recorded data.

During a write operation regarding the nonvolatile memory module, the host may allocate an area, at which the data is to be stored, when storing the data in the RAM, and the DIMM controller may release the allocation for the area, at which the data is stored, when reading the data from the RAM.

The DIMM controller may include a first area manager configured to generate status information associated with whether the DIMM controller reads the data stored in the RAM.

During a read operation of the nonvolatile memory module, the DIMM controller may allocate an area, at which the data is to be stored, when storing the data in the RAM, and the host may release the allocation for the area, at which the data is stored, when reading the data from the RAM.

The host may include a second area manager configured to generate status information associated with whether the host reads the data stored in the RAM.

An overwrite operation of the allocated area may be inhibited and an overwrite operation about the released area may be allowed.

A storage system according to an embodiment of the inventive concept may include a host and a nonvolatile memory module. The nonvolatile memory module may include at least one nonvolatile memory, a RAM to store data exchanged between the host and the at least one nonvolatile memory, and a device controller comprising a DIMM controller to control data exchange between the RAM and the at least one nonvolatile memory. An allocation for an access area at an access to the RAM may be performed during a write transaction in which data is recorded at the RAM and may be released during a read transaction of the recorded data.

During a write operation of the nonvolatile memory module, the DIMM controller may include a first area manager configured to generate status information associated with whether the allocation for an area where the data is stored is released when reading the data from the RAM.

During a read operation of the nonvolatile memory module, the host may include a second area manager configured to generate status information associated with whether the allocation for an area where the data is stored is released when reading the data from the RAM.

The RAM may include a status area to store status information associated with the releasing.

An overwrite operation of the allocated area may be inhibited and an overwrite operation about the released area may be allowed.

A nonvolatile memory module according to an embodiment of the inventive concept may include at least one nonvolatile memory and a device controller including a RAM. The RAM may include a write area to store write data and a read area to store read data read from the at least one nonvolatile memory. The device controller may adjust sizes of the write area and the read area based on a modification command received from a host.

The host and the nonvolatile memory module may communicate with each other through a dual data rate (DDR) interface.

The nonvolatile memory module may be a dual in-line memory module (DIMM).

The device controller may include a physical layer, which includes the RAM and interfaces with the host, and a DIMM controller which reads the write data stored in the RAM or transfers the read data read from the nonvolatile memory to the RAM.

The RAM may further include a command area to store a storage command and the modification command received from the host and a status area to store status information associated with whether an execution of the storage command is completed.

Each of the command area, the write area, the read area, and the status area may be implemented with a circular buffer.

The RAM may be a dual-port SRAM.

The modification command may be generated based on a task schedule of the host.

The RAM may be a dual-port SRAM.

A nonvolatile memory module according to an embodiment of the inventive concept may include at least one nonvolatile memory and a device controller to control the at least one nonvolatile memory. The device controller may include a physical layer and a DIMM controller. The physical layer may include a RAM to store a storage command, write data, read data, and status information about whether an execution of the storage command is completed. The DIMM controller may access the RAM to process the storage command, the write data, the read data, and the status information. The RAM may transfer an acknowledge signal to the DIMM controller when the storage command, the write data, the read data, or the storage is stored. The DIMM controller may access the RAM with reference to a bitmap generated based on the acknowledge signal.

A host and the nonvolatile memory module may communicate with each other through a dual data rate (DDR) interface.

The nonvolatile memory module may be a dual in-line memory module (DIMM).

The RAM may include a command area to store the storage command, a write area to store the write data, a read area to store the read data, and a status area to store the status information.

The DIMM controller may first access one, of which a utilization rate is greatest, from among the command area, the write area, the read area, and the status area.

When a utilization rate of the read area is smallest, the DIMM controller may first access the read area.

A nonvolatile memory module according to an embodiment of the inventive concept may include at least one nonvolatile memory and a device controller to control the at least one nonvolatile memory. The device controller may include a physical layer and a DIMM controller. The physical layer may include a RAM including a command area to store a storage command, a write area to store write data, a read area to store read data, and a status area to store status information about whether an execution of the storage command is completed. The DIMM controller may access the RAM to process the storage command, the write data, the read data, and the status information. The device controller may adjust sizes of the write area and the read area based on a modification command received from the host.

The RAM may transfer an acknowledge signal to the DIMM controller if the storage command, the write data, the read data, or the status information is stored, and the DIMM controller may access the RAM with reference to a bitmap generated based on the acknowledge signal.

The DIMM controller may first access one, of which a utilization rate is greatest, from among the command area, the write area, the read area, and the status area, or may first access the read area if the utilization rate of the read area is smallest.

A host and the nonvolatile memory module may communicate with each other through a dual data rate (DDR) interface.

The nonvolatile memory module may be a dual in-line memory module (DIMM).

A nonvolatile memory module according to an embodiment of the inventive concept may include at least one nonvolatile memory and a device controller. The device controller may include an interface buffer which stores control information for interfacing with a host and the nonvolatile memory or stores data to be written at the nonvolatile memory or data read from the nonvolatile memory. The interface buffer may be managed with a circular buffer of a FIFO manner, a head pointer of the interface buffer may be tracked and managed by a data reading side, and a tail pointer of the interface buffer may be tracked and managed by a data push side.

A memory area of the interface buffer may include a command area, a write area, a read area, and a status area, and the head pointer and the tail pointer may be managed by a unit of the memory areas.

The device controller may include a physical layer including the interface buffer and a DIMM controller to transfer the control information or the data to the at least one nonvolatile memory device.

Tail pointers of the command and write areas may be tracked and managed at the host, and head pointers of the command and write areas may be tracked and managed at the DIMM controller.

Position information of a tail pointer of the write area or the command area and position information of a head pointer of the read area or the status area may be transferred to the host through the status area.

Position information of a head pointer of the write area or the command area and position information of a tail pointer of the read area or the status area may be transferred to the DIMM controller through the status area or a register.

Tail pointers of the read and status areas may be tracked and managed at the DIMM controller, and head pointers of the read and status areas may be tracked and managed at the host.

Head pointers of the read and status areas may be transferred to the host through the status area.

The host and the device controller may communicate with each other using at least one of a double data rate (DDR), a DDR2, a DDR3, a DDR4, a low power DDR (LPDDR), a universal serial bus (USB), a multimedia card (MMC), an embedded MMC, a peripheral component interconnection (PCI), a PCI-express (PCI-E), an advanced technology attachment (ATA), a serial-ATA, a parallel-ATA, a small computer small interface (SCSI), an enhanced small disk interface (ESDI), an integrated drive electronics (IDE), a firewire, a universal flash storage (UFS), or nonvolatile memory express (NVMe).

The nonvolatile memory device may include a three-dimensional memory array.

A user device according to an embodiment of the inventive concept may include a nonvolatile memory module and a processor. The nonvolatile memory module may include at least one nonvolatile memory, an interface buffer, and a DIMM controller. The interface buffer may be connected with an external device through a host interface. The DIMM controller may access the at least one nonvolatile memory with reference to a command and an address recorded at the interface buffer. The processor may write the command for accessing the nonvolatile memory, an address, and data at the interface buffer through the host interface. The interface buffer may include a first area which the processor pushes and the DIMM controller pops and a second area which the DIMM controller pushes and the processor pops. A tail pointer of the first area and a head pointer of the second area may be tracked and managed at the processor.

A head pointer of the first area and a tail pointer of the second area may be tracked and managed by the DIMM controller.

The first area may include a command area at which the processor writes the command and the address and a write area at which the processor writes data.

The second area may include a read area from which the processor reads read data written by the DIMM controller and a status area which the processor accesses to detect a status of the nonvolatile memory module.

A tail pointer of the first area or a head pointer of the second area may be transferred to the host through the status area.

An operating method of a nonvolatile memory module which comprises a plurality of nonvolatile memory devices and a device controller to control the nonvolatile memory devices may include determining a validity of data stored in a RAM of the device controller when a sudden power-off is detected, and flushing data stored in the RAM into at least one of the nonvolatile memory devices selectively based on the determination result.

Determining the validity of the data may include comparing a size of the data and a reference size, and determining data stored in the RAM as being invalid when the size of the data is smaller than the reference size and as being valid when the size of the data is greater than or equal to the reference size.

Determining the validity of the data may include determining whether a phase bit corresponding to the data is stored, and determining the data as being valid when the corresponding phase bit is stored and as being invalid when the corresponding phase bit is not stored.

Determining the validity of the data may include detecting and correcting an error of the data, and determining the data as being valid when the error of the data is corrected and as being invalid when the error of the data is not corrected.

The method may further include receiving a RAM command, a RAM address, and a clock from an external device, and storing a storage command, a storage address, write data, or status information in the RAM based on the received RAM command, RAM address, and clock.

The data may include at least one of the storage command, the storage address, the write data, or the status information received from the external device.

The nonvolatile memory module may communicate with the external device based on a DDR interface.

The method may further include receiving a save signal from the external device and detecting the sudden power-off in response to the save signal.

A nonvolatile memory module according to an embodiment of the inventive concept may include a plurality of nonvolatile memory devices, and a device controller to control the nonvolatile memory devices. The device controller may include a RAM, may determine a validity of data stored in the RAM when a power to the nonvolatile memory module is interrupted, and may selectively flush data stored in the RAM into at least one of the nonvolatile memory devices based on the determination result.

The device controller may receive a RAM command, a RAM address, and a clock from an external device and may store the data in the RAM in response to the received RAM address, RAM command, and clock.

The data may include at least one of a storage command, a storage address, write data, read data, or status information.

The device controller may control the nonvolatile memory devices based on the data.

The device controller and the external device may communicate with each other based on a DDR interface.

The device controller may determine a validity of the data based on a size of the data stored in the RAM.

The device controller may determine a validity of the data based on a phase bit corresponding to the data stored in the RAM.

The phase bit may be written at the RAM by an external device communicating with the device controller.

The device controller may further include an error correction code (ECC) engine to detect and correct an error of data stored in the RAM, and the device controller may determine a validity of the data stored in the RAM based on an error correction result of the ECC engine.

The nonvolatile memory module may receive a save signal from the external device and may perform a flush operation in response to the save signal.

After selectively flushing the data stored in the RAM, the device controller may flush all of the data stored in the RAM into at least one of the nonvolatile memory devices.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
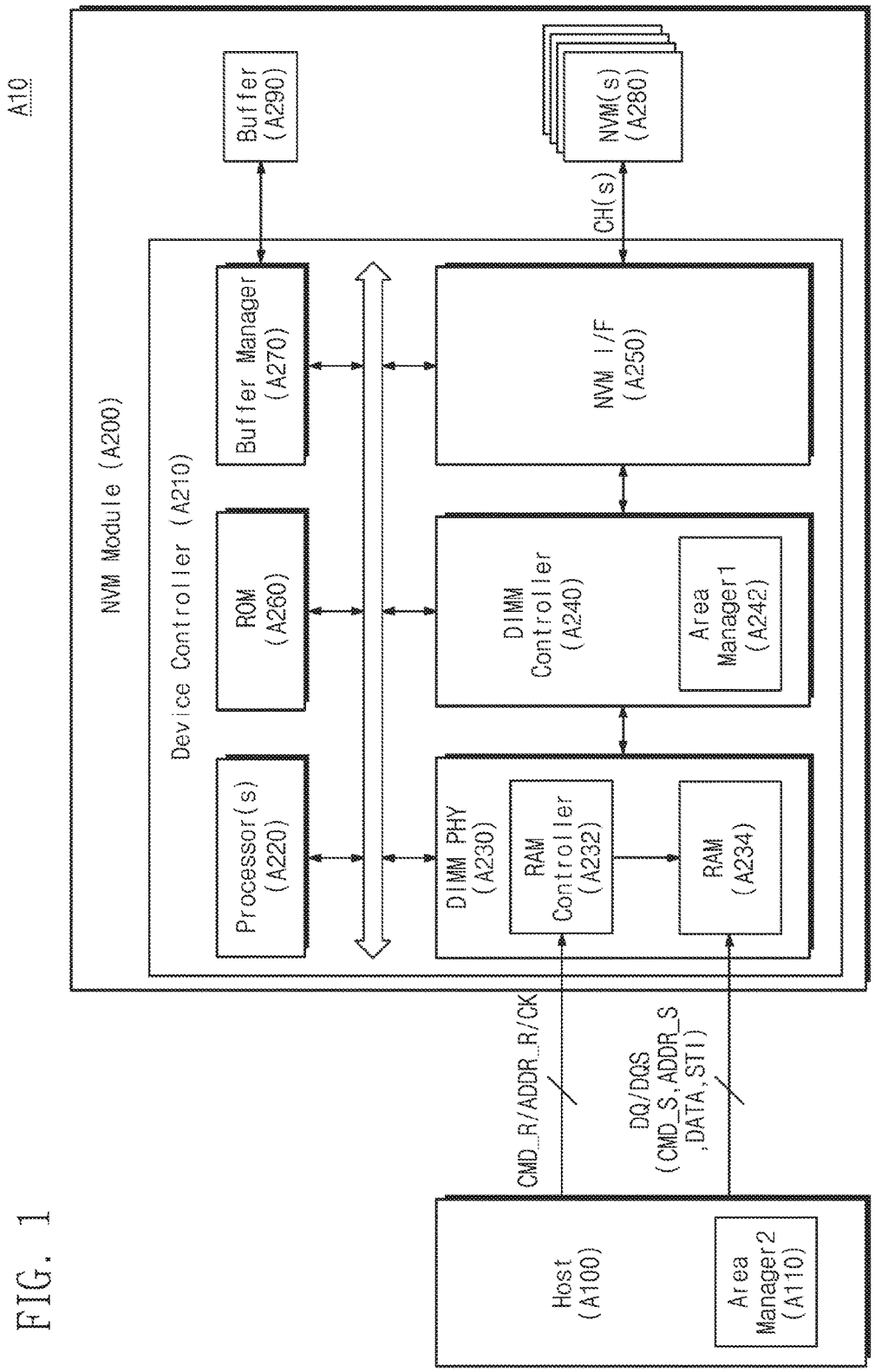
FIG. 1 is a block diagram illustrating a computing system according to an embodiment of the inventive concept.

It is to be understood that both the foregoing general description and the following detailed description are provided as examples, for illustration and not for limiting the scope of the invention. Reference will now be made in detail to the present preferred embodiments of the invention, examples of which are illustrated in the accompanying drawings. Wherever possible, the same reference numbers are used in the drawings and the description to refer to the same or like parts.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. As used herein, the term "and/or," includes any and all combinations of one or more of the associated listed items.

Even though the terms "first", "second", etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features.

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

As is traditional in the field of the inventive concept, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the inventive concept. Likewise, the blocks of the embodiments may be physically combined into more complex blocks without departing from the scope of the inventive concept.

Below, embodiments of the inventive concept will be described with reference to accompanying drawings in order to describe the embodiments of the inventive concept in detail to the extent that one skilled in the art can easily implement the scope and spirit of the inventive concept.

A. Allocation and De-allocation of RAM Area

FIG. 1 is a block diagram illustrating a storage system A10 according to an embodiment of the inventive concept. A storage system A10 may include a host A100 and a nonvolatile memory module A200.

The host A100 may perform a read operation or a write operation with respect to the nonvolatile memory module A200. The host A100 may access a physical layer A230 of a device controller A210 to write or read data at or from the nonvolatile memory module A200. For example, the host A100 may access a RAM A234 of the physical layer A230 to record a command and an address which are used to access the a nonvolatile memory A280.

The storage system A10 according to an embodiment of the inventive concept may include a second area manager A110 and a first area manager A242. For example, the second area manager A110 may be included in the host A100, and the first area manager A242 may be included in the DIMM controller A240.

The second area manager A110 may manage an area in which data to be read by the host A100 from the RAM A234 is stored. In more detail, when a DIMM controller A240 records data (e.g., read data and the like) at the RAM A234, the DIMM controller A240 may allocate an area of the RAM A234 in which data is to be stored. The host A100 may release area allocation when reading data stored in the RAM A234. As the allocated area is returned, the de-allocated area may be capable of being overwritten. The second area manager A110 may generate status information indicating that data stored in a de-allocated area is processed and may update status information at the RAM A234. The DIMM controller A240 may execute a next write operation about the RAM A234 with reference to the updated status information.

The first area manager A242 may manage an area in which data to be read by the DIMM controller A240 from the RAM A234 is stored. In more detail, when the host A100 records data (e.g., a storage command, a storage address, read data, and the like) at the RAM A234, the host A100 may allocate an area of the RAM A234 in which data is to be stored. The DIMM controller A240 may release area allocation when reading data stored in the RAM A234. As the allocated area is returned, the de-allocated area may be capable of being overwritten. The first area manager A242 may generate status information indicating that data stored in a de-allocated area is processed and may update status information at the RAM A234. The host A100 may execute a next write operation about the RAM A234 with reference to the updated status information.

According to an embodiment of the inventive concept, an area in which data is to be stored may be allocated even as the host A100 or the DIMM controller A240 transfers data to the RAM A234 included in the physical area A230 of the nonvolatile memory module A200. When processing of data stored in the allocated area is completed, the host A100 or the DIMM controller A240 may release area allocation. That is, an area may be allocated even as data is stored in the RAM A234, and area allocation may be released even as data is read from the RAM A234. This may make it possible to efficiently use the RAM A234 of a relatively small capacity.

The nonvolatile memory module A200 may include a device controller A210, a plurality of nonvolatile memories A280, and a buffer A290. The device controller A210 may include at least one processor A220, a physical layer (i.e., DIMM PHY) A230, a DIMM controller A240, a nonvolatile memory interface A250, a ROM A260, and a buffer manager A270.

The processor A220 may perform an overall operation of the device controller A210. For example, the processor A220 may execute firmware which is executed in the device controller A210 and performs a variety of functions such as data exchange between the host A100 and the nonvolatile memory module A200, error correction, scrambling, and the like. For example, the processor A220 may be a multi-core in which each core performs at least one of the above-described operations.

The DIMM PHY A230 may include a RAM controller A232 which receives a RAM command CMD_R, a RAM address ADDR_R, and a clock CK from the host A100. The DIMM PHY A230 may include the RAM A234 which exchanges data with the host A100 using data DQ and a data strobe signal DQS. At this time, the data DQ may be stored in a space of the RAM A234 which is selected according to the RAM address ADDR_R from the host A100. Data DQ may include at least one or more of a storage command CMD_S for accessing the nonvolatile memory A280, a storage address ADDR_S, data, and status information STI. The status information STI may include information associated with the following status of data stored in the RAM A234: whether processing is completed, whether an error is detected during processing, and the like.

The RAM A234 may be divided into an area to store a storage command CMD_S and a storage address ADDR_S, an area to store data, and an area to store status information STI. For example, the RAM A234 may be implemented with a ring buffer, a serial buffer, or the like.

The DIMM controller A240 may access the RAM A234 to read data stored in the RAM A234. For example, the DIMM controller A240 may read write data to be stored in the nonvolatile memory A280 and may transfer the read data to the nonvolatile memory A280. The DIMM controller A240 may provide data read from the nonvolatile memory A280 to the RAM A234.

According to an embodiment of the inventive concept, the DIMM controller A240 may include the first area manager A242 which manages an area of the RAM A234 in which data (e.g., a storage command, a storage address, write data, and the like) received from the host A100 is stored. For example, when write data received from the host A100 is recorded at the RAM A234, the host A100 may allocate a specific area of the RAM A234 in which the write data is to be stored. The DIMM controller A240 may release area allocation when reading data stored in the RAM A234. As the allocated area is returned, the de-allocated area may be capable of being overwritten. The first area manager A242 may generate status information STI associated with the de-allocated area and may transfer the status information STI to the RAM A234. The host A100 may execute a next write operation with reference to the updated status information STI.

The nonvolatile memory interface A250 may provide an interface between the device controller A210 and the nonvolatile memory A280. For example, the device controller A210 may exchange data with the nonvolatile memory A280 through the nonvolatile memory interface A250.

Various operations or firmware which is required to operate the device controller A210 may be stored in the ROM A260. For example, the ROM A260 may store firmware for correcting an error detected by an error detector. The ROM A260 may store code data for interfacing with the host A100.

The buffer manager A270 may provide an interface between the device controller A210 and the buffer A290.

In an embodiment of the inventive concept, a three dimensional (3D) memory array is provided. The 3D memory array is monolithically formed in one or more physical levels of arrays of memory cells having an active area disposed above a silicon substrate and circuitry associated with the operation of those memory cells, whether such associated circuitry is above or within such substrate. The term "monolithic" means that layers of each level of the array are directly deposited on the layers of each underlying level of the array.

In an embodiment of the inventive concept, the 3D memory array includes vertical NAND strings that are vertically oriented such that at least one memory cell is located over another memory cell. The at least one memory cell may comprise a charge trap layer. Each vertical NAND string may include at least one select transistor located over memory cells, the at least one select transistor having the same structure with the memory cells and being formed monolithically together with the memory cells.

The following patent documents, which are hereby incorporated by reference, describe suitable configurations for three-dimensional memory arrays, in which the three-dimensional memory array is configured as a plurality of levels, with word lines and/or bit lines shared between levels: U.S. Pat. Nos. 7,679,133; 8,553,466; 8,654,587; 8,559,235; and US Pat. Pub. No. 2011/0233648. However, the scope and spirit of the inventive concept may not be limited thereto. For example, the nonvolatile memory A280 may include a planar memory array.

The nonvolatile memory A280 may be connected to the nonvolatile memory interface A250 through the channels CH(s). The nonvolatile memory A280 may be implemented with a variety of nonvolatile memory devices, such as, but not limited to, an electrically erasable and programmable ROM (EEPROM), a NAND flash memory, a NOR flash memory, a phase-change RAM (PRAM), a resistive RAM (ReRAM), a ferroelectric RAM (FRAM), a spin-torque magnetic RAM (STT-MRAM), and the like.

The buffer memory A290 may be used as a working memory, a buffer memory, or a cache memory of the device controller A210. For example, the buffer memory A290 may include various random access memories such as a dynamic random access memory (DRAM), a static random access memory (SRAM), a PRAM, and the like.

Figure 2:
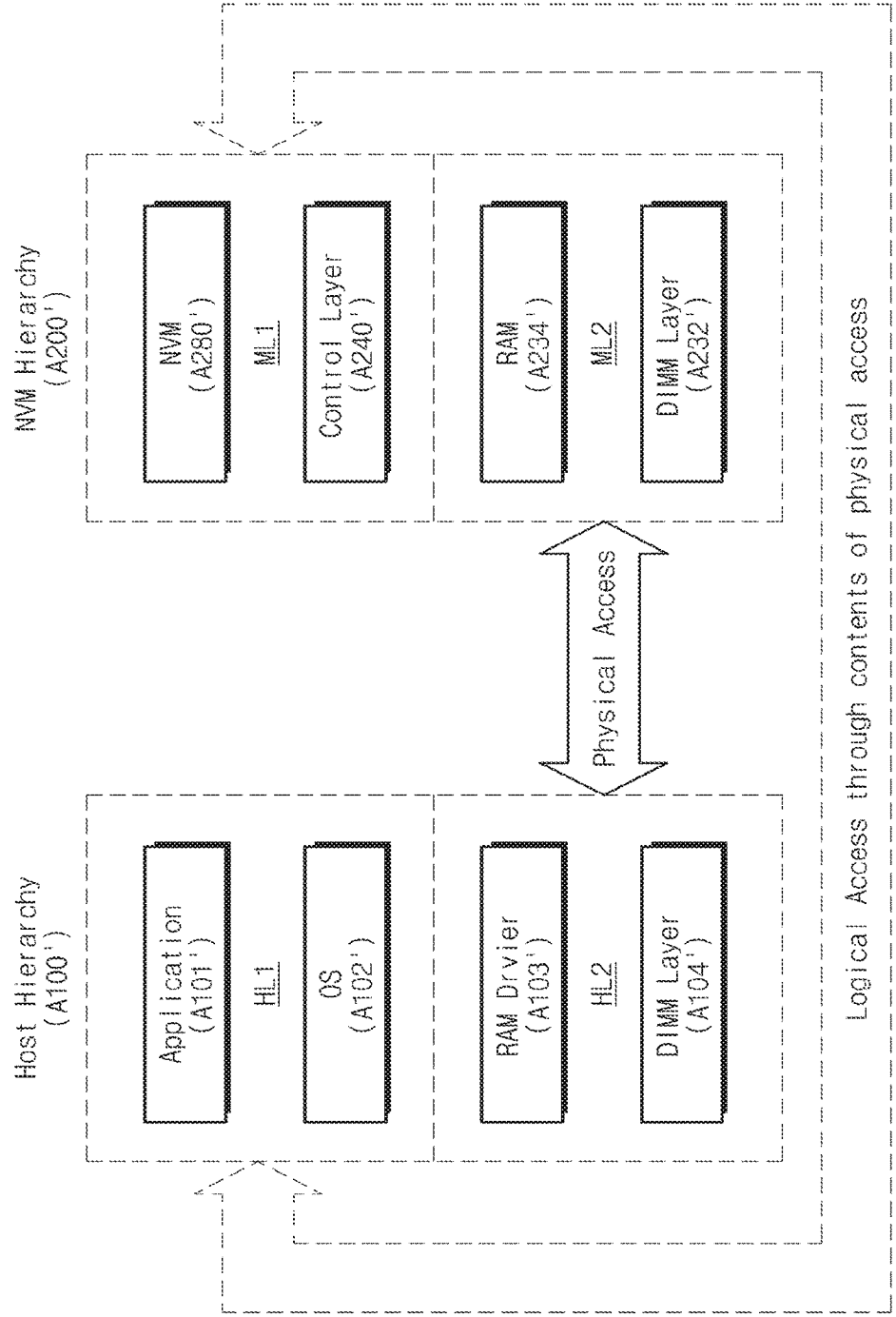
FIG. 2 is a diagram illustrating a nonvolatile memory module of FIG. 1 and software layers according to an embodiment of the inventive concept.

FIG. 2 is a diagram illustrating a nonvolatile memory module of FIG. 1 and software layers according to an embodiment of the inventive concept. Referring to FIG. 1, host layer software A100' may be driven on a host. Software or firmware A200' of a nonvolatile memory layer may be driven on the nonvolatile memory module A200.

The host layer A100' may include a variety of software layers. An application program A101' and an operating system A102' may be included in a host upper layer HL1. The application A101' may be driven as a basic service and may be software of an upper layer driven by a user. The operating system A102' may perform an overall control operation of the storage system A10 such as program execution, file access, driving of an application program, control of the nonvolatile memory module A200, and the like.

A RAM driver A103' or a DIMM layer A104' may be a host lower layer HL2 for an access to the nonvolatile memory module A200. The RAM driver A103' or the DIMM layer driver A104' may be substantially included in a kernel of an operating system. The RAM driver A103' may perform a control operation for an access to a RAM A234' of the nonvolatile memory module A200 with respect to an access request from the host upper layer HL1. For example, the RAM driver A103' may be a control module for controlling the RAM A234' of the nonvolatile memory module A200 at an operating system (A102') level. The RAM driver A103' may be called if the application A101' or the operating system A102' requests an access to the RAM A234'. In addition, the DIMM layer driver A104' may be called together with the RAM driver A103' to support an access to the RAM A234' at an actual physical layer level.

The nonvolatile memory layer A200' may include a memory upper layer ML1 and a memory lower layer ML2. On memory upper layer ML1, an access to the nonvolatile memory A280' may be controlled according to an upper command CMD_R or an upper address ADDR_R written at the RAM A234'. On the memory upper layer ML1, an access to the nonvolatile memory A280' and a memory management operation may be performed by the controller layer A240'. For example, a control about the nonvolatile memory A280' such as garbage collection, wear leveling, stream control, and the like may be performed by the controller layer A240'. In contrast, interfacing between the RAM A234' and the host A100 may be performed on the memory lower layer ML2. That is, the memory lower layer ML2 may perform an operation for writing or reading data at or from the RAM A234' using a RAM command CMD_R or a RAM address ADDR_R provided through the RAM controller A232. The memory lower layer ML2 may access the RAM A234' based on a request of the memory upper layer ML1.

Firmware or software with the above-described layer structure (hierarchy) may allow the host to access the nonvolatile memory A280. That is, an access to the nonvolatile memory A280 included in the nonvolatile memory module of a DIMM form may be performed by decoding a command CMD_R and an address ADDR_R provided through the RAM A234.

Figure 3:
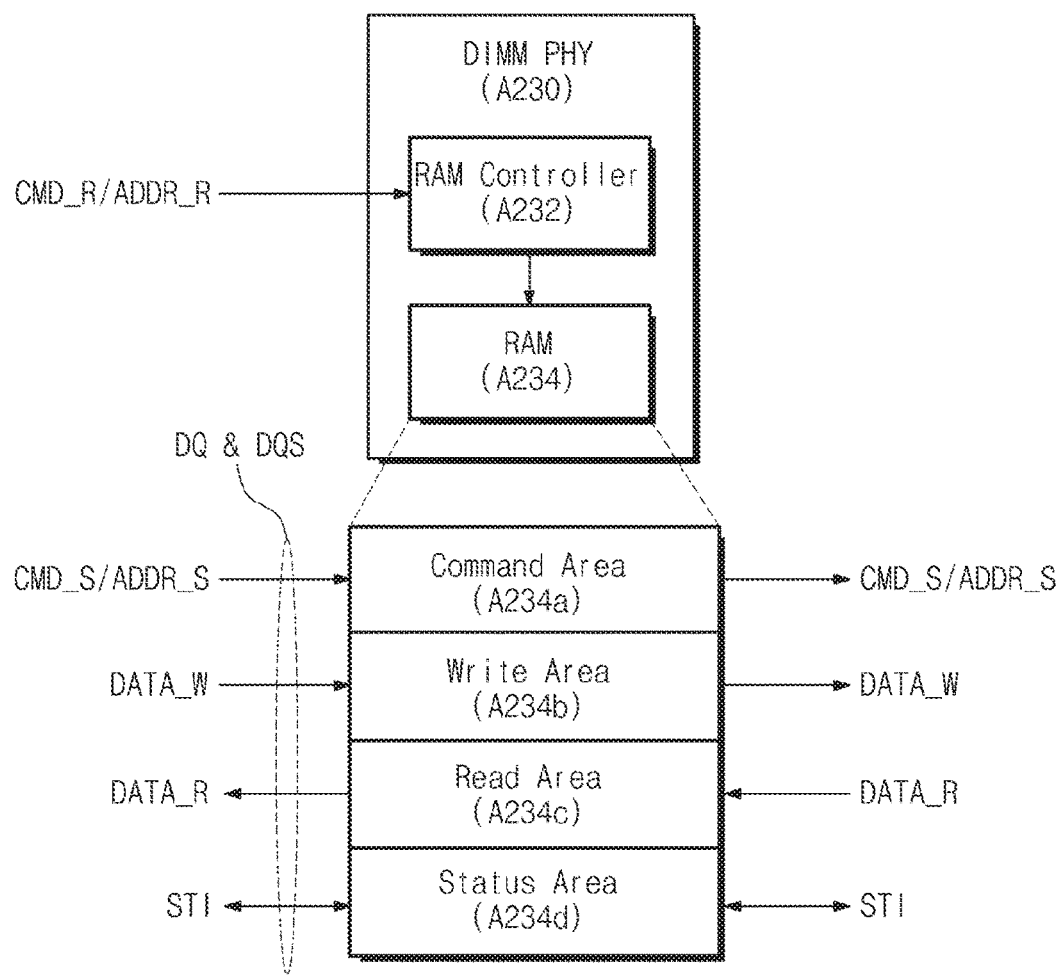
FIG. 3 is a block diagram illustrating a structure of a RAM illustrated in FIG. 2.

FIG. 3 is a block diagram illustrating a structure of a RAM illustrated in FIG. 2. Referring to FIG. 3, the RAM A234 may include a command area A234a, a write area A234b, a read area A234c, and a status area A234d. Data received from the host A100 or the DIMM controller A240 may be stored in one of the command area A234a, the write area A234b, the read area A234c, and the status area A234d, based on a RAM command CMD_R, a RAM address ADDR_R, and a clock CK received from the host A100. For example, the RAM A234 may be a dual port SRAM which is simultaneously accessed by the host A100 and the DIMM controller A240.

The command area A234a may store a storage command CMD_S and a storage address ADDR_S provided from the host A100 under control of the RAM controller A232. The DIMM controller A240 may read the storage command CMD_S and the storage address ADDR_S stored in the command area A234a.

The write area A234b may store received write data DATA_W under control of the RAM controller A232. The DIMM controller A240 may read write data DATA_W stored in the write area A234b of the RAM A234.

The read area A234c may store received read data DATA_R under control of the RAM controller A240. The DIMM controller A240 may read read data DATA R stored in the read area A234c of the RAM A234.

The status area A234d may store status information STI associated with whether data stored in the RAM A234 is processed. Here, that data stored in a RAM is processed may mean that a storage command MDS_S and a storage address ADDR_S stored in the command area A234a, write data DATA_W stored in the write area A234b, or read data DATA_R stored in the read area A234c is read by the host A100 or the DIMM controller A240. The status information STI stored in the status area A234d may be transmitted to the host A100 or to the DIMM controller A240. For example, the host A100 may provide next write data or storage command CMD_S to the RAM A234 with reference to the status information STI. Alternatively, the DIMM controller A240 may provide next read to the RAM A234 with reference to the status information STI.

Figure 4:
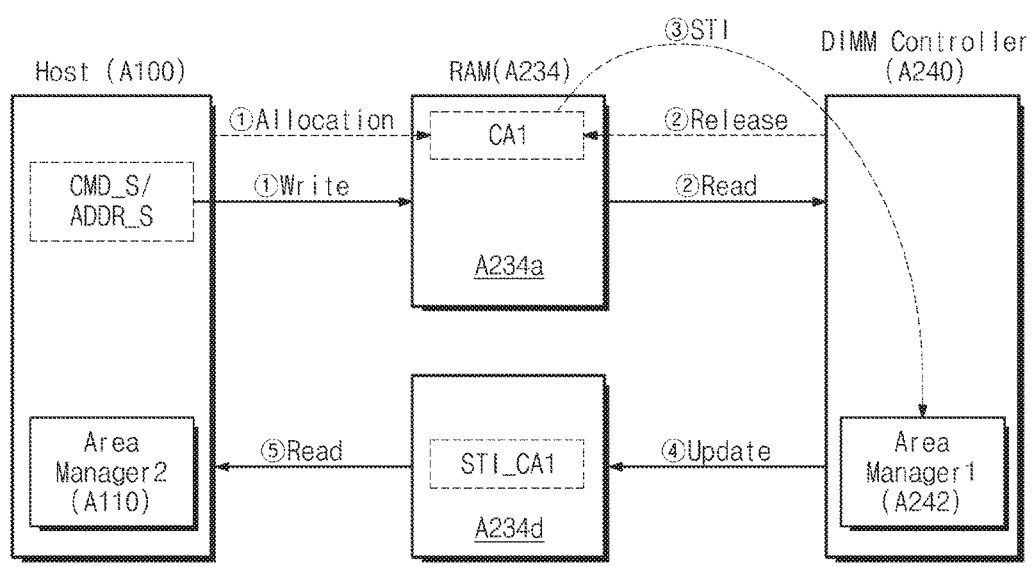
FIG. 4 is a diagram illustrating an operating method of a storage system according to an embodiment of the inventive concept.

FIG. 4 is a block diagram illustrating an operating method of a storage system A10 according to an embodiment of the inventive concept. Below, there will be described area allocation and release of the area allocation for a storage command CMD_S and a storage address ADDR_S stored in the RAM A234 and an operation to update status information STI.

To perform a specific operation about the nonvolatile memory module A200 (referring to FIG. 2), the host A100 may record a storage command CMD_S and a storage address ADDR_S at the RAM A234 (①). At this time, the host A100 may allocate a specific area CA1 of the command area A234a to store the storage command CMD_S and the storage address ADDR_S (①). That is, data recording and area allocation for the command area A234a may occur at the same timing. The area CA1 allocated by the host A100 may be an area only for the storage command CMD_S and the storage address ADDR_S and may not be overwritten by other data. As will be described later, overwriting may be possible after the allocated area CA1 is released according to update of the status information STI.

The DIMM controller A240 may access the RAM A234 to read data stored in the RAM A234 (②). The DIMM controller A234 may release the allocated area CA1 in which data is stored, as soon as the data is read. As area allocation is released by the DIMM controller A240, the area CA1 in which data is stored may be capable of being overwritten (②). That is, data recording and area allocation for the command area A234a may occur at the same timing.

The first area manager A242 may generate status information associated with an area de-allocated by the DIMM controller A240 (③). For example, status information generated by the first area manager A242 may include an identification mark (e.g., a flag or the like) indicating that overwriting is possible as the area CA1 in which data is stored is de-allocated.

The first area manager A242 may update the status information STI (④). For example, the status information STI may be stored in the status area A234d of the RAM A234. According to an embodiment of the inventive concept, status information STI_CA1 about the de-allocated area CA1 may be stored in the status area A234d.

The host A100 may access the status area A234d of the RAM A234 to read the status information STI_CA1 (⑤). For example, to access the status area A234d, the host A100 may access the RAM A123 by polling the RAM A234 periodically or by using an interrupt manner.

The above-described operating method may make it possible to efficiently utilize the RAM A234 of a relatively small capacity. That is, an area of the RAM A234 in which data is to be stored may not be allocated in advance, but an area may be allocated just at the same time as a subject (i.e., the host A100 or the DIMM controller A240) to store data stores data in the RAM A234. As soon as data stored in the RAM A234 is read, the subject (i.e., the DIMM controller A240 or the host A100) to read data may release area allocation, thereby making it possible to utilize an available area of the RAM A234 more flexibly.

Figure 5:
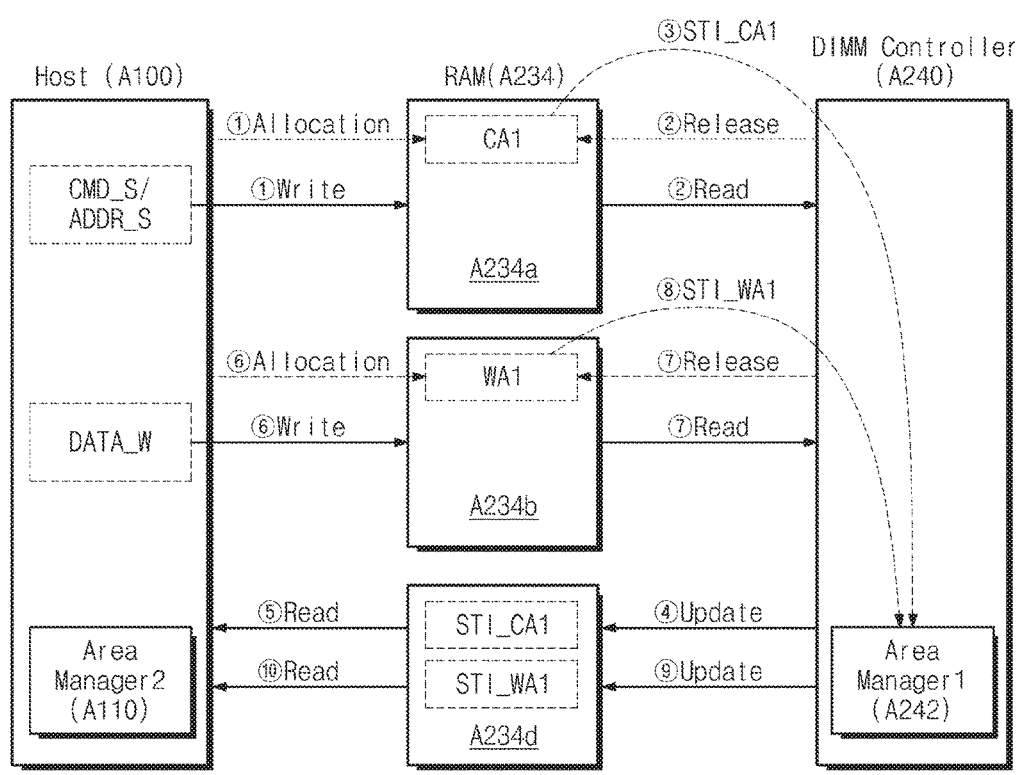
FIG. 5 is a diagram illustrating an operating method of a storage system according to another embodiment of the inventive concept.

FIG. 5 is a block diagram illustrating an operating method of a storage system A10 according to another embodiment of the inventive concept. Below, there will be described data migration according to a write operation, area allocation and release of the area allocation for a specific area of the RAM A234, and an operation to update status information STI.

First of all, a storage command CMD_S and a storage address ADDR_S associated with a write operation may be transferred to the RAM A234 from the host A100. At this time, the host A100 may allocate a specific area CA1 of the command area A234a to store the storage command CMD_S and the storage address ADDR_S (①). That is, data recording and area allocation for the command area A234a may occur at the same timing. The area CA1 allocated by the host A100 may be an area only for the storage command CMD_S and the storage address ADDR_S and may not be overwritten by other data.

The DIMM controller A240 may access the RAM A234 and may read the storage command CMD_S and the storage address ADDR_S (②). The DIMM controller A234 may release allocation for the specific area CA1, in which the storage command CMD_S and the storage address ADDR_S are stored, as soon as a read operation is performed (②). As area allocation is released by the DIMM controller A240, the area CA1 in which the storage command CMD_S and the storage address ADDR_S are stored may be capable of being overwritten. That is, data reading about the command area A234a and releasing of area allocation may occur at the same timing.

The first area manager A242 may generate status information STI_CA1 associated with an area de-allocated by the DIMM controller A240 (③). For example, status information generated by the first area manager A242 may include an identification mark (e.g., a flag or the like) indicating that overwriting is possible as the area CA1 in which data is stored is de-allocated. The first area manager A242 may update the status information STI_CA1 (④). For example, the status information STI_CA1 may be stored in the status area A234d of the RAM A234.

The host A100 may access the status area A234d of the RAM A234 to read the status information STI_CA1 (⑤). For example, to access the status area A234d, the host A100 may access the RAM A234 by polling the RAM A234 periodically or by using an interrupt manner.

Write data may be transferred to the RAM A234 from the host A100 based on a storage command CMD_S associated with a write operation (⑥). At this time, the host A100 may allocate a specific area WA1 of the write area A234b to store the write data DATA_W (⑥). That is, data recording about the command area A234b and area allocation may occur at the same timing. The area WA1 allocated by the host A100 may be an area only for the write data DATA_W and may not be overwritten by other data.

The DIMM controller A240 may access the RAM A234 to read write data DATA_W stored in the RAM A234 (⑦). The DIMM controller A234 may release the allocated area WA1 in which data is stored, as soon as the data is read (⑦). As area allocation is released by the DIMM controller A240, the area WA1 in which the write data DATA_W is stored may be capable of being overwritten. That is, data reading about the write area A234b and releasing of area allocation may occur at the same timing.

The first area manager A242 may generate status information STI_WA1 associated with an area de-allocated by the DIMM controller A240 (⑧). For example, status information generated by the first area manager A242 may include an identification mark (e.g., a flag or the like) indicating that overwriting is possible as the area WA1 in which data is stored is de-allocated. The first area manager A242 may update the status information STI_WA1 (⑨). For example, the status information STI_WA1 may be stored in the status area A234d of the RAM A234.

The host A100 may access the status area A234d of the RAM A234 to read the status information STI_WA1 (⑩). For example, to access the status area A234d, the host A100 may access the RAM A123 by polling the RAM A234 periodically or by using an interrupt manner.

An embodiment of the inventive concept is exemplified as write data DATA_W is transferred to the write area A234b of the RAM A234 after the status information STI_CA1 about the area CA1 is updated and the updated status information STI_CA1 is transferred to the host A100. However, the scope and spirit of the inventive concept may not be limited thereto. For example, write data DATA_W may be transmitted to the write area A234b even before the status information STI_CA1 is updated. Of course, in this case, the write area A234b should have a memory space sufficient to receive the write data DATA_W from the host A100.

Figure 6:
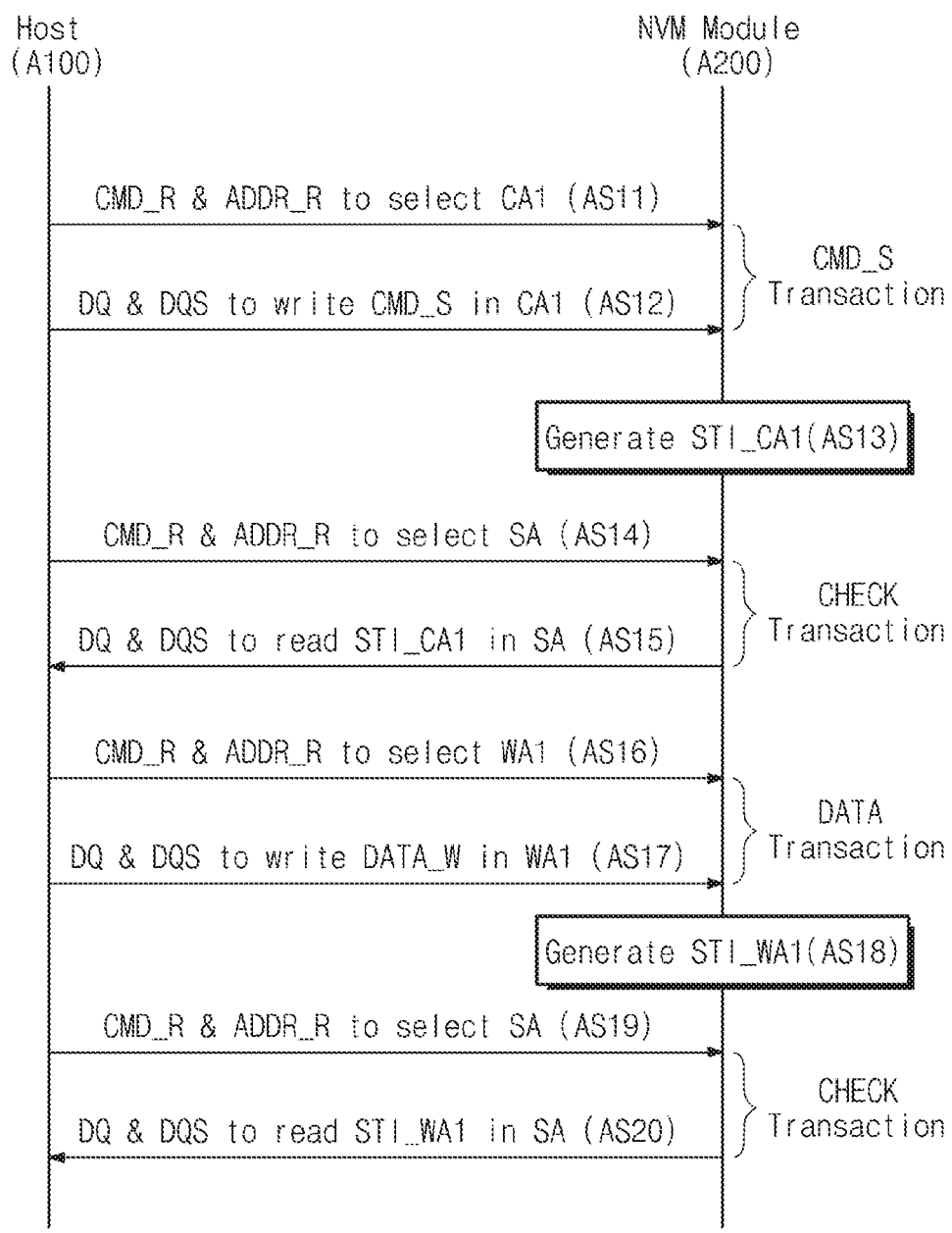
FIG. 6 is a diagram illustrating a write operation of a nonvolatile memory module according to an embodiment of the inventive concept.

FIG. 6 is a diagram illustrating a write operation of a nonvolatile memory module A200 according to an embodiment of the inventive concept. To help understand the inventive concept, a description will be given with reference to FIGS. 3 and 5.

In step AS11, the host A100 may provide the RAM controller A232 with a RAM command CMD_R for writing of the command area A234a of the RAM A234 and a RAM address ADDR_R for selecting the command area A234a of the RAM A234.

In step AS12, the host A100 may provide the nonvolatile memory module A200 with a data signal DQ and a data strobe signal DQS for writing a storage command CMD_S at the selected command area A234a. For example, the storage command CMD_S may be a command for a write operation about the nonvolatile memory A280, and the storage address ADDR_S may be an address of the nonvolatile memory A280 where the write data DATA_W is to be stored.

The host A100 may allocate an area CA1 where a data signal DQ and a data strobe signal DQS are to be stored, together with a transfer of the data signal DQ and the data strobe signal DQS. As allocation is made by the host A100, the area CA1 may become an overwrite-unavailable state. For example, steps AS11 and AS12 may be a transaction about the storage command CMD_S.

In step AS13, the DIMM controller A240 may read the storage command CMD_S and the storage address ADDR_S stored in the command area A234a and may generate status information STI_CA1. For example, the first area manager A242 included in the DIMM controller A240 may generate the status information STI_CA1 indicating that the area CA1 where the storage command CMD_S and the storage address ADDR_S are stored is de-allocated.

In step AS14, the host A100 may provide the nonvolatile memory module A200 with a RAM address ADDR_R and a RAM command CMD_R, for selecting the status area A234d of the RAM A234.

In step AS15, the host A100 may read the status information STI, which is written in the status area A234d, through the data signal DQ and the data strobe signal DQS. For example, the data signal DQ and the data strobe signal DQS may include the status information STI_CA1. The host A100 may recognize that the area CA1 is capable of being overwritten, through the status information STI_CA1. For example, the host A100 may overwrite a next storage command at the area CA1.

In step AS16, the host A100 may provide the RAM controller A232 with a RAM command CMD_R for writing of the command area A234a of the RAM A234 and a RAM address ADDR_R for selecting the write area A234b of the RAM A234.

In step AS17, the host A100 may provide the nonvolatile memory module A200 with a data signal DQ and a data strobe signal DQS for storing write data DATA_W at the selected write area A234b. The host A100 may allocate an area WA1 where a data signal DQ and a data strobe signal DQS are to be stored, together with a transfer of the data signal DQ and the data strobe signal DQS. As allocation is made by the host A100, the area WA1 may become an overwrite-unavailable state. For example, steps AS16 and AS17 may be a transaction about the write data DATA_W.

In step AS18, the DIMM controller A240 may read the write data DATA_W stored in the write area A234b and may generate status information STI_WA1. For example, the first area manager A242 included in the DIMM controller A240 may generate the status information STI_WA1 indicating that the area WA1 where the write data DATA_W is stored is de-allocated.

In step AS19, the host A100 may provide the nonvolatile memory module A200 with a RAM address ADDR_R and a RAM command CMD_R, for selecting the status area A234d of the RAM A234.

In step AS20, the host A100 may read the status information STI, which is written in the status area A234d, through the data signal DQ and the data strobe signal DQS. For example, the data signal DQ and the data strobe signal DQS may include the status information STI_WA1. The host A100 may recognize that the area WA1 is capable of being overwritten, through the status information STI_WA1. For example, the host A100 may overwrite next write data at the area WA1.

The above-described operating method may make it possible to efficiently utilize the RAM A234 of a relatively small capacity. That is, a space where data is to be stored may be allocated when data is stored in the RAM A234, and allocation for an area where data is stored may be released when data is read from the RAM A234.

Figure 7:
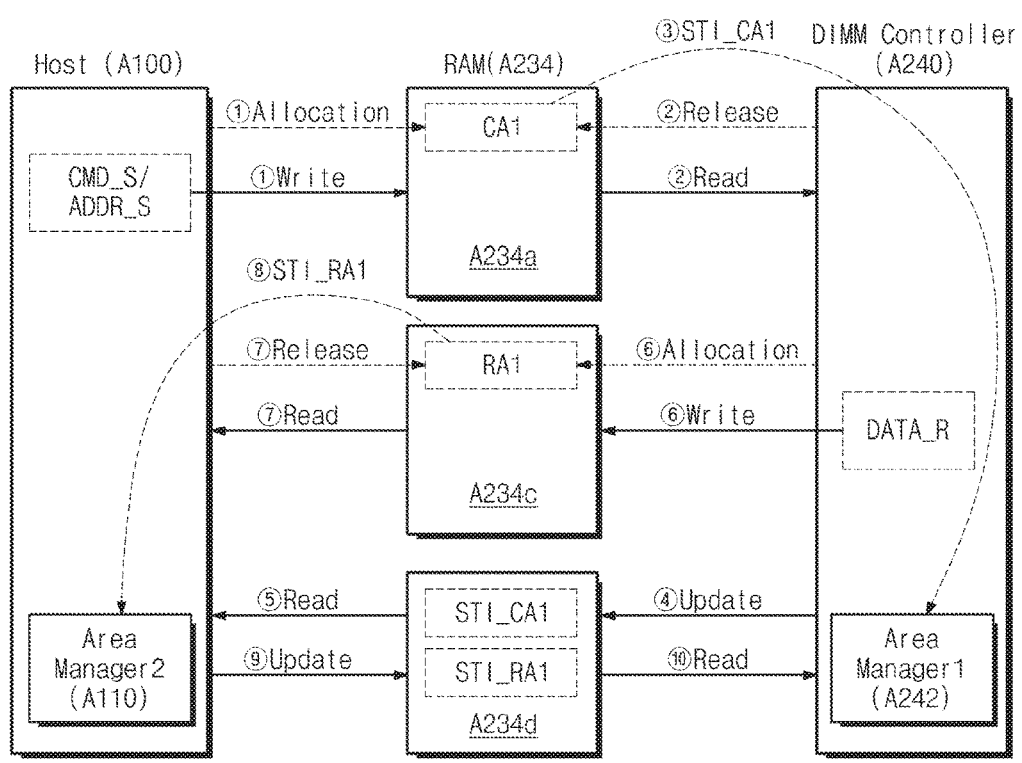
FIG. 7 is a diagram illustrating an operating method of a storage system according to still another embodiment of the inventive concept.

FIG. 7 is a block diagram illustrating an operating method of a storage system A10 according to still another embodiment of the inventive concept. Below, there will be described data migration according to a read operation, area allocation and release of the area allocation for a specific area of the RAM A234, and an operation to update status information STI.

First of all, a storage command CMD_S and a storage address ADDR_S associated with a read operation may be transferred to the RAM A234 from the host A100 (①). At this time, the host A100 may allocate a specific area CA1 of the command area A234a to store the storage command CMD_S and the storage address ADDR_S (①). That is, data recording about the command area A234a and area allocation may occur at the same timing. The area CA1 allocated by the host A100 may be an area only for the storage command CMD_S and the storage address ADDR_S and may not be overwritten by other data.

The DIMM controller A240 may access the RAM A234 and may read the storage command CMD_S and the storage address ADDR_S (②). The DIMM controller A234 may release allocation for the specific area CA1, in which the storage command CMD_S and the storage address ADDR_S are stored, as soon as a read operation is performed (②). As area allocation is released by the DIMM controller A240, the area CA1 in which the storage command CMD_S and the storage address ADDR_S are stored may be capable of being overwritten. That is, data reading about the command area A234a and releasing of area allocation may occur at the same timing.

The first area manager A242 may generate status information STI_CA1 associated with an area de-allocated by the DIMM controller A240 (③). For example, status information generated by the first area manager A242 may include an identification mark (e.g., a flag or the like) indicating that overwriting is possible as the area CA1 in which data is stored is de-allocated. The first area manager A242 may update the status information STI_CA1 (④). For example, the status information STI_CA1 may be stored in the status area A234d of the RAM A234.

The host A100 may access the status area A234d of the RAM A234 to read the status information STI_CA1 (⑤). For example, to access the status area A234d, the host A100 may access the RAM A234 by polling the RAM A234 periodically or by using an interrupt manner.

Read data DATA_R may be transferred to the DIMM controller A240 from the RAM A234 based on a storage command CMD_S associated with a read operation (⑥). At this time, the DIMM controller A240 may allocate a specific area RA1 of the read area A234c to store the read data DATA_R (⑥). That is, data recording about the read area A234c and area allocation may occur at the same timing. The area RA1 allocated by the DIMM controller A240 may be an area only for the read data DATA_R and may not be overwritten by other data.

The host A100 may access the RAM A234 to read data DATA_R stored in the RAM A234 (⑦). The host A100 may release the allocated area RA1 in which data is stored, as soon as the data is read. As area allocation is released by the host A100, the area RA1 in which the read data DATA_R is stored may be capable of being overwritten. That is, data reading about the read area A234c and releasing of area allocation may occur at the same timing.

The second area manager A110 may generate status information STI_RA1 associated with an area de-allocated by the DIMM controller A240 (⑧). For example, status information generated by the second area manager A110 may include an identification mark (e.g., a flag or the like) indicating that overwriting is possible as the area RA1 in which the read data DATA_R is stored is de-allocated. The second area manager A110 may update the status information STI_RA1 (⑨). For example, the status information STI_RA1 may be stored in the status area A234d of the RAM A234.

The DIMM controller A240 may access the status area A234d of the RAM A234 to read the status information STI_RA1 (⑩). The DIMM controller A240 may execute a next write operation with reference to the updated status information STI_RA1. For example, the DIMM controller A240 may overwrite next write data at the area RA1 where write data DATA_W is stored.

An embodiment of the inventive concept is exemplified as read data DATA_R is transferred to the read area A234c of the RAM A234 after the status information STI_CA1 about the area CA1 is updated and the updated status information STI_CA1 is transferred to the host A100. However, the scope and spirit of the inventive concept may not be limited thereto. For example, read data DATA_R may be transmitted to the read area A234c even before the status information STI_CA1 is updated. Of course, in this case, the read area A234c should have a memory space sufficient to receive the read data DATA_R from the DIMM controller A240.

Figure 8:
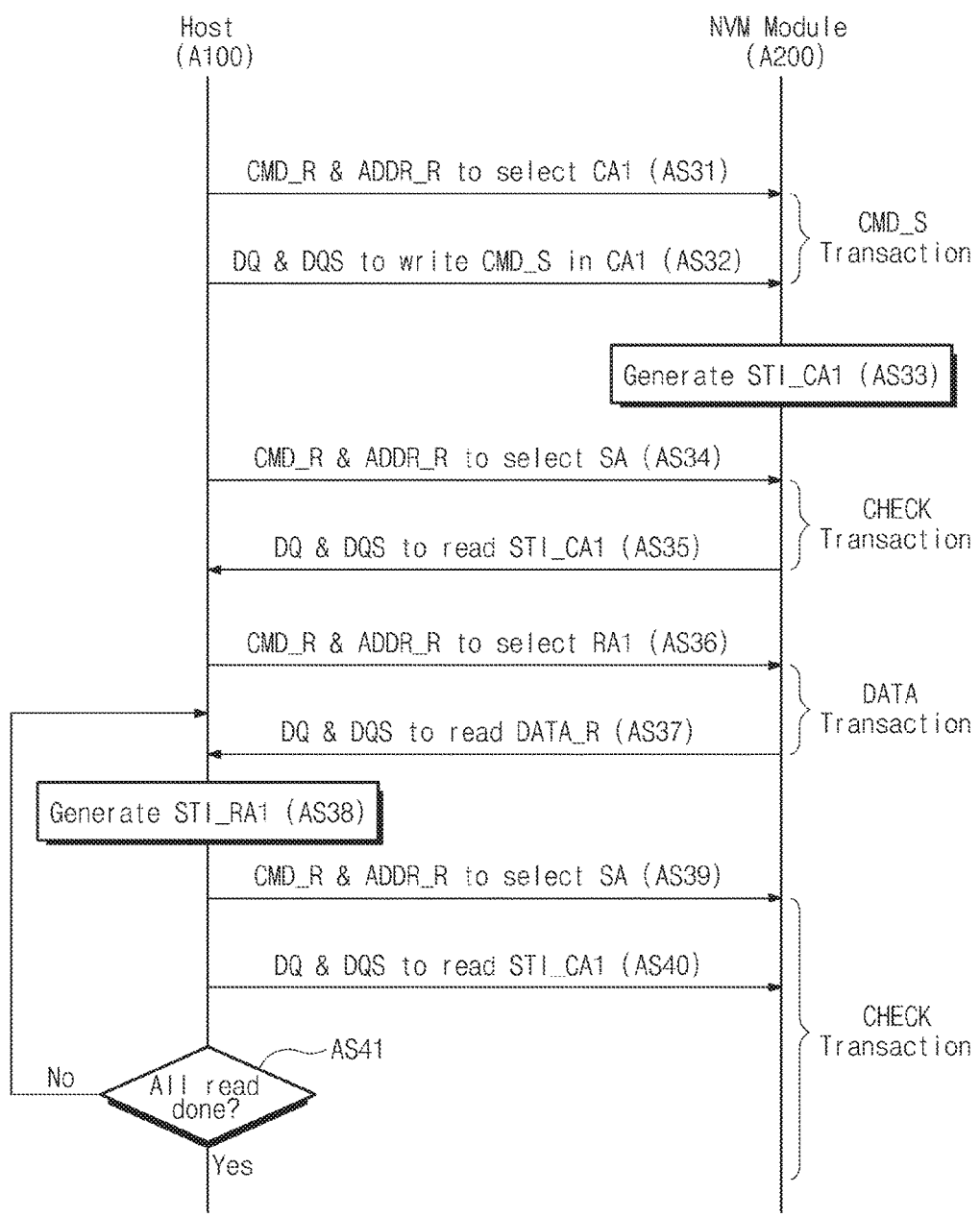
FIG. 8 is a flow chart illustrating a write operation of a nonvolatile memory module according to another embodiment of the inventive concept.

FIG. 8 is a flow chart illustrating a write operation of a nonvolatile memory module A200 according to another embodiment of the inventive concept. To help understand the inventive concept, a description will be given with reference to FIGS. 3 and 7.

In step AS31, the host A100 may provide the RAM controller A232 with a RAM command CMD_R for writing of the command area A234a of the RAM A234 and a RAM address ADDR_R for selecting the command area A234a of the RAM A234.

In step AS32, the host A100 may provide the nonvolatile memory module A200 with a data signal DQ and a data strobe signal DQS for writing a storage command CMD_S at the selected command area A234a. For example, the storage command CMD_S may be a command for a read operation about the nonvolatile memory A280, and the storage address ADDR_S may be an address of the nonvolatile memory A280 where the read data DATA_R is to be stored.

The host A100 may allocate an area CA1 where a data signal DQ and a data strobe signal DQS are to be stored, together with a transfer of the data signal DQ and the data strobe signal DQS. As allocation is made by the host A100, the area CA1 may become an overwrite-unavailable state. For example, steps AS31 and AS32 may be a transaction about the storage command CMD_S.

In step AS33, the DIMM controller A240 may read the storage command CMD_S and the storage address ADDR_S stored in the command area A234a and may generate status information STI_CA1. For example, the first area manager A242 included in the DIMM controller A240 may generate the status information STI_CA1 indicating that the area CA1 where the storage command CMD_S and the storage address ADDR_S are stored is de-allocated.

In step AS34, the host A100 may provide the nonvolatile memory module A200 with a RAM address ADDR_R and a RAM command CMD_R, for selecting the status area A234d of the RAM A234.

In step AS35, the host A100 may read the status information STI, which is written in the status area A234d, through the data signal DQ and the data strobe signal DQS. For example, the data signal DQ and the data strobe signal DQS may include the status information STI_CA1. The host A100 may recognize that the area CA1 is capable of being overwritten, through the status information STI_CA1. For example, the host A100 may overwrite a next storage command at the area CA1.

In step AS36, the host A100 may provide the RAM controller A232 with a RAM command CMD_R for writing of the read area A234c of the RAM A234 and a RAM address ADDR_R for selecting the read area A234c.

In step AS37, the host A100 may receive a data signal DQ and a data strobe signal DQS from the nonvolatile memory module A200 to read data DATA_R stored in the read area A234c. Prior to the above-described operation, when the read data DATA_R read from the nonvolatile memory A280 is stored in the read area A234c, the DIMM controller A240 may allocate an area RA1 where the read data DATA_R is to be stored. As allocation is made, the area RA1 may become an overwrite-unavailable state. If the data signal DQ and the data strobe signal DQS are received from the nonvolatile memory module A200, the host A100 may release allocation for the area RA1 where the read data DATA_R is stored. As area allocation is released by the host A100, the area RA1 may become an overwrite-unavailable state. For example, steps AS36 and AS37 may be a transaction about the read data DATA_R.

In step AS38, the DIMM controller A100 may generate status information STI_RA1 after reading the read data DATA_R stored in the read area A234c. For example, the second area manager A110 included in the host A100 may generate the status information STI_RA1 indicating that the area RA1 where the read data DATA_R is stored is de-allocated.

In step AS39, the host A100 may provide the nonvolatile memory module A200 with a RAM address ADDR_R and a RAM command CMD_R, for selecting the status area A234d of the RAM A234.

In step AS40, the host A100 may store the status information STI in the status area A234d through the data signal DQ and the data strobe signal DQS. For example, the data signal DQ and the data strobe signal DQS may include the status information STI_RA1. The DIMM controller A240 may recognize that the area RA1 is capable of being overwritten, through the status information STI_RA1. For example, the DIMM controller A240 may store next read data at the area RA1.

In step AS41, the host 4100 may determine whether the read operation is completed, based on the read status information STI and the read data DATA_R. If the determination result indicates that the read operation is completed (Yes), the method may end. If the determination result indicates that the read operation is not completed (No), steps AS37 to AS40 may be repeated. That is, the host A100 may read data DATA_R through the data signal DQ and the data strobe signal DQS and may update status data. Accordingly, in step AS41, if all read data DATA_R is read from the read area A234c, the read operation may end.

The above-described operating method may make it possible to efficiently utilize the RAM A234 of a relatively small capacity. That is, a space where data is to be stored may be allocated when data is stored in the RAM A234, and allocation for an area where data is stored may be released when data is read from the RAM A234.

B. Size Adjustment of RAM Areas and Access to Each Area

Figure 9:
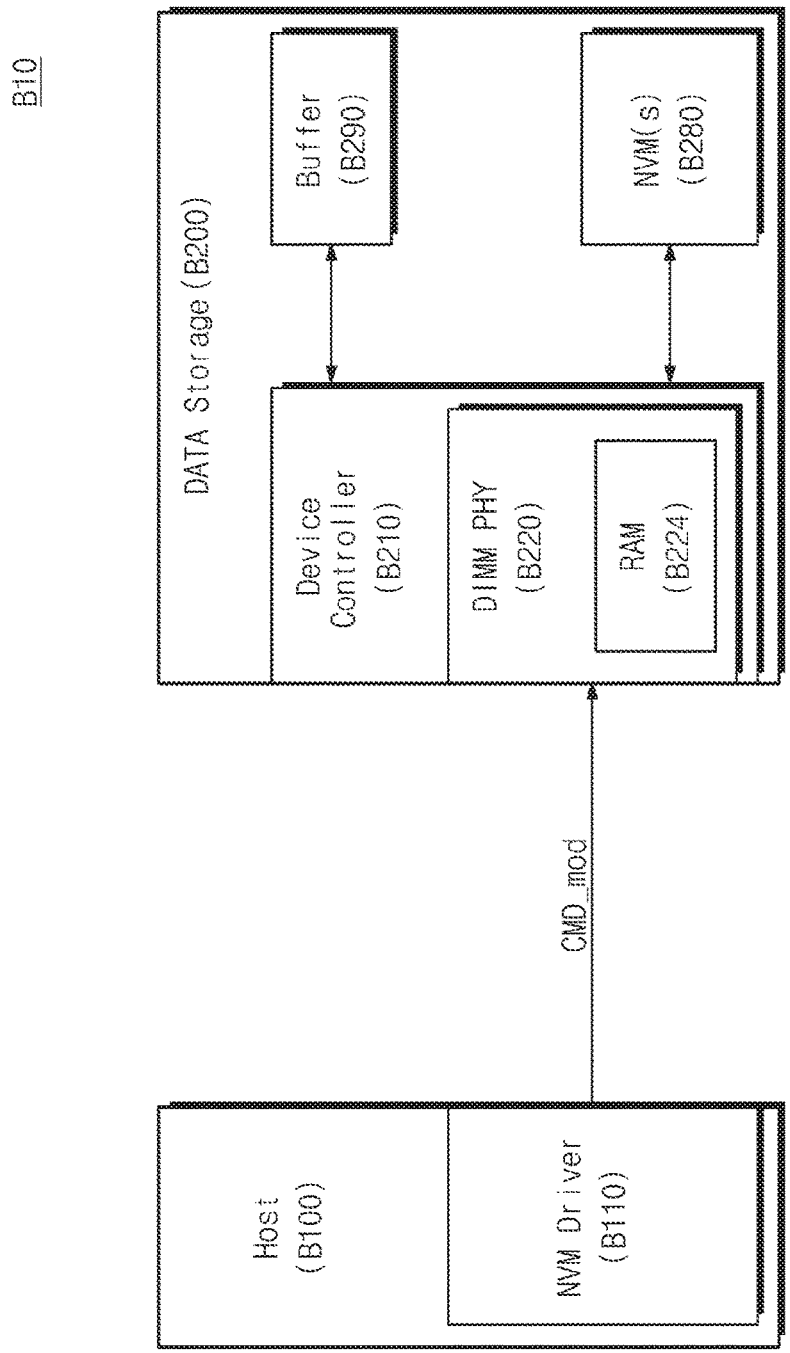
FIG. 9 is a block diagram illustrating a storage system according to an embodiment of the inventive concept.

FIG. 9 is a block diagram illustrating a storage system B10 according to another embodiment of the inventive concept. Referring to FIG. 9, a storage system B10 may include a host B100 and data storage B200.

The host B100 may access the data storage B200 to perform a read operation or a write operation with respect to the data storage B200. The host B100 may access a physical layer B220 of a device controller B210. The host B100 may transmit a modification command CMD_mod to the data storage B200. The modification command CMD_mod may be a command for changing the size of a specific area of a RAM B224 based on a task schedule of the host B100. For example, the modification command CMD_mod may depend on a share of a write operation or a read operation executed on the storage system B10.

The data storage B200 may include a device controller B210 which controls an overall operation of the data storage B200. The device controller B210 may include a DIMM PHY (i.e., a physical layer) B220 for interfacing with the host B100. The data storage B200 may be connected with the host B100 through a high-speed interface such as a dual in-line memory module (DIMM) interface. That is, the DIMM PHY B220 may interface with the host B220 based on the DDR (e.g., DDR2, DDR3, DDR4, etc.).

According to an embodiment of the inventive concept, the device controller B210 may adjust the size of a specific area of the RAM B224 based on the modification command CMD_mod received from the host B100. The device controller B210 may efficiently access the RAM B224 based on data written at the RAM B224. Accordingly, the performance of the data storage B200 may be improved by using the RAM B224 of a relatively small capacity efficiently.

Figure 10:
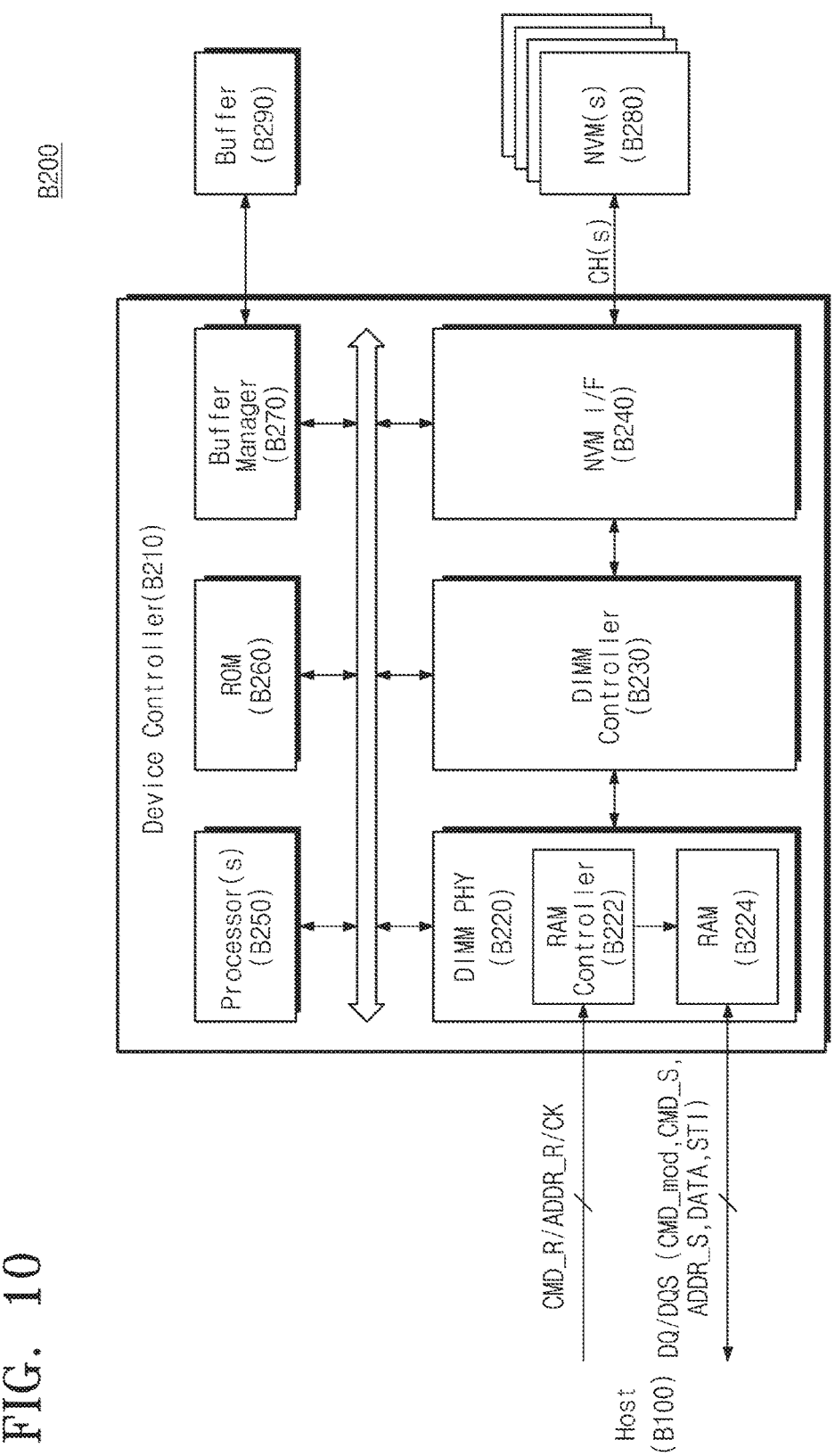
FIG. 10 is a block diagram illustrating data storage illustrated in FIG. 9.

FIG. 10 is a block diagram illustrating data storage B200 illustrated in FIG. 9. Referring to FIG. 10, the data storage B200 may include a device controller B210, a nonvolatile memory B280, and a buffer B290.

The device controller B210 may include a DIMM PHY (i.e., a physical layer) B220, a DIMM controller B230, a nonvolatile memory interface B240, at least one processor B250, a ROM B260, and a buffer manager B270.

The DIMM PHY B220 may include a RAM controller B222 which receives a RAM command CMD_R, a RAM address ADDR_R, and a clock CK from the host B100. The DIMM PHY B220 may include the RAM B224 which exchanges data with the host B100 using data DQ and a data strobe signal DQS. At this time, data CMD_mod, CMD_S, ADDR_S, DATA, and STI may be stored in a space of the RAM B234 which is selected according to the RAM address ADDR_R from the host B100. That is, the data stored in the RAM B224 may be used to control the nonvolatile memory B280.

The RAM B224 may be divided into an area to store commands CMD_mod and CMD_S, an area to store data, and an area to store status information STI. For example, the modification command CMD_mod may be used to adjust the size of a space where write data to be stored in the nonvolatile memory B280 is stored or the size of a space where read data read from the nonvolatile memory B280 is stored.

The DIMM controller B230 may access the RAM B224 to process data stored in the RAM B224. For example, the DIMM controller B230 may read write data to be stored in the nonvolatile memory B280 and may transfer the read data to the nonvolatile memory B280. The DIMM controller B240 may provide data read from the nonvolatile memory B280 to the RAM B224. For example, the DIMM controller B230 may include the following needed to process a write operation or a read operation: scrambler, descrambler, ECC encoder, ECC decoder, and the like.

The nonvolatile memory interface B240 may provide an interface between the device controller B210 and the nonvolatile memory B280. For example, the device controller B210 may exchange data with the nonvolatile memory B280 through the nonvolatile memory interface B240.

The processor B250 may perform an overall operation of the device controller B210. The processor B250 may drive firmware for driving the device controller B210. For example, the processor B250 may load and drive firmware for changing the size of a specific area of the RAM B224 in response to the modification command CMD_mod.

Various operations or firmware which is required to operate the device controller B210 may be stored in the ROM B260. The ROM B260 may store, For example, code data for interfacing with the host B100.

The buffer manager B270 may provide an interface between the device controller B210 and the buffer B290.

The nonvolatile memory B280 may be connected to the nonvolatile memory interface B240 through the channels CH(s). The nonvolatile memory B280 may include, for example, at least one of nonvolatile memories such as a PRAM, a RRAM, a MRAM, a FeRAM, and the like.

The buffer memory B290 may be used as a working memory, a buffer memory, or a cache memory of the device controller B210. For example, the buffer memory B290 may include various random access memories such as a DRAM, a SRAM, a PRAM, and the like.

According to an embodiment of the inventive concept, the device controller B210 may adjust the size of a specific area of the RAM B224 based on the modification command CMD_mod received from the host B100. The modification command CMD_mod may depend on a task schedule of the host B100. For example, the modification command CMD_mod may depend on a share of a write operation of the task schedule and a share of a read operation. In more detail, if a write task amount about the nonvolatile memory B80 in the storage system B10 is relatively large, the device controller B210 may increase the size of a specific area of the RAM B224, in which write data is stored, based on the modification command CMD_mod received from the host B100, and vice versa. The RAM B224 of a relatively small capacity may be efficiently used as the size of a specific area of the RAM B224 is adjusted according to a task schedule of the host B110.

Figure 11:
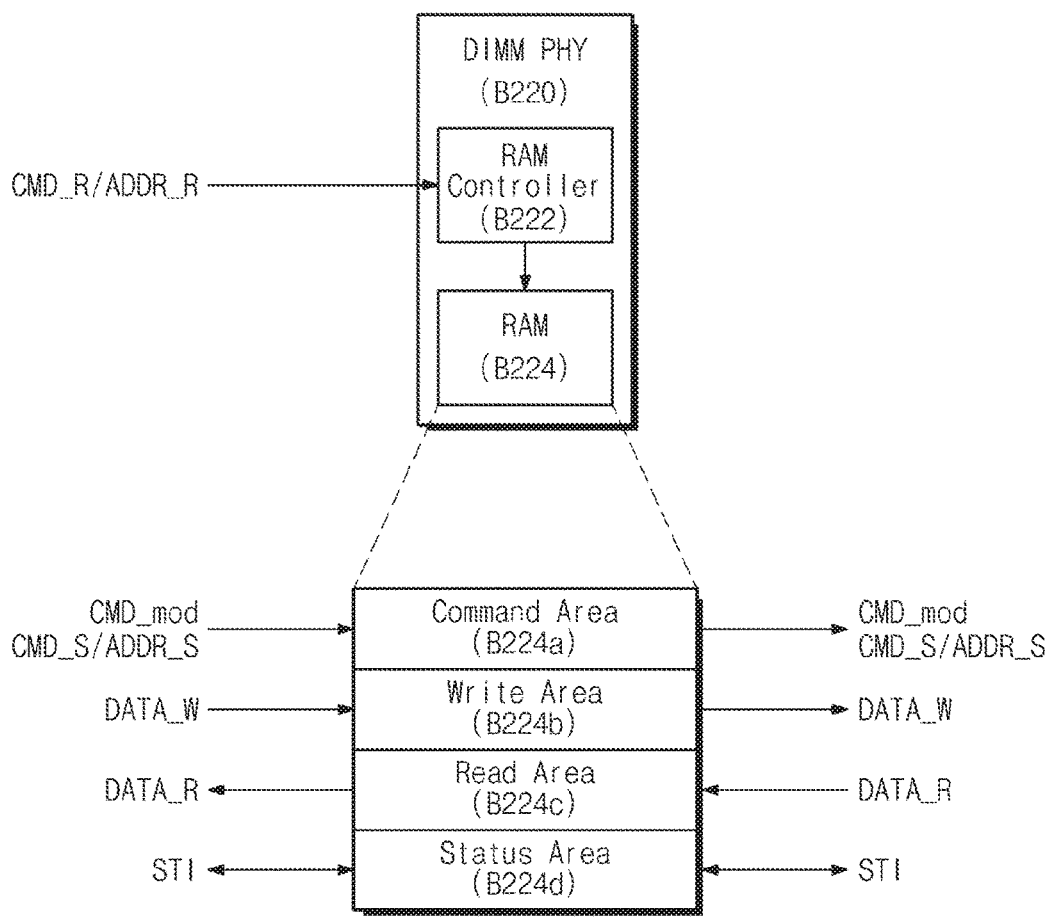
FIG. 11 is a block diagram illustrating a structure of a RAM illustrated in FIG. 10.

FIG. 11 is a block diagram illustrating a structure of a RAM illustrated in FIG. 10. Referring to FIG. 11, the RAM B224 may include a command area B224a, a write area B224b, a read area B224c, and a status area B224d. Data received from the host B100 or the DIMM controller B230 may be stored in one of the command area B224a, the write area B224b, the read area B224c, and the status area B224d, based on a RAM command CMD_R, a RAM address ADDR_R, and a clock CK received from the host B100. For example, the RAM B224 may be a dual port SRAM which is simultaneously accessed by the host B100 and the DIMM controller B230.

The command area B224a may store a storage command CMD_S provided from the host B100 under control of the RAM controller B222. The DIMM controller B230a may read the storage command CMD_S and the modification command CMD_mod stored in the command area B224a.

The write area B224b may store received write data DATA_W under control of the RAM controller B222. The DIMM controller B230 may read write data DATA_W stored in the write area B224b of the RAM B224.

The read area B224c may store received read data DATA_R under control of the RAM controller A240. The DIMM controller B230 may read write data DATA_W stored in the write area B224c of the RAM B224.

The status area B224d may store status information STI associated with whether the storage command CMD_S is completely processed. The status information stored in the status area B224d may be transmitted to the host B100 or to the DIMM controller B230. For example, the host B100 may provide next write data to the write area B224b with reference to the status information STI. Alternatively, the DIMM controller B240 may provide next read to the read area B224c with reference to the status information STI.

Figure 12:
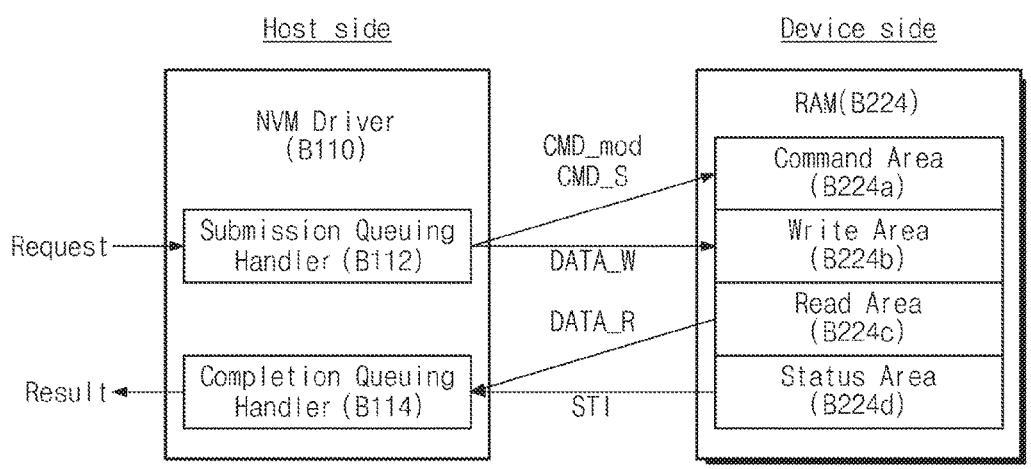
FIG. 12 is a block diagram illustrating communications between a host and data storage.

FIG. 12 is a block diagram illustrating communications between a host B100 and data storage B200. Referring to FIG. 12, data exchange between the host B100 and the data storage B200 may be performed through a queuing manner.

A NVM driver B110 of the host B100 may include a submission queuing hander B112 and a completion queuing handler B114. As an access to the data storage B200 is requested by the host B100, the submission queuing hander B112 may transfer a modification command CMD_mod and a command CMD_S, which is needed to control a nonvolatile memory of the data storage B200, to the command area B224a.

In the case where the access request is a write operation, the submission queuing hander B122 may transmit write data to the write area B224b and a storage command CMD_S associated with the write operation to the command area B224a, respectively. In the case where the access request is a read operation, the submission queuing hander B112 may transmit a storage command CMD_S associated with the read operation to the command area B224a.

The completion queuing handler B114 may fetch status information, indicating whether processing of the storage command CMD_S is completed, from the status area B224d and may fetch read data according to the read request from the read area B224c. The completion queuing handler B114 may output the read status information or read data to an upper layer as a resultant value.

Figure 13:
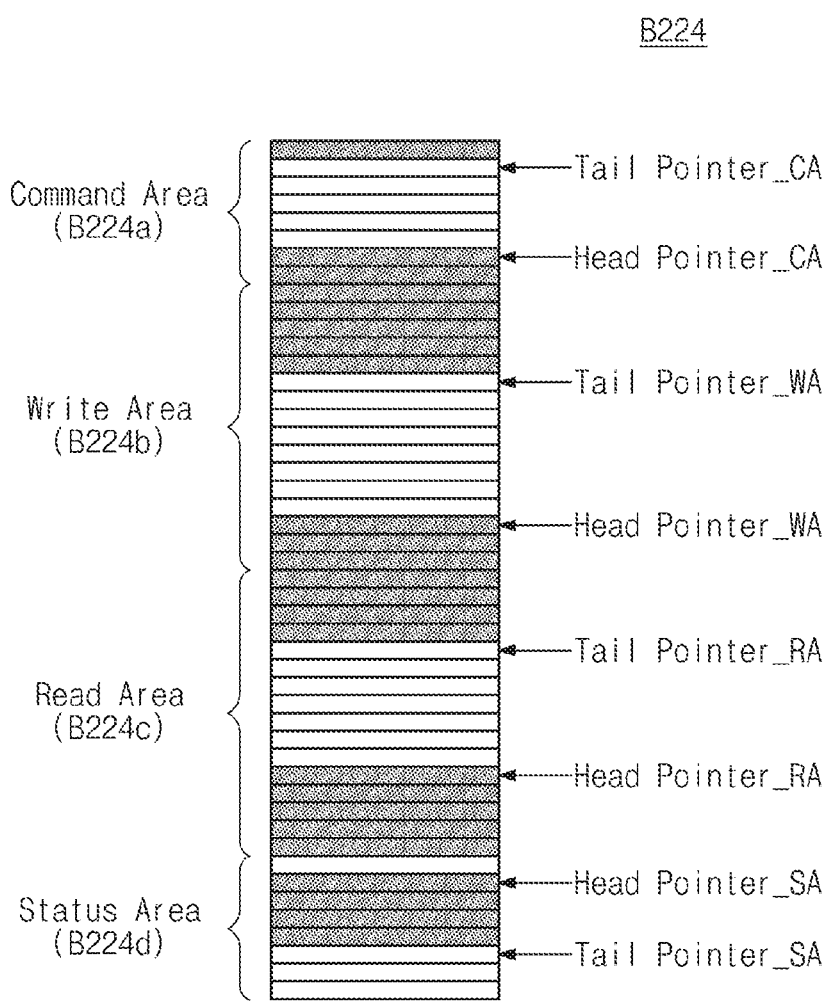
FIG. 13 is a diagram illustrating a RAM of the inventive concept implemented with a circular buffer, according to an embodiment of the inventive concept.

FIG. 13 is a diagram illustrating a RAM B224 of the inventive concept implemented with a circular buffer. For descriptive convenience, it may be assumed that a memory address is skipped and the RAM B224 is composed of 48 spaces (i.e., logical addresses). It may be assumed that a shading portion means a space where data is stored and writing is performed from top to bottom.

Referring to FIG. 13, each of a command area B224a, a write area B224b, a read area B224c, and a status area B224d of the RAM B224 may be implemented with a circular buffer. That is, if data stored at the last address (the lowermost portion of each area) of each area is processed, data may be stored from a first address (i.e., the uppermost portion of each area) of each area.

Circular buffers corresponding to the command area B224a, the write area B224b, the read area B224c, and the status area B224d may be modeled with a header pointer and a tail pointer. For example, when a position indicated by a header pointer of each area (one of B224a to B224D) of the RAM B224 is the same as a position indicated by a tail pointer thereof may mean each area (one of B224a to B224D) is empty. In contrast, when a position corresponding to a value obtained by subtracting "1" from a value of a header pointer of each area (one of B224a to B224D) of the RAM B224 is the same as a value of a tail pointer thereof may mean each area (one of B224a to B224D) is full.

A head pointer of the command area B224a may indicate an area where a next command to be processed by the device controller B210 (refer to FIG. 9) is stored. That is, the device controller B210 may track a head pointer of the command area B224a to fetch and execute a command. A tail pointer of the command area B224a may indicate a next address of a position where a command submitted from the NVM driver B110 (refer to FIG. 9) is stored. The NMM driver B110 may track a tail pointer of the command area B224a to transfer a next command.

A head pointer of the command area B224b may indicate an area where a next command to be processed by the device controller B210 is stored. That is, the device controller B210 may track a head pointer of the write area B224b to read write data stored in the RAM B224 and program the read write data at the nonvolatile memory B280. A tail pointer of the write area B224b may indicate a next address of a position where a command submitted from the NVM driver B110 is stored. The NMM driver B110 may track a tail pointer of the write area B224b to transfer next write data.

The head pointer of the read region B224c may indicate an area where next read data to be read by the NMM controller B110 is stored. That is, the NVM controller B110 may track a head pointer of the read area B224c to read data stored in the RAM B224. A tail pointer of the read area B224c may indicate a next address of a position where read data read from the nonvolatile memory B280 is stored. The device controller B210 may track a tail pointer of the read area B224c to read next read data from the nonvolatile memory B280.

The head pointer of the status area B224d may indicate an area where next completion read by the NMM driver B110 is stored. The NMM controller B110 may track the head pointer of the status area B224d. The head pointer of the status area B224d may indicate an area where next completion to be written by the NMM driver B110 is stored. The device controller B210 may track the tail pointer of the status area B224d.

Figure 14:
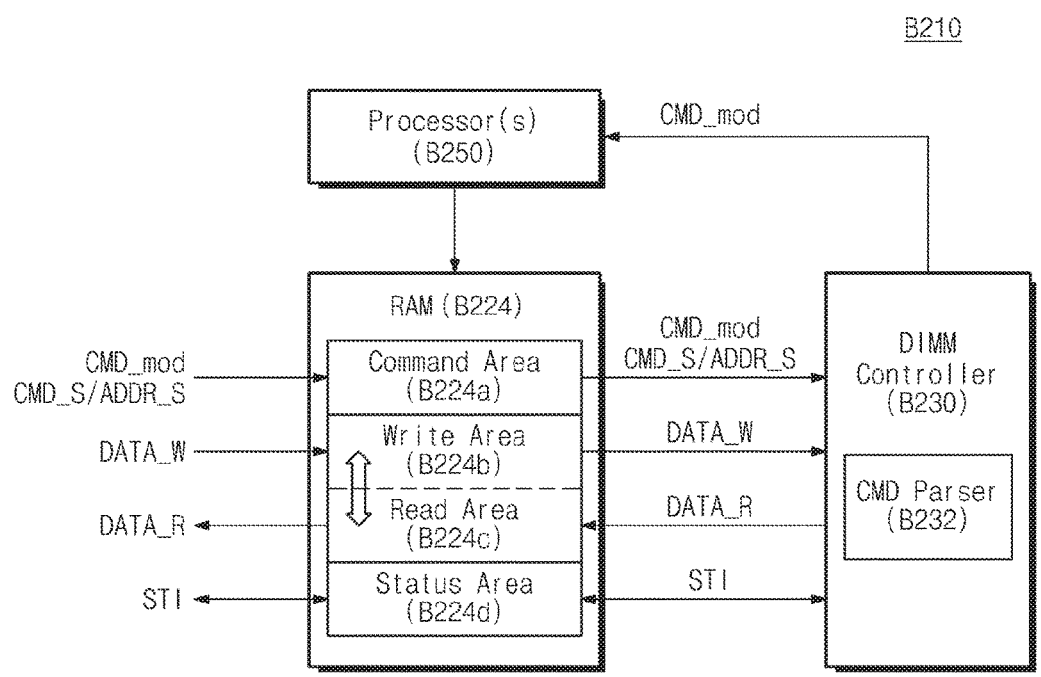
FIG. 14 is a block diagram illustrating a method for changing a specific area of a RAM, according to an embodiment of the inventive concept.

FIG. 14 is a block diagram illustrating a method for adjusting a specific area of a RAM B224, according to an embodiment of the inventive concept.

Referring to FIG. 14, a modification command CMD_mod, a storage command CMD_S, and a storage address ADDR_S received from the host B100 may be stored in the command area B224a. Write data DATA_W or read data DATA_R may be stored in the write area B224b or the read area B224c, based on a RAM command and a RAM address (CMD_R and ADDR_R, FIG. 11). If the write data DATA_W is fully programmed at the nonvolatile memory B280 or if the read data DATA_R is fully read by the host B100, status information corresponding thereto may be stored in the status area B224d.

The modification command CMD_mod may be a command for changing the size of a specific area of the RAM B224, based on a task schedule of the host B100. For example, the modification command CMD_mod may depend on a share of a write operation or a read operation about the storage system B200. That is, if a task is scheduled on a basis of a write operation about the data storage B200, the modification command CMD_mod may be a command for increasing the size of the write area B224b of the RAM B224. That is, if a task is scheduled on a basis of a read operation about the data storage B200, the modification command CMD_mod may be a command for increasing the size of the read area B224c of the RAM B224.

An embodiment of the inventive concept will be exemplified as the modification command CMD_mod is received from the host B100. However, information about the task schedule of the host B100 may be directly received from the host B100. In this case, the DIMM controller B230 may parse information about the task schedule to adjust the size of each area of the RAM B224.

If a command is stored in the command area B224a, the DIMM controller B230 may access the RAM B224 to fetch the command. The command parser B232 may parse the fetched command to determine whether the fetched command parser is associated with any one of a read operation, a write operation, or a size adjustment operation (or size modification operation) about the RAM B224. If the determination result indicates that the fetched command is associated with the read operation or the write operation, the processor B250 may execute the command to control execution of the read operation or the write operation. If the determination result indicates that the fetched command is associated with the modification command CMD_mod, the processor B250 may adjust the sizes of the write and read areas B224b and B224c.

An embodiment of the inventive concept is exemplified as the sizes of the write and read areas B224b and B224c are adjusted. However, the scope and spirit of the inventive concept may not be limited thereto. For example, the size of at least one of the command area B224a, the write area B224b, the read area B224c, and the status area B224d may be adjusted.

Figure 15:
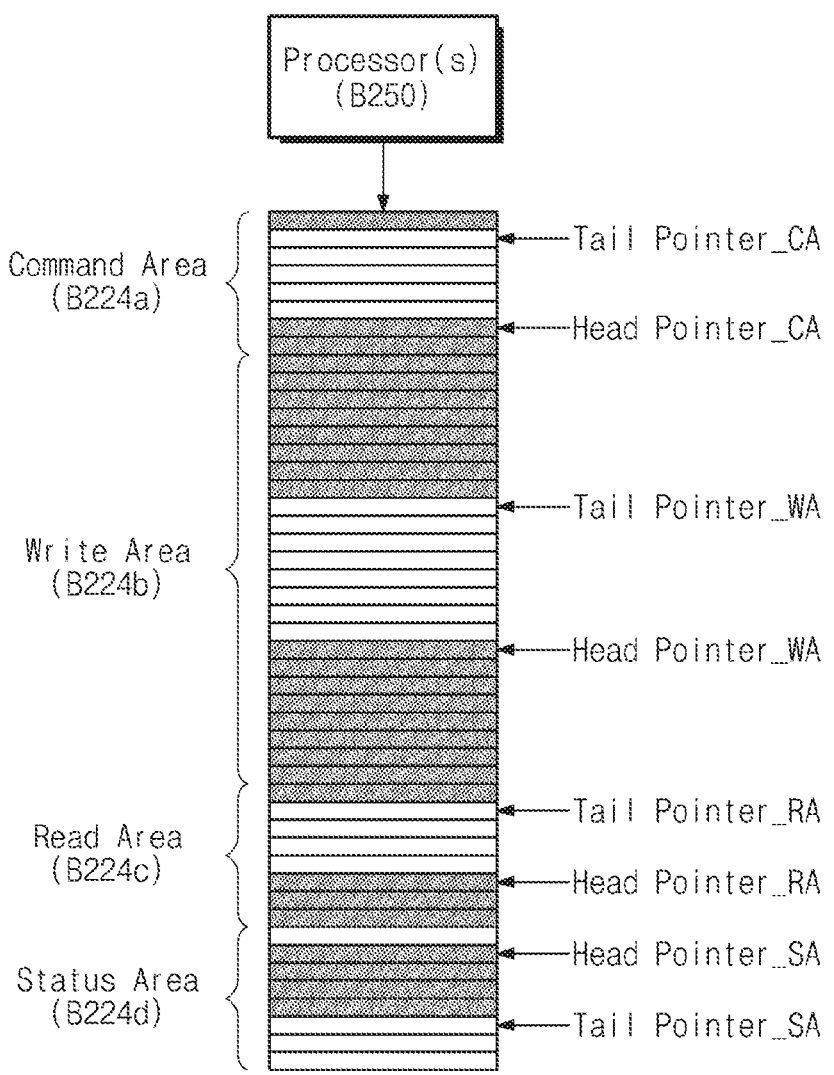
FIG. 15 is a diagram illustrating a RAM having areas of changed sizes, according to an embodiment of the inventive concept.

FIG. 15 is a diagram illustrating a RAM B224 having areas of adjusted sizes, according to an embodiment of the inventive concept. An embodiment of the inventive concept is exemplified as the modification command CMD_mod is used to increase the size of the write area B224b.

Referring to FIG. 15, data stored in the write area B224b may be greater in amount than data stored in the read area B224c. That is, a current task of the host B100 may be scheduled on a basis of a write operation about the data storage B200. As the modification command CMD_mod is executed, as illustrated in FIG. 15, the size of the write area B224b may increase compared with that thereof, while the size of the read area B224c may decrease compared with that thereof.

According to an embodiment of the inventive concept, the size of the RAM B224 may be adjusted according to a task schedule of the host B100. The above-described method may make it possible to efficiently utilize the RAM B224 of a relatively small capacity.

Figure 16:
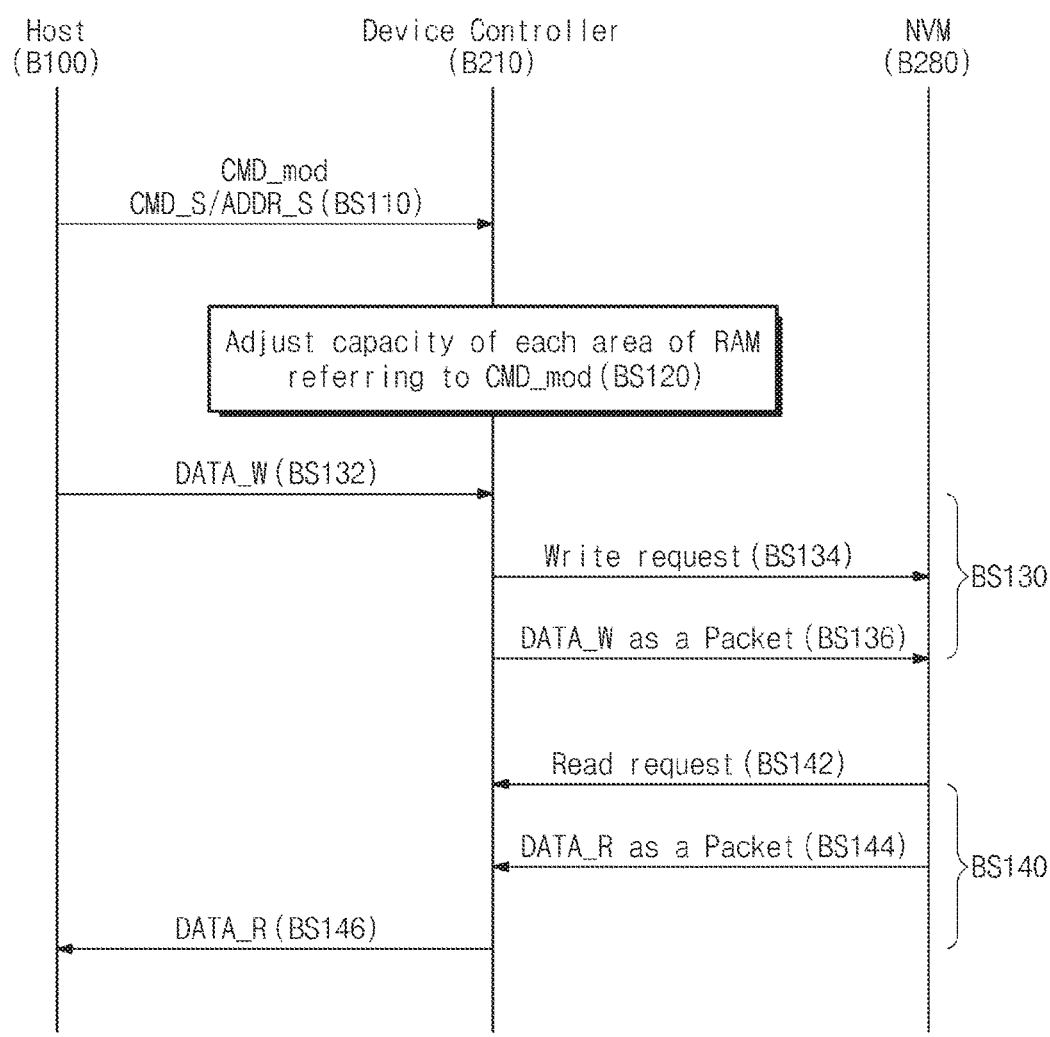
FIG. 16 is a flow chart illustrating an operating method of a device controller according to an embodiment of the inventive concept.

FIG. 16 is a flow chart illustrating an operating method of a device controller B210 according to an embodiment of the inventive concept. Below, there will be descried the case that the sizes of write and read areas B224b and B224c are adjusted.

In step BS110, there may be received a modification command CMD_mod, a storage command CMD_S, and a storage address ADDR_S. The modification command CMD_mod and the storage command CMD_S may be stored in the command area B224a of the RAM B224.

In step BS120, the device controller B210 may adjust the sizes of the write and read areas B224b and B224c of the RAM B224 based on the modification command CMD_mod received from the host B100. For example, the command parser B232 included in the device controller B210 may parse the received command, and the processor B250 may execute the modification command CMD_mod. Accordingly, the sizes of the write and read areas B224b and B224c of the RAM B224 may be adjusted according to a task schedule of the host B100.

In BS130, a data writing operation may be performed. In detail, in step BS132, write data DATA_W may be transmitted to the device controller B210. For example, the write data DATA_W may be stored in the write area B224b of the RAM B224. The device controller B210 may issue a write request to the nonvolatile memory B280 (BS134), and the write data DATA_W may be transmitted to and programmed at the nonvolatile memory B280 in the form of a packet.

In BS140, a data reading operation may be performed. For example, if the device controller B210 issues a read request to the nonvolatile memory B280 (BS142), read data DATA_R may be transmitted to the device controller B210 in the form of a packet. For example, the read data DATA_R may be stored in the read area B224c of the RAM B224. The read data DATA_R may be provided to the host B100.

An embodiment of the inventive concept is exemplified as the write operation BS130 is performed prior to the read operation BS140. However, the scope and spirit of the inventive concept may not be limited thereto. For example, the read operation may be performed prior to the write operation. An order and a method in which the DIMM controller B230 accesses each area of the RAM B224 to process data will be described with reference to FIG. 17.

Figure 17:
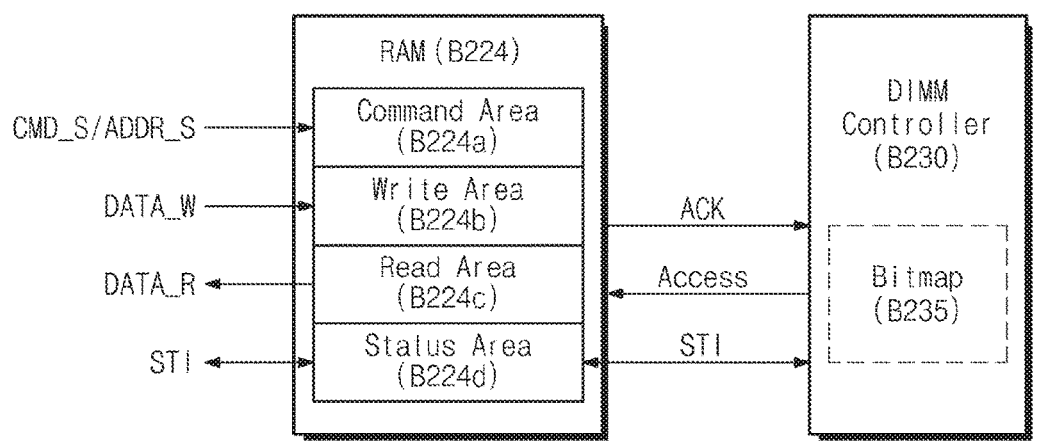
FIG. 17 is a block diagram illustrating a configuration of a device controller according to another embodiment of the inventive concept.

FIG. 17 is a block diagram illustrating a configuration of a device controller B210 according to another embodiment of the inventive concept. Below, there will be described a method in which the DIMM controller B230 accesses the RAM B224 using a bitmap B235.

The device controller B210 may include the RAM B224 and the controller B230. The RAM B224 may be included in the DIMM PHY B220 as illustrated in FIG. 10. The RAM B224 may temporarily store a storage command CMD_S, write data DATA_W, and the like received from the host B100 and may temporarily store read data DATA_R read from the nonvolatile memory B280. The RAM B224 may exchange status information STI with the host B100 or the DIMM controller B230.

If data is stored in one of four areas B224a to B224d of the RAM B224, the RAM B224 may output an acknowledge signal ACK to the DIMM controller B230. The acknowledge signal ACK may indicate a signal indicating whether data is stored in a specific space (i.e., a logical address). The DIMM controller B230 may manage a bitmap B235 based on the received acknowledge signal ACK. The DIMM controller B230 may access four areas B224a to B224d of the RAM B224 based on the bitmap B235. A method for managing the bitmap B235 and a method for accessing the RAM B224 using the bitmap B235 will be described with reference to FIG. 18.

Figure 18:
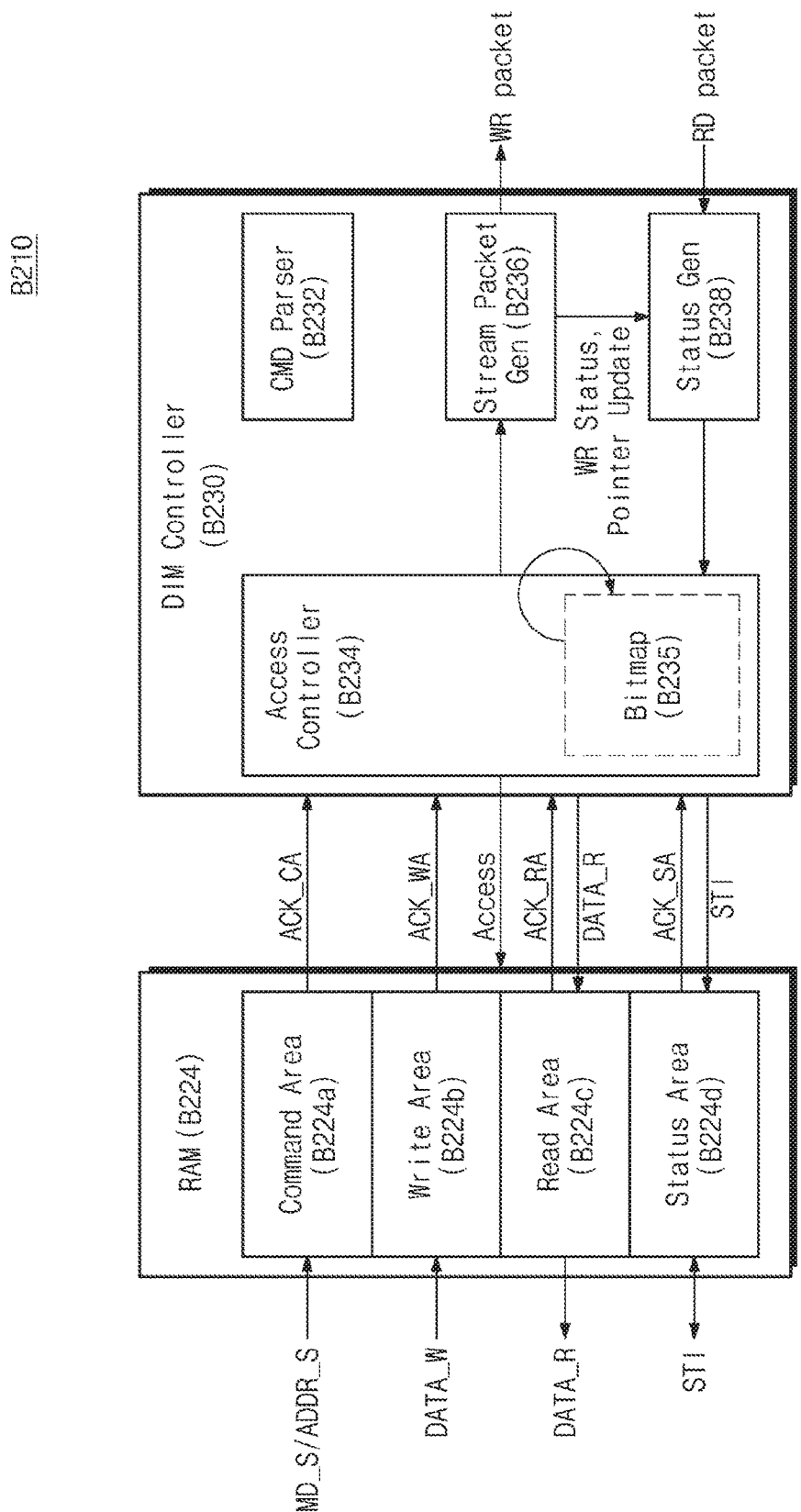
FIG. 18 is a block diagram illustrating a device controller illustrated in FIG. 17.

FIG. 18 is a block diagram illustrating a device controller B210 illustrated in FIG. 17.

The RAM B224 may include a command area B224a, a write area B224b, a read area B224c, and a status area B224d as illustrated in FIG. 17. The DIMM controller B230 may include the command parser B232, an access controller B234, a stream packet generator B236, and a status information generator B238.

The command parser B232 may parse a storage command CMD_S received from the host B100 and may allow an operation (e.g., a read operation or a write operation), corresponding to the parsing result, to be performed. If the parsing result indicates that the storage command CMD_S is a command associated with a write operation, the processor B250 (e.g. FIG. 15) may execute operations needed to program write data at the nonvolatile memory B280.

The access controller B234 may allow the DIMM controller B230 to access the RAM B224 and to process data stored or to be stored in any area of the RAM B224. For example, in the case of a write operation, the DIMM controller B230 may read write data DATA_W stored in the write area B224b. For the read operation, the access controller B234 may provide data read from the nonvolatile memory B280 to the read area B224c.

The stream packet generator B236 may process a storage command CMD_S, a storage address ADDR_S, and write data DATA_W in the form of a stream packet. The stream packet WR packet may be programmed at the nonvolatile memory B280. After transmitting the stream packet WR packet to the nonvolatile memory B280, the stream packet generator B236 may update status information associated with write data. The updated status information WR Status may be stored in the status area B224d. After transmitting the stream packet WR packet to the nonvolatile memory B280, the stream packet generator B236 may update status information associated with write data. If programming of the stream packet transmitted to the nonvolatile memory B280 is completed, next write data may be processed because write data DATA_W stored in the write area B224b corresponding thereto is unnecessary.

The status information generator B238 may generate status information to be stored in the status area B224d. The status information may include information associated with whether the storage command CMD_S received from the host B100 is completely processed. For a write operation, for example, if the stream packet WR packet is fully programmed at the nonvolatile memory B280, the status information generator B238 may generate status information STI about the write operation and may transmit the status information STI to the access controller B234. The status information STI may be stored in the status area B224d. The host B100 may transmit next write data with reference to the status information STI stored in the status area B224d.

According to an embodiment of the inventive concept, if data is recorded at any space of the RAM B224, the RAM B224 may notify the DIMM controller B230 of a signal indicating that data is recorded. For example, if a storage command CMD_S and a storage address ADDR_S received from the host B100 are stored in the command area B224a, the RAM B224 may provide the DIMM controller B230 with a signal ACK_CA. The signal ACK_CA may be a signal indicating whether data is recorded at any space of the command area B224a. If write data DATA_W received from the host B100 is stored in the write area B224b, the RAM B224 may provide the DIMM controller B230 with a signal ACK_WA. The signal ACK_WA may be a signal indicating whether data is recorded at any space of the write area B224b. If read data DATA_R received from the host B100 is stored in the read area B224c, the RAM B224 may provide the DIMM controller B230 with a signal ACK_RA. The signal ACK_RA may be a signal indicating whether data is recorded at any space of the read area B224c. If status information STI received from the host B100 or the DIMM controller B230 is stored in the status area B224d, the RAM B224 may provide the DIMM controller B230 with a signal ACK_SA. The signal ACK_SA may be a signal indicating whether data is recorded at any space of the status area B224d.

The access controller B234 may manage the bitmap B235 based on the acknowledge signal ACK_CA, ACK_WA, ACK_RA, or ACK_SA received from the RAM B224. As the bitmap B235 is managed, it may be possible to know how much data is recorded at any area of the RAM B224, that is, how much any area of the RAM B224 is occupied. The access controller B234 may determine an order to access areas of the RAM B224 with reference to the bitmap B235. For example, if the result of referring to the bitmap B235 indicates that a share of the write area B224b is greatest, the access controller B234 may access the write area B224b first of all and may process write data DATA_W stored in the area B224b.

Figure 19:
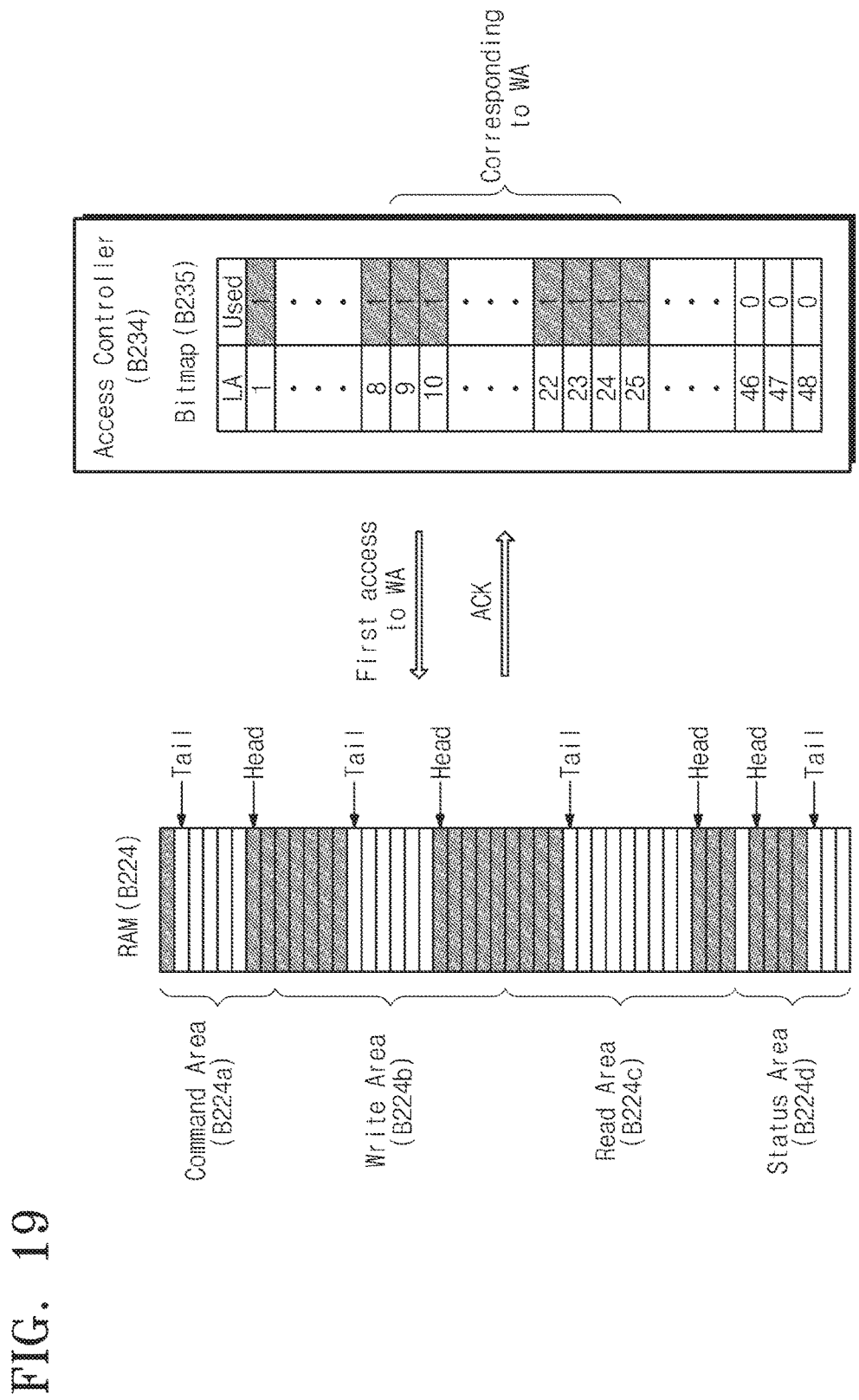
FIG. 19 is a block diagram illustrating a bitmap according to an embodiment of the inventive concept.

FIG. 19 is a diagram illustrating a bitmap B235 according to an embodiment of the inventive concept. As illustrated in FIG. 19, the RAM B224 may include four areas B224a to B224d. A shaded portion of a space of the RAM B224 may mean a space in which data is stored. To help understand the inventive concept, it may be assumed that the RAM B224 is composed of 48 logical addresses LA, the uppermost portion corresponds to a logical address "1", and the lowermost portion corresponds to a logical address "48". That is, the command area B224a may be composed of logical addresses 1 to 8, the write area B224b of logical addresses 9 to 24, the read area B224c of logical addresses 25 to 40, and the status area B224d of logical addresses 41 to 48. Each of the areas B224a to B224d may be implemented with a circular buffer.

If data is stored in the RAM B224, the RAM B224 may output a signal ACK to the access controller B234. The signal ACK may include a signal ACK_CA from the command area B224a, a signal ACK_WA from the write area B224b, a signal ACK_RA from the read area B224c, and a signal ACK_SA from the status area B224d.

The access controller B234 may manage the bitmap B235 based on the received signal ACK. As illustrated in FIG. 19, the bitmap B235 may include information indicating whether a specific area of the RAM B224 is occupied. For example, an occupied area of the RAM B224 may be marked by a bit of "1". In contrast, an unoccupied area of the RAM B224 may be marked by a bit of "0".

The access controller B234 may manage the bitmap B235 in real time or may update the bitmap B235 periodically. The access controller B234 may determine an order to access areas of the RAM B224 with reference to the bitmap B235.

For example, the access controller B234 may first access an area of which the utilization rate is greatest. Referring to FIG. 19, since 10 spaces of 16 spaces are occupied, the write area B224b may have the utilization rate of 62.5%. Referring to the bitmap B235, since the utilization rate of the write area B224b is greatest, the access controller B234 may first access the write area B224b. For example, the access controller B234 may access the write area B224b to read data stored in the write area B224b. The read data may be processed in a packet form, and the processed data may be transmitted to the nonvolatile memory B280.

Alternatively, the access controller B234 may first access an area of which the number of occupied spaces is greatest. It may be understood from FIG. 19 that the write area B224b occupies the greatest space, that is, 10 spaces. Referring to the bitmap B235, the access controller B234 may first access the write area B224b.

The read area B224c may be accessed using a method different from a method described with reference to FIG. 19. The utilization rate of the read area B224c should be smallest to access the read area B224c first of all. The reason may be that the host B100 reads most of read data DATA_R stored in the read area B224c. In other words, a space where next read data is to be stored may be sufficient. This will be described with reference to FIG. 20.

Figure 20:
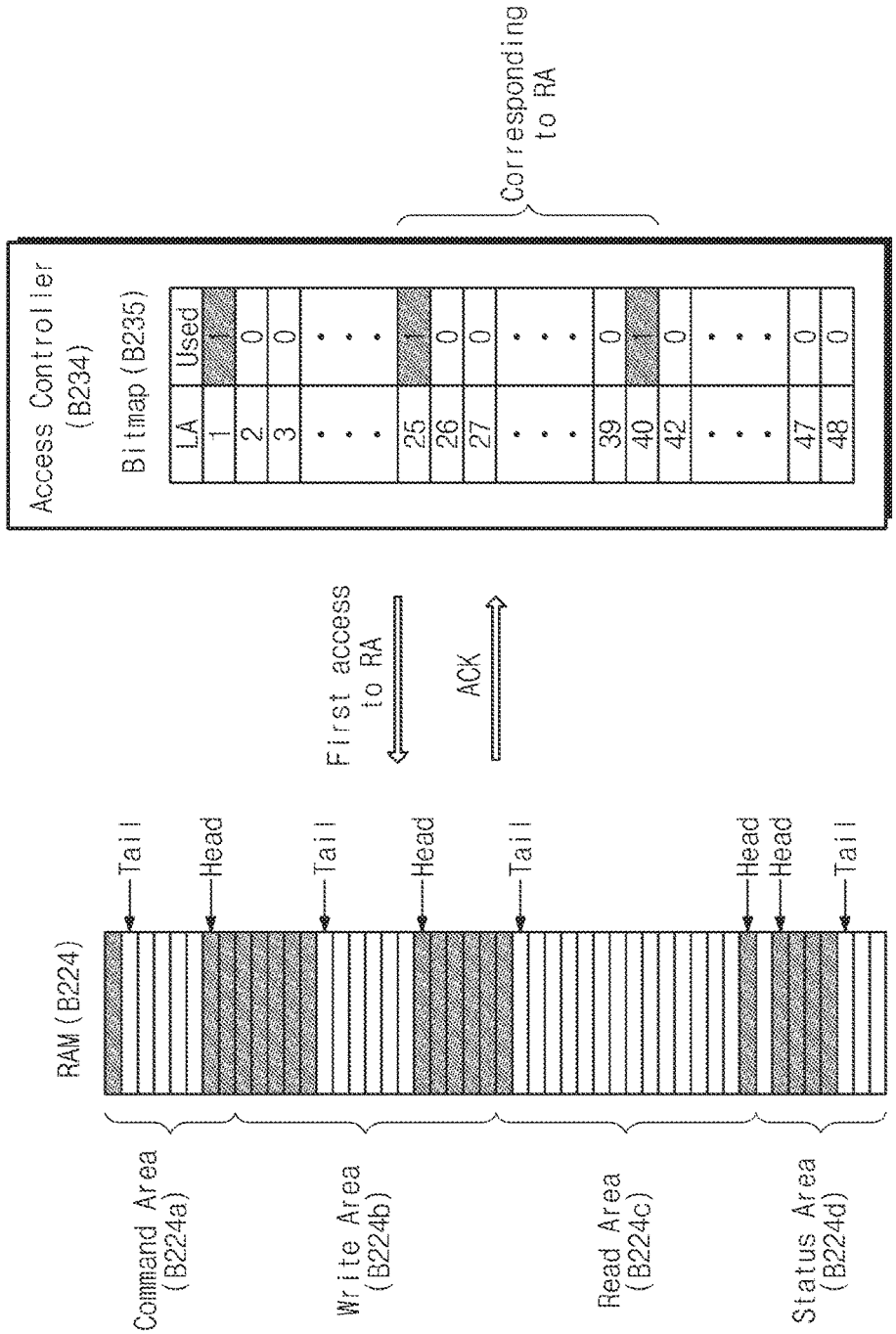
FIG. 20 is a block diagram illustrating a bitmap according to another embodiment of the inventive concept.

FIG. 20 is a diagram illustrating a bitmap B235 according to another embodiment of the inventive concept. The access controller B234 may access the RAM B224 with reference to the bitmap B235. As described with reference to FIG. 19, an area of which the utilization rate is greatest may be first of all accessed by the access controller B234. However, a process different from that described above may be applied to the case that the utilization rate of the read area B224c is greatest.

Referring to FIG. 20, since 2 spaces of 16 spaces are occupied, the read area B224c may have a utilization rate of 12.5%. Referring to the bitmap B235, since the utilization rate of the read area B224c is smallest, the access controller B234 may first access the read area B224c. For example, as the result that the access controller B234 accesses the read area B224c, read data read from the nonvolatile memory B280 may be stored in the read area B224c of the RAM B224. The host B100 may read the read data stored in the read area B224c.

Alternatively, in the case where an area of which the number of occupied spaces is greatest is the read area B224c, the access controller B234 may first access the read area B224c. It may be understood from FIG. 20 that the read area B224c occupies the smallest space, that is, 2 spaces. Referring to the bitmap B235, the access controller B234 may first access the read area B224c.

According to an embodiment of the inventive concept, there may be managed the bitmap B235 including information about whether data is recorded at any space of the RAM B224. The DIMM controller B230 may access the RAM B224 with reference to the bitmap B235. The above-described method may make it possible to efficiently utilize the RAM B224 of a relatively small capacity.

Figure 21:
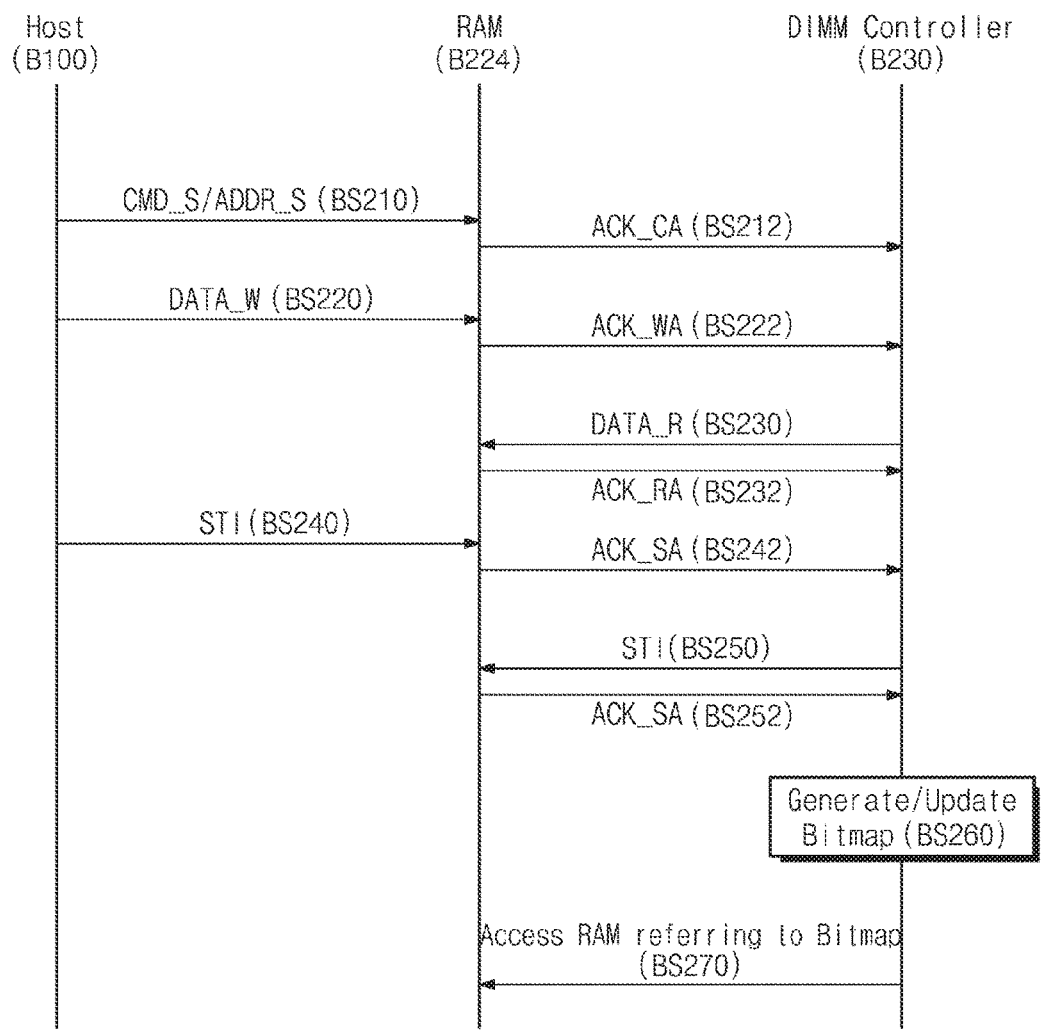
FIG. 21 is a flow chart illustrating an operating method of a device controller according to an embodiment of the inventive concept.

FIG. 21 is a flow chart illustrating an operating method of a device controller according to an embodiment of the inventive concept;

In step BS210, a storage command CMD_S and a storage address ADDR_S may be transferred to the RAM B224 from the host B100. The storage command CMD_S and the storage address ADDR_S may be stored in the command area B224a.

In step BS212, a signal ACK_CA may be transferred to the DIMM controller B230 from the RAM B224. The signal ACK_CA may be a signal indicating whether data is recorded at any space of the command area B224a. The access controller B234 may generate (or update) a bitmap based on the signal ACK_CA.

In step BS220, write data DATA_W may be transferred to the RAM B224 from the host B100. The write data DATA_W may be stored in the write area B224b of the RAM B234. For example, the write data DATA_W may be associated with or may not be associated with the storage command CMD_S received in step BS210.

In step BS222, a signal ACK_WA may be transferred to the DIMM controller B230 from the RAM B224. The signal ACK_WA may be a signal indicating whether data is recorded at any space of the write area B224b. The access controller B234 may generate (or update) a bitmap based on the signal ACK_WA.

In step BS230, read data DATA_R may be transferred to the RAM B224 from the DIMM controller B230. The read data DATA_R may be stored in the read area B224c of the RAM B224. The read data DATA_R may be associated with or may not be associated with the storage command CMD_S received in step BS210.

In step BS232, a signal ACK_RA may be transferred to the DIMM controller B230 from the RAM B224. The signal ACK_RA may be a signal indicating whether data is recorded at any space of the read area B224c. The access controller B234 may update the bitmap based on the signal ACK_RA.

In step BS240, the status information STI may be transferred to the RAM B224 from the host B100. The status information STI may be stored in the status area B224d of the RAM B234. For example, the status information STI received from the host B100 may be status information associated with a read operation. Since the status information STI includes information indicating that execution of the command is completed, the status information STI received from the host B100 may not be associated with the read data DATA_R received in BS230.

In step BS242, a signal ACK_SA may be transferred to the DIMM controller B230 from the RAM B224. The signal ACK_SA may be a signal indicating whether data is recorded at any space of the read area B224d. The access controller B234 may update the bitmap based on the signal ACK_SA (BS260).

In step BS250, the status information STI may be transferred to the RAM B224 from the DIMM controller B230. The status information STI may be stored in the status area B224d of the RAM B234. For example, the status information STI received from the DIMM controller B230 may be status information associated with a write operation. Since the status information STI includes information indicating that execution of the command is completed, the status information STI received from the DIMM controller B230 may not be associated with the write data DATA_W received in BS220.

In step BS252, the signal ACK_SA may be transferred to the DIMM controller B230 from the RAM B224. The signal ACK_SA may be a signal indicating whether data is recorded at any space of the read area B224d. The access controller B234 may update the bitmap based on the signal ACK_SA (BS260).

In step BS270, the DIMM controller B230 may access the RAM B224 with reference to the bitmap B235. For example, the DIMM controller B230 may first access an area, of which the utilization rate is greatest, from among four areas of the RAM B224. Alternatively, the DIMM controller B230 may first access an area, of which the number of occupied spaces is greatest, from among four areas of the RAM B224. In the case where the utilization rate of the read area B224c is smallest or in the case where an area of which the number of occupied spaces is smallest is the read area B224c, the DIMM controller B230 may first of all access the read area B224c. As an access result, the DIMM controller B230 may fetch a storage command CMD_S stored in the command area B224a, may read write data DATA_W stored in the write area B224b, or may write read data DATA_R at the read area B224c.

Figure 22:
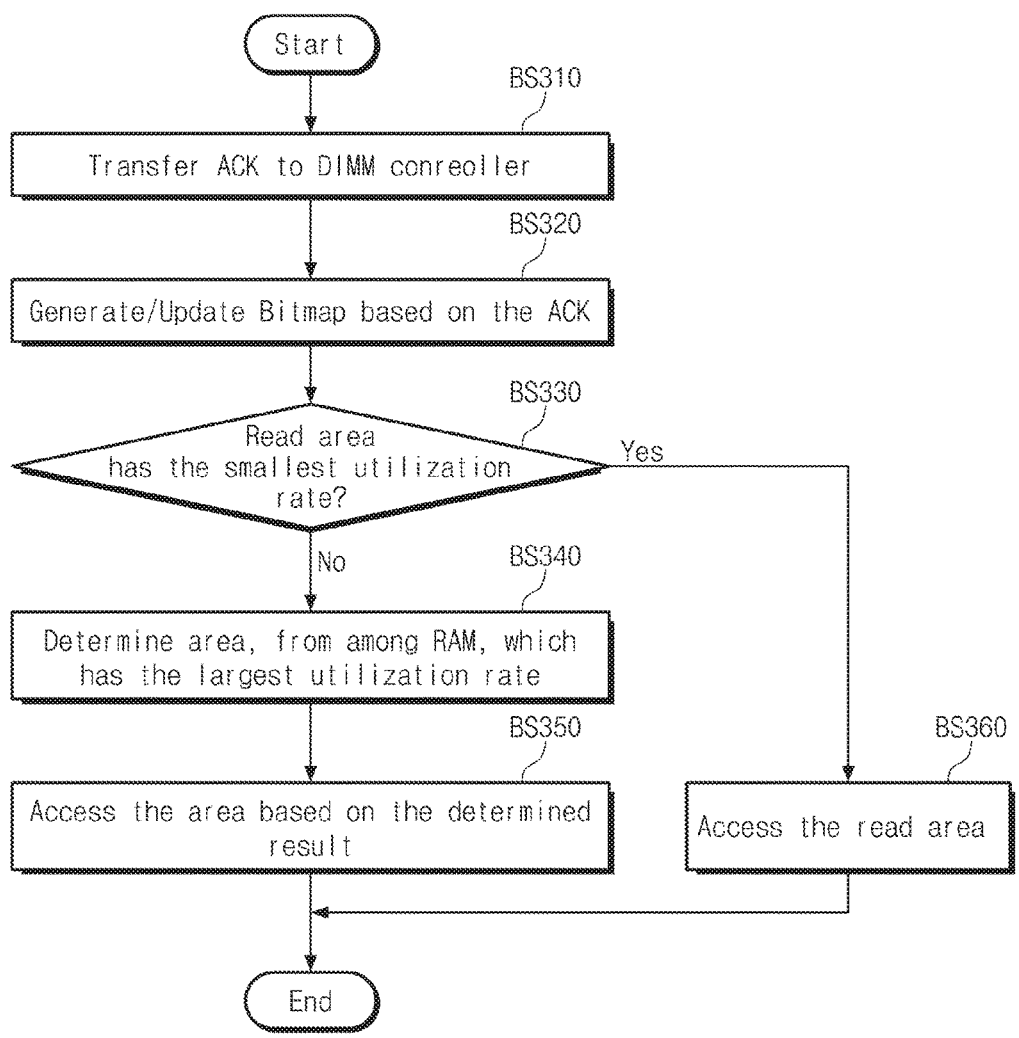
FIG. 22 is a flow chart illustrating an operating method of a device controller according to an embodiment of the inventive concept.

FIG. 22 is a flow chart illustrating an operating method of a device controller according to an embodiment of the inventive concept.

In step BS310, an acknowledge signal ACK may be transferred to the DIMM controller B230 from the RAM B224. The acknowledge signal ACK may be a signal indicating whether data is stored in any space of the RAM B224 (i.e., whether any space of the RAM B224 is used). The signal ACK may include a signal ACK_CA from the command area B224a, a signal ACK_WA from the write area B224b, a signal ACK_RA from the read area B224c, and a signal ACK_SA from the status area B224d.

In step BS320, the DIMM controller B230 may generate or update the bitmap B235. For example, the generation or update of the bitmap B235 may be executed by the access controller included in the DIMM controller B230. The access controller B234 may update the bitmap B235 in real time or periodically.

In step BS330, there may be determined whether an area, of which the utilization rate is smallest, from among four areas B224a to B224d of the RAM B224 is the read area B224c. An operation branch may occur according to the determination result. If an area of which the utilization rate is smallest is the read area B224c (Yes), the procedure may proceed to step BS360. Otherwise (No), the procedure may proceed to step BS340.

In step BS340, there may be determined an area, of which the utilization rate is greatest, from among the four areas B224a to B224d of the RAM B224.

In step BS350, the DIMM controller B230 may access the RAM B224 based on the determination result. As an access result, the DIMM controller B230 may execute the storage command CMD_S or may read write data to transfer the read data to the nonvolatile memory B280.

In step BS360, the DIMM controller B230 may access the read area B224c. That the utilization rate of the read area B224c is smallest may mean that most of read data is read by the host B100. In other words, that the utilization rate of the read area B224c is smallest may mean that a space to store next read area is sufficient. As an access result, the read data DATA_R read from the nonvolatile memory B280 may be stored in the read area B224c. The host B100 may read the read data DATA_R stored in the read area B224c.

According to an embodiment of the inventive concept, the DIMM controller B230 may manage the bitmap B235 including information about whether data is recorded at any space of the RAM B224. The DIMM controller B230 may determine an order to access areas of the RAM B224 with reference to the bitmap B235. The above-described method may make it possible to efficiently utilize the RAM B224 of a relatively small capacity.

C. RAM Management Using Pointer

Figure 23:
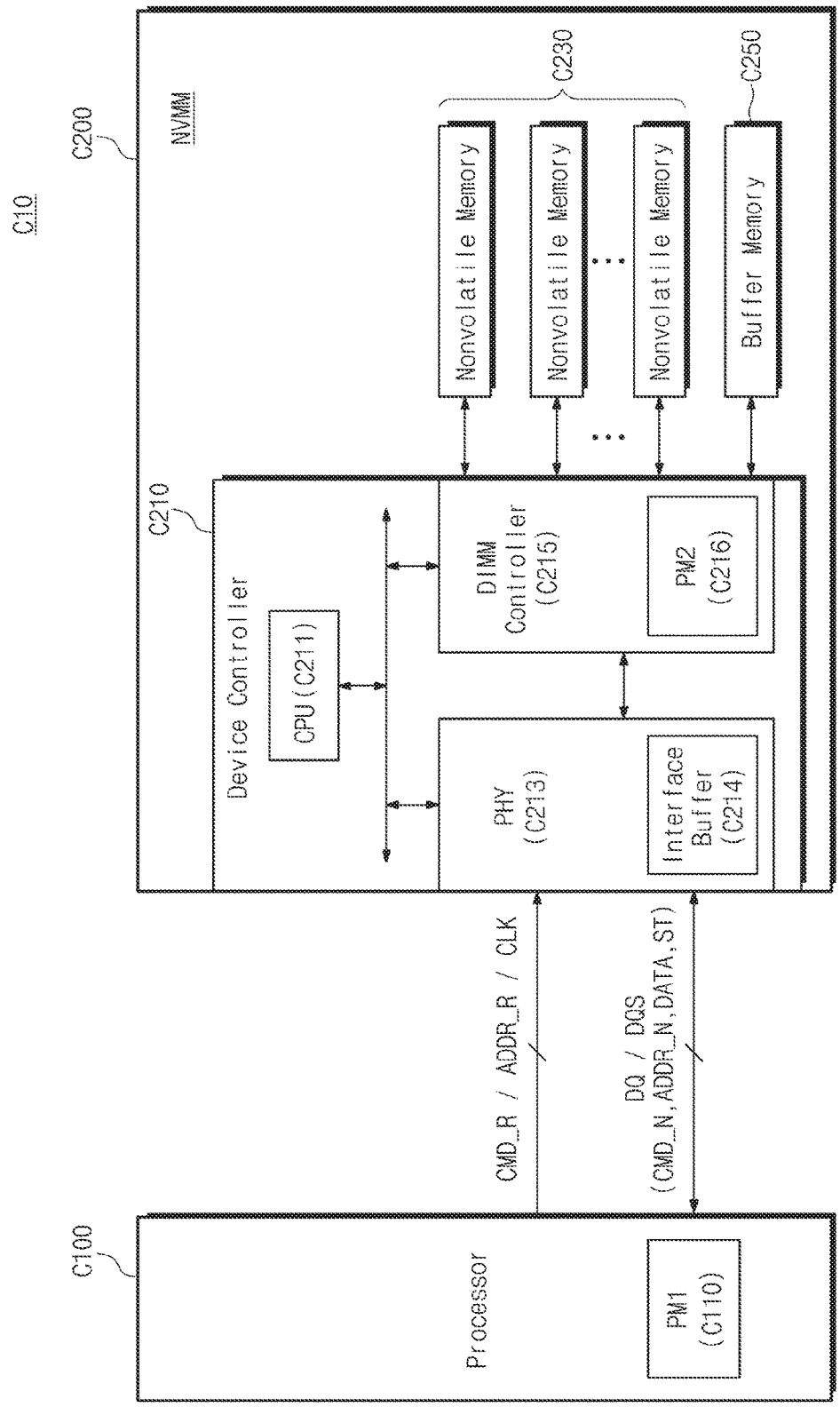
FIG. 23 is a block diagram illustrating a user device according to still another embodiment of the inventive concept.

FIG. 23 is a block diagram illustrating a user system according to still another embodiment of the inventive concept. Referring to FIG. 23, a computing system C10 may include a processor C100 and a nonvolatile memory module C200.

The host 1100 may perform an access operation to the nonvolatile memory module C200 such as a write request and a read request. The processor C100 may access a physical layer C213 of a device controller C210 to write or read data at or from the nonvolatile memory module C200. For example, the processor C100 may access an interface buffer C214 of the physical layer C213 to write a command or an address which is used to access the nonvolatile memory C230. The processor C100 may include a first pointer manager C110 for managing a pointer about the interface buffer C214 which is managed in a FIFO manner.

The first pointer manager C110 may be implemented with hardware or with a software or firmware module included in a device driver. The first pointer manager C110 may track or manage a read pointer or a tail pointer of a command area or a write area of the interface buffer C214. The first pointer manager C110 may track or manage a write pointer or a head pointer of a command area or a write area of the interface buffer C214.

That is, the first pointer manager C110 may track or manage a tail pointer of a memory area of the interface buffer C214 at which the processor C100 writes or pushes data. The first pointer manager C110 may track or manage a head pointer of a memory area of the interface buffer C214 from which the processor C100 reads data.

The nonvolatile memory module C200 may include the device controller C210, a nonvolatile memory C230, and a buffer memory C250. The device controller 1210 may include a physical layer C213 for low-level interfacing with the processor C100 and a DIMM controller C215 to perform data communication with a physical layer C213 and the nonvolatile memory C230 or with the buffer memory C250. The physical layer C213 may include the interface buffer C214 which exchanges data with the processor C100 using data DQ and a data strobe signal DQS. The processor C100 may write data CMD_N, ADDR_N, DATA, and ST at a specific area of the interface buffer C214 to access the nonvolatile memory C230 or the buffer memory C250. Areas of the interface buffer C214 classified by the host 1100 for each function will be described with reference to FIG. 24. The device controller C210 may include a central processing unit (CPU) C211 which executes software or firmware for controlling a storage command CMD_N or a storage address ADDR_N loaded onto the interface buffer C214, data to be stored in the nonvolatile memory C230, and the like.

The processor C100 may provide a write request or a read request to access the nonvolatile memory module C200. The processor C100 may access the physical layer C213 of the device controller C210 to write data at the nonvolatile memory module C200. The physical layer C213 may receive a RAM command CMD_R, a RAM address ADDR_R, a clock CLK, and the like from the processor C100. The physical layer C213 may receive data DQ together with the RAM command CMD_R, the RAM address ADDR_R, and the clock CLK from the processor C100. Here, the RAM command CMD_R, the RAM address ADDR_R, and the clock CLK may be signals for storing data DQ in the interface buffer C214 of the physical layer C213. The data DQ written at a specific area of the interface buffer C214 may include a storage command CMD_N, a storage address ADDR_N, data, and status information ST for accessing the nonvolatile memory C230.

The processor C100 may write information CMD_N, ADDR_N, DATA, and ST for accessing the nonvolatile memory C230 or the buffer memory C250 at a specific area of the interface buffer C214. Here, CMD_N, ADDR_N, and DATA written at the interface buffer C214 may correspond to a command, an address, and data for accessing the nonvolatile memory C230. The status information ST may be data informing the processor C100 of a status in which a command, an address, and data are recorded at the interface buffer C214. With the above description, the interface buffer C214 may be used as a memory which is shared by the processor C100 and the nonvolatile memory module C200 to write a command and an address and data for an access to the nonvolatile memory module C200.

The CPU C211 may run firmware for performing functions, such as data exchange, error correction, scrambling, and the like, executed in the NVM controller C210. The CPU C211 may control the following overall operation: parsing data loaded onto the interface buffer C214 to transfer the parsed result to the nonvolatile memory C230 and the buffer memory C250 or transferring data stored in the nonvolatile memory C230 or the buffer memory C250 to the interface buffer C214. It may be understood that the CPU C211 is implemented with a multi-core for performing the above-described control operation.

The DIMM controller C215 may transfer data stored in the interface buffer C214 of the physical layer C213 to a target area of the nonvolatile memory C230 or the buffer memory C250. The DIMM controller C215 may include a second pointer manager C216. The second pointer manager C216 may manage pointers about the interface buffer C214 which is managed with a FIFO memory of a dual-port manner.

The second pointer manager C216 may be implemented with hardware or with a software or firmware module included in a device driver driven by the CPU C211. The second pointer manager C216 may manage a head pointer of a command area or a write area of the interface buffer C214. The second pointer manager C216 may manage a tail pointer of a read area or a status area of the interface buffer C214. That is, the second pointer manager C216 may manage a head pointer of a memory area of the interface buffer C214 at which the processor C100 writes or pushes data or from which the DIMM controller C215 reads (or pops) the written data. The second pointer manager C216 may manage a tail pointer of a memory area of the interface buffer C214 at which the DIMM controller C215 writes (or pushes) data or from which the processor C100 reads (or pops) the written data.

The nonvolatile memory devices C230 may be connected with the device controller C210 through a plurality of channels CH1 to CHn. The nonvolatile memory devices C230 may store or output data under control of the device controller C210. Each of the nonvolatile memory devices C230 may be implemented with nonvolatile memory elements such as electrically erasable and programmable ROM (EEPROM), NAND flash memory, NOR flash memory, phase-change RAM (PRAM), resistive RAM (ReRAM), ferroelectric RAM (FRAM), spin-torque magnetic RAM (STT-MRAM), and the like. For descriptive convenience, it may be assumed that each of the nonvolatile memory devices C230 is a NAND flash memory.

The buffer memory C250 may be used as a working memory, a buffer memory, or a cache memory of the device controller C210. The buffer memory C250 may include various information required to operate the nonvolatile memory module C200. In an embodiment, the buffer memory C250 may include data for managing the nonvolatile memory devices C230. For example, the buffer memory C250 may include a mapping table between a physical address of the nonvolatile memory devices C230 and the storage address ADDR_N received from the processor C100 through the data signal DQ and the data strobe signal DQS. In an embodiment, the buffer memory C250 may include random access memories such as DRAM, SRAM, PRAM, MRAM, RRAM, FeRAM, and the like.

In an embodiment, the nonvolatile memory module C200 may be of the form of a dual in-line memory module (DIMM) and may be mounted on a DIMM socket so as to communicate with the processor C100. That is, the physical layer C213 may perform interfacing defined according to a dual data rate (DDR, DDR2, DDR3, DDR4) protocol. However, the interface protocol between the processor C100 and the nonvolatile memory module C200 may not be limited thereto.

For example, the interface between the processor C100 and the nonvolatile memory module C200 may include at least one of DDR, DDR2, DDR3, DDR4, low power DDR (LPDDR), universal serial bus (USB), multimedia card (MMC), embedded MMC, peripheral component interconnection (PCI), PCI-express (PCI-E), advanced technology attachment (ATA), serial-ATA, parallel-ATA, small computer small interface (SCSI), enhanced small disk interface (ESDI), integrated drive electronics (IDE), firewire, universal flash storage (UFS), nonvolatile memory express (NVMe), or the like.

Figure 24:
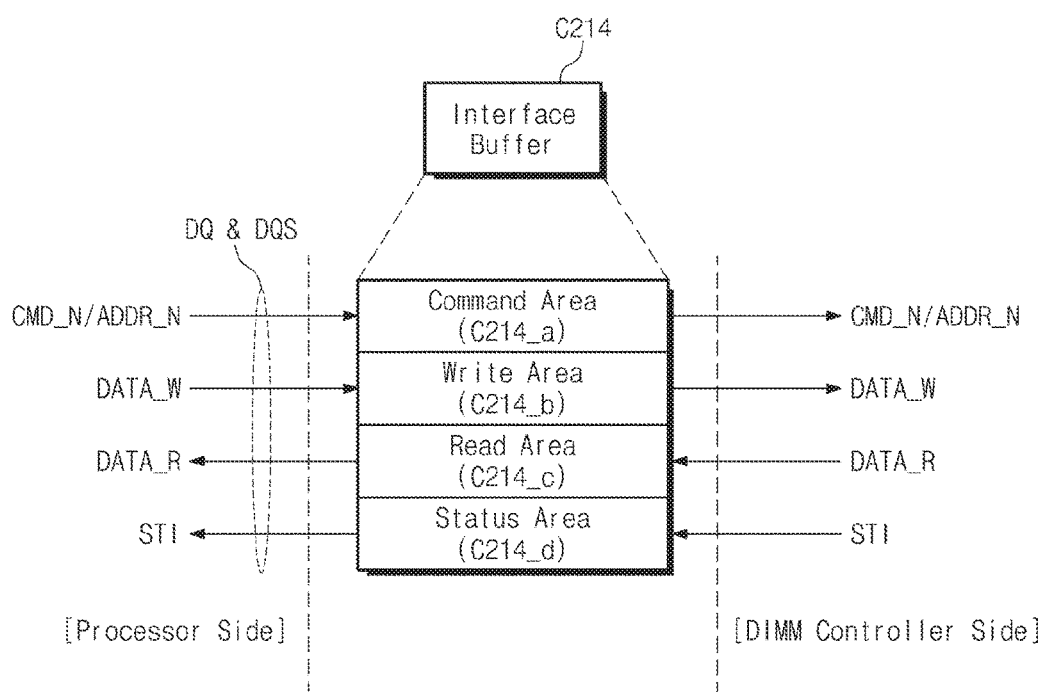
FIG. 24 is a diagram illustrating logical areas of an interface buffer of FIG. 23.

FIG. 24 is a diagram illustrating logical areas of an interface buffer of FIG. 23. Referring to FIG. FIG. 24, the interface buffer C214 may logically include a command area C214_a, a write area C214_b, a read area C214_c, and a status area C214_d.

A storage command CMD_N received from the processor C100 through the data signal DQ may be stored in the command area C214_a of the interface buffer C214. The DIMM controller C215 may read a storage command CMD_N stored in the command area C214_a of the interface buffer C214. In an embodiment, the storage command CMD_N may include a storage address ADDR_N, and the storage command CMD_N and the storage address ADDR_N may be stored in the command area C214_a.

Write data DATA_W received through the data signal DQ may be stored in the write area C214_b of the interface buffer C214. The DIMM controller C215 may read write data DATA_W stored in the write area C214_b of the RAM C214.

Read data DATA_R A may be stored in the read area C214_c of the interface buffer C214. Read data stored in the read area C214_c of the interface buffer C214 may be provided to the processor C100 through the data signal DQ and the data strobe signal DQS.

The status area C214_d of the interface buffer C214 may store status information STI received from the DIMM controller C215 through the data signal DQ and the data strobe signal DQS, or the stored status information STI may be transferred to the processor C100.

According to the above-described function of the interface buffer C214, the interface buffer C214 may be used as a memory which is shared by the processor C100 and the nonvolatile memory module C200. That is, a command, an address, and data may be stored in the interface buffer C214 to access the nonvolatile memory devices C200 or the buffer memory C250. A write status about the command, the address, and data may be stored in the interface buffer C214.

The interface buffer C214 may be implemented with a dual-port memory, and the memory areas C214_a to C214_d may be managed in the FIFO manner. The generation of pointers for a push and pop control about each of the memory areas C214_a to C214_d and the detection of an empty/full state thereof may be made by the first pointer manager C110 of the processor C100 or the second pointer manager C216 of the DIMM controller C215. Accordingly, the physical layer C213 may not need a separate complicated controller for controlling a pointer position and or a buffer status of the interface buffer C214.

Figure 25:
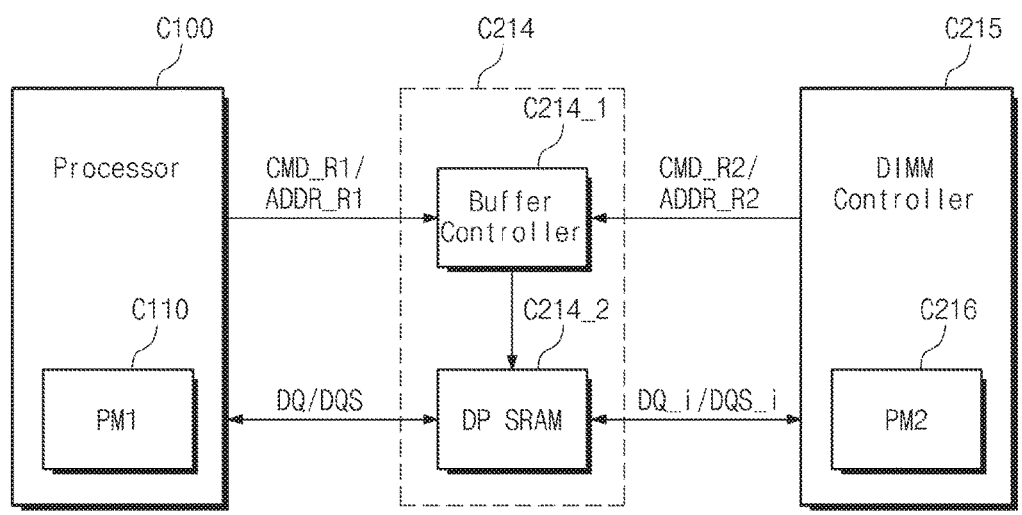
FIG. 25 is a block diagram illustrating a control structure of an interface buffer including a dual-port SRAM of the inventive concept.

FIG. 25 is a block diagram illustrating a control structure of an interface buffer C214 including a dual-port SRAM C214_2 of the inventive concept. Referring to FIG. 25, the first pointer manager C110 driven on the processor C100 may track or manage a tail pointer of each of the command and write areas C214_a and C214_b of the interface buffer C214 and may monitor a status of each of the command and write areas C214_a and C214_b. In addition, the second pointer manager C215 driven on the processor C100 may track or manage a tail pointer of each of the read and status areas C214_c and C214_d of the interface buffer C216 and may monitor a status of each of the read and status areas C214_c and C214_d. A buffer controller C214_1 may not include a separate component for determining an empty/full state about each area of the dual-port SRAM C214_2.

The first pointer manager C110 driven on the processor C100 may manage tail pointers of the command and write areas C214_a and C214_b of the dual-port SRAM C214_2. That is, the first pointer manager C110 may manage a tail pointer of a memory area of the interface buffer C214 at which the processor C100 writes data and may monitor a status of a corresponding area of the interface buffer C214. That is, the first pointer manager C110 may monitor a full state or an empty state of each of the command and write areas C214_a and C214_b and may write data at the dual-port SRAM C214_2 with reference to the monitored state. Here, a method in which the first pointer manager C110 receives a position of tail pointer TP of the command area C214_a or the write area C214_b may be implemented in various manners. For example, the buffer controller C214_1 may detect tail pointers TP of the command area C214_a and the write area C214_b and may write the detected result at the status area C214_d, and the processor C100 may detect information stored in the status area C214_d.

The second pointer manager C216 of the DIMM controller C215 may track or manage a tail pointer of the read or status area C214_c or C214_d of the dual-port SRAM C214_2. That is, the second pointer manager C216 may manage a tail pointer of a memory area of the interface buffer C214 at which the DIMM controller C215 writes data and may monitor a status of a corresponding area of the interface buffer C214. That is, the second pointer manager C216 may monitor a full state or an empty state of each of the read and status areas C214_c and C214_d. The dual-port SRAM C215 may access the dual-port SRAM C214_2 based on a full state or an empty state of each of the read and status areas C214_c and C214_d.

An embodiment of the inventive concept is exemplified as the second pointer manager C216 manages a tail pointer TP under condition that data is written at the status area C214_d by the DIMM controller C215 (push) and is read from the status area C214_d by the processor C100 (*pop*). However, the scope and spirit of the inventive concept may not be limited thereto. For example, the first pointer manager C110 may track or manage a tail pointer TP in the case where data is written at the status area C214_d by the processor C100 and is read from the status area C214_d by the DIMM controller C215.

Figure 26A:
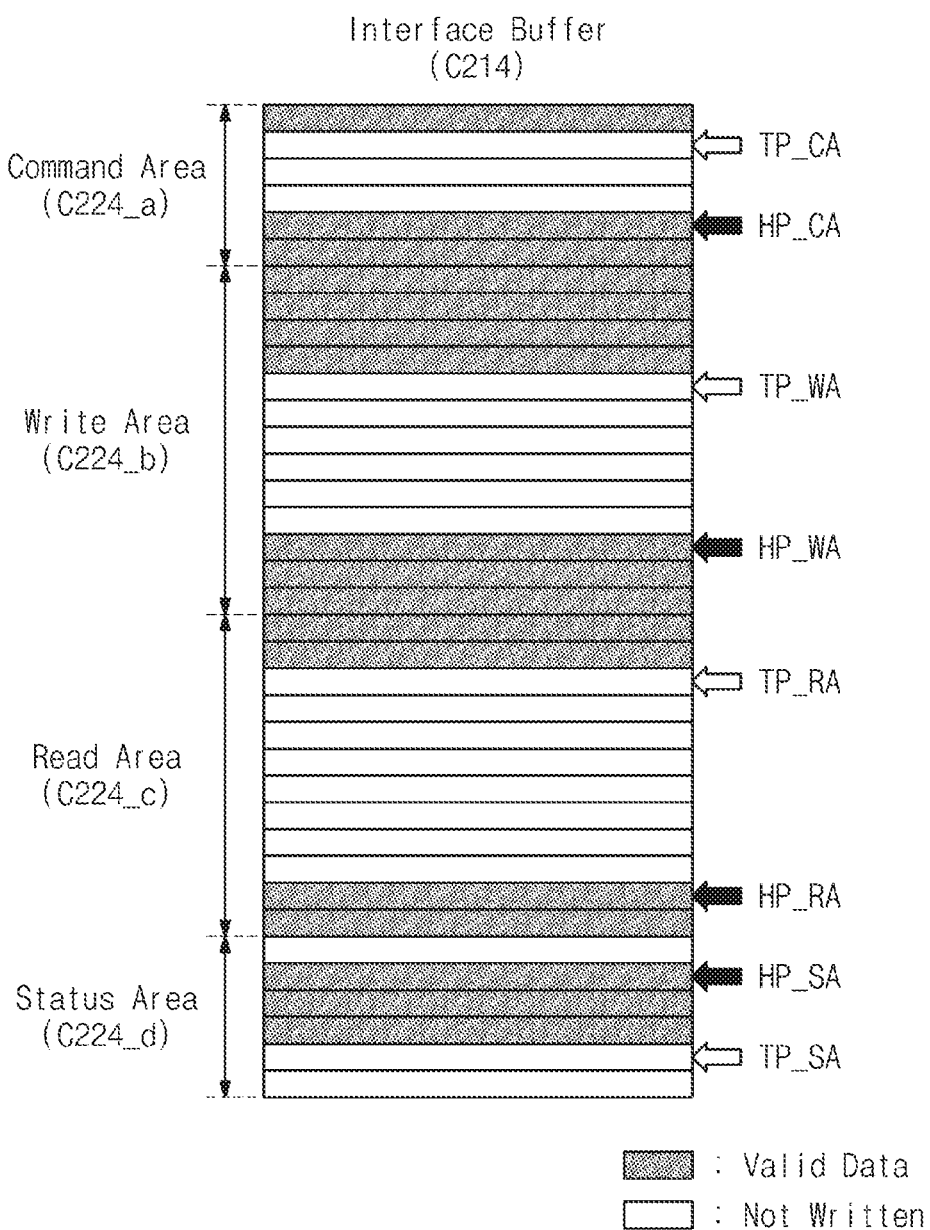
FIG. 26A is a diagram illustrating pointers of an interface buffer for each area, according to an embodiment of the inventive concept.

FIG. 26A is a diagram illustrating pointers of an interface buffer for each area, according to an embodiment of the inventive concept. Referring to FIG. 26A, the interface buffer C214 may be divided according to the use into a plurality of areas. For example, the interface buffer C214 may be logically divided into command and write areas C214_a and C214_b pushed by the processor C100 or at which data is written and read or status areas C214_c and C214_d pushed by the processor C100 or at which data is written.

The command area C214_a may be an area which is pushed by the processor C100 and which the DIMM controller C215 accesses for pop. The processor C100 may write a storage command CMD_N or a storage address ADDR_N at the command area C214_a and may increase a head pointer HP_CA. The DIMM controller C215 may read information about the storage command CMD_N or the storage address ADDR_N written by the processor C100 and may increase a tail pointer TP_CA. At this time, a position of the increased tail pointer TP_CA may be transferred to the processor C100 through the status area C214_d. In this case, the first pointer manager C110 included in the processor C100 may track and manage pointers HP_CA and TP_CA. The first pointer manager C110 may monitor a difference between the pointers HP_CA and TP_CA to determine whether the command area C214_a is writable or at a write-unavailable state.

Like the command area C214_a, the write area C214_b may be an area which is pushed by the processor C100 and which the DIMM controller C215 accesses for pop. The processor C100 may write user data to be stored in the nonvolatile memory C230 at the write area C214_b and may increase a head pointer HP_WA. The DIMM controller C215 may read data written by the processor C100 and may increase a tail pointer TP_WA. At this time, a position of the increased tail pointer TP_WA may be transferred to the processor C100 through the status area C214_d. In this case, the first pointer manager C110 included in the processor C100 may track and manage pointers HP_WA and TP_WA. The first pointer manager C110 may monitor a difference between the pointers HP_WA and TP_WA to determine whether the write area C214_b is writable or at a write-unavailable state.

The read area C214_c may be an area which is pushed by the processor C215 and which is accessed by the processor C100 for pop. The DIMM controller C215 may read data, which the processor C100 requests, from the nonvolatile memory C230, may store the read data in the read area C214_c, and may increase a head pointer HP_RA. The processor C100 may read data store in the read area C214_c and may increase a tail pointer TP_RA. At this time, the second pointer manager C216 of the DIMM controller C215 may track and manage a position of the increased tail pointer TP_RA. The management of pointers of the status area C214_d may be performed the same as the read area C214_c.

Figure 26B:
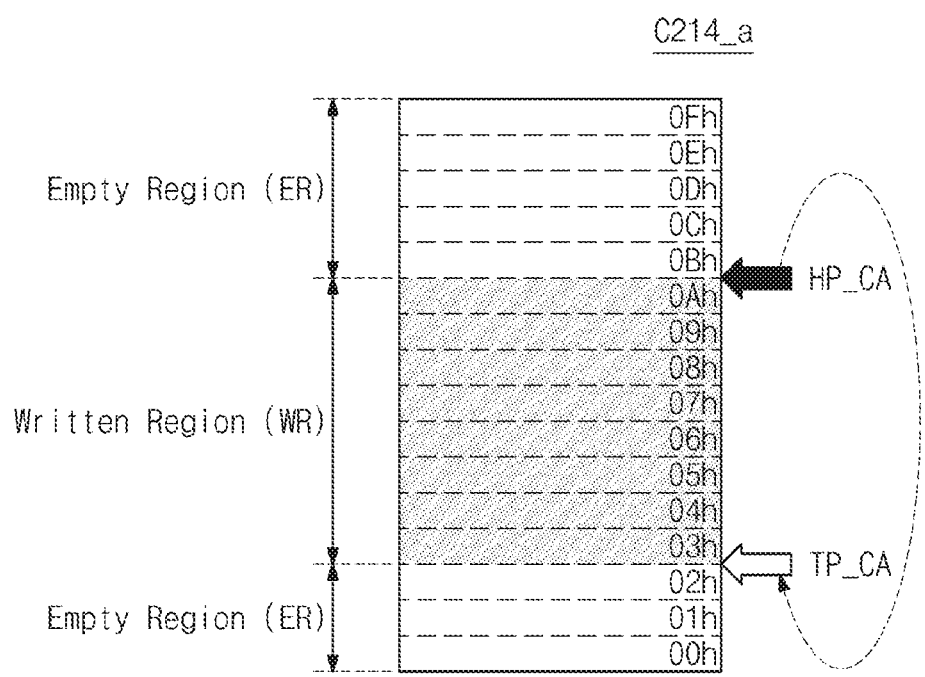
FIG. 26B is a diagram illustrating a structure of a command area of the interface buffer according to an embodiment of the inventive concept.

FIG. 26B is a diagram illustrating a structure of a command area C214_d of the interface buffer according to an embodiment of the inventive concept. Referring to FIG. 26B, the command area C214_a may be managed using circular buffer architecture which has a head pointer HP_CA increasing according to the writing of data at the processor C100 and a tail pointer TP_CA increasing according to reading at the DIMM controller C215.

A first write operation of the processor C100 may be performed at 00h. However, if a data writing operation is performed, a head pointer HP_CA corresponding to a write position may increase. As a data writing operation is continuously performed, the head pointer HP_CA may increase up to 0Fh from 00h. If a head pointer HP_CA increases from 0Fh, a write pointer may return to 00h and may increase. However, a tail pointer TP_CA may increase according to a read request of the DIMM controller C215 to be independent of an increase in the head pointer HP_CA.

An area defined by an address of 03h corresponding to a tail pointer TP_CA and an address of 0Ah corresponding to a head pointer HP_CA may be an area in which data is not read by the DIMM controller C215. Such an area may be referred to as a written region WR. An area defined by an address of 0Bh distinguished by the head pointer HP_CA and an address of 02h distinguished by the tail pointer TP_CA may be an area in which valid data does not exist. Such an area may be referred to as an empty region ER.

In an embodiment, a tail pointer TP_CA may be managed by a configuration (or a component) to write data. That is, as in the command area C214_a of the interface buffer C214, the tail pointer TP_CA may be managed by the processor C100 in the case where the processor C100 writes data (push) and the DIMM controller C215 reads data (pop). Conventionally, control logic for managing a head pointer HP_CA and a tail pointer TP_CA of the interface buffer C214 may be required. However, in the nonvolatile memory module C200 according to an embodiment of the inventive concept, a tail pointer TP may be managed at a component side to write data (push), a head pointer HP may be managed at a component side to read data (pop). Accordingly, a full state or an empty state about a corresponding region of the interface buffer C214 may be automatically monitored, and thus an access to data may be performed or postponed.

Figure 27:
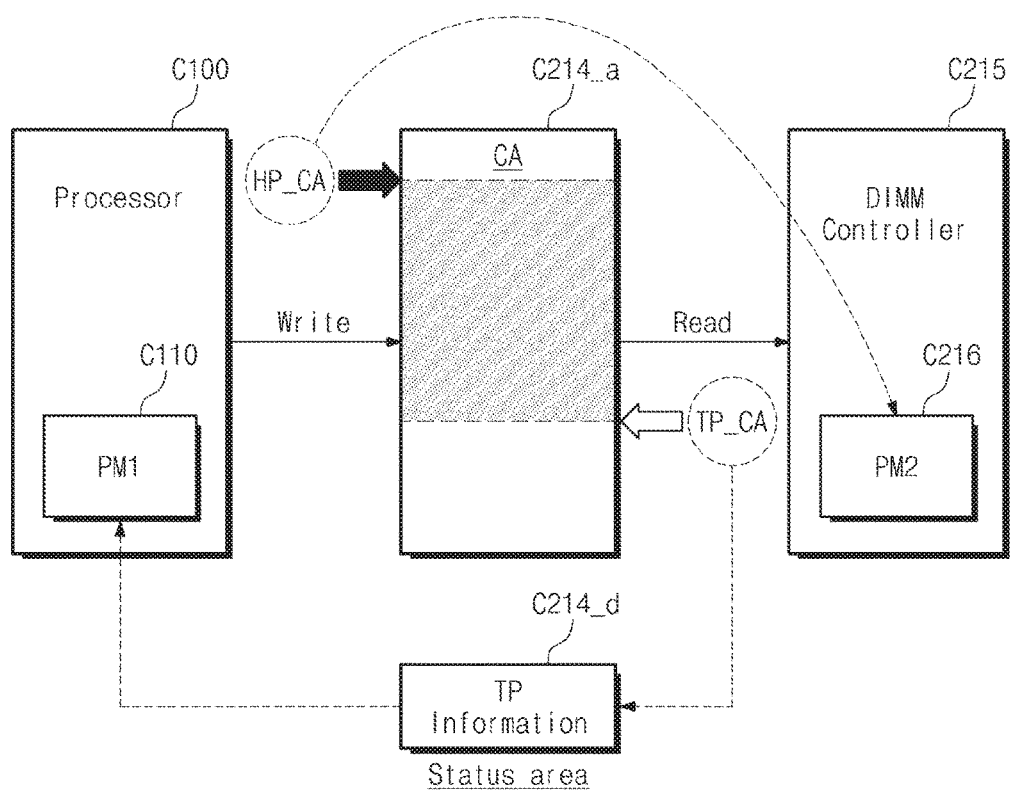
FIG. 27 is a block diagram illustrating a pointer managing method according to an embodiment of the inventive concept.

FIG. 27 is a block diagram illustrating a pointer managing method according to an embodiment of the inventive concept. Features of the inventive concept will be described with reference to FIG. 27 under a condition that a command area C214_a is an area of the interface buffer C214 at which the processor C100 writes data.

The processor C100 may include both information about a header point HP_CA of the command area C214_a and information about a tail pointer TP_CA. That is, the first pointer manager C110 of the processor C100 may store position information of the header pointer HP_CA after writing data at the command area C214_a. However, for the first pointer manager C110 to manage the tail pointer TP_CA, it may need to receive information about a position of the tail pointer TP_CA about the command area C214_a. Position information TP Information about the tail pointer TP_CA may be provided to the processor C100 using the status area C214_d of the interface buffer C214.

For example, address information of the command area C214_a accessed by the buffer controller C214_1 of the interface buffer C214 to the DIMM controller C215 may be provided with tail pointer information TP Information. That is, it may be possible for the buffer controller C214_1 to provide the tail pointer information TP Information through the status area C214_d. The tail pointer information TP Information may be transferred to the processor C100 in a way where the DIMM controller C215 writes read completion information and information about a finally accessed address at the status area C214_d after accessing the command area C214_a. However, a method to provide information about a position of the tail pointer TP_CA to the processor C100 may be variously changed or modified, not limited thereto.

The first pointer manager C110 may determine a status of the command area C214_a with reference to an internally managed head pointer HP_CA and tail pointer information TP Information stored in the status area C214_d. That is, whether the status area C214_d is full or empty may be determined according to a result of detecting a difference between the head pointer HP_CA and the tail pointer TP_CA. Whether to progress a write operation may be determined with reference to the determination result.

The second pointer manager C216 of the DIMM controller C215 may manage a head pointer of the command area C214_a. The second pointer manager C216 may store a position of the tail pointer TP_CA about the command area C214_a. For example, after a write operation is performed with respect to the command area C214a, the second pointer manager C216 may receive the head pointer HP_CA from the processor C110 or the buffer controller C214_1. For example, the head pointer HP_CA may be received from a status register included in the buffer controller C214_1. Alternatively, the second pointer manager C216 may receive a position of the head pointer HP_CA from the processor C100 through various paths.

The second pointer manager C216 may determine a status of the interface buffer C214 or a full state or an empty state of the command area C214_a, with reference to a position of the tail pointer TP_CA and a position of the head pointer HP_CA. An access of the DIMM controller C215 to the interface buffer C214 may be controlled according to a status of the command area C214_a.

An embodiment of the inventive concept is exemplified as the tail pointer TP_CA about the command area C214_a of the interface buffer C214 is managed by the processor C100 and the head pointer HP_CA is managed by the DIMM controller C215. With the above-described pointer managing method, it may be possible to remove a pointer managing function of the interface buffer C214, thereby making the nonvolatile memory module C200 thin and markedly reducing involvement thereof.

Figure 28:
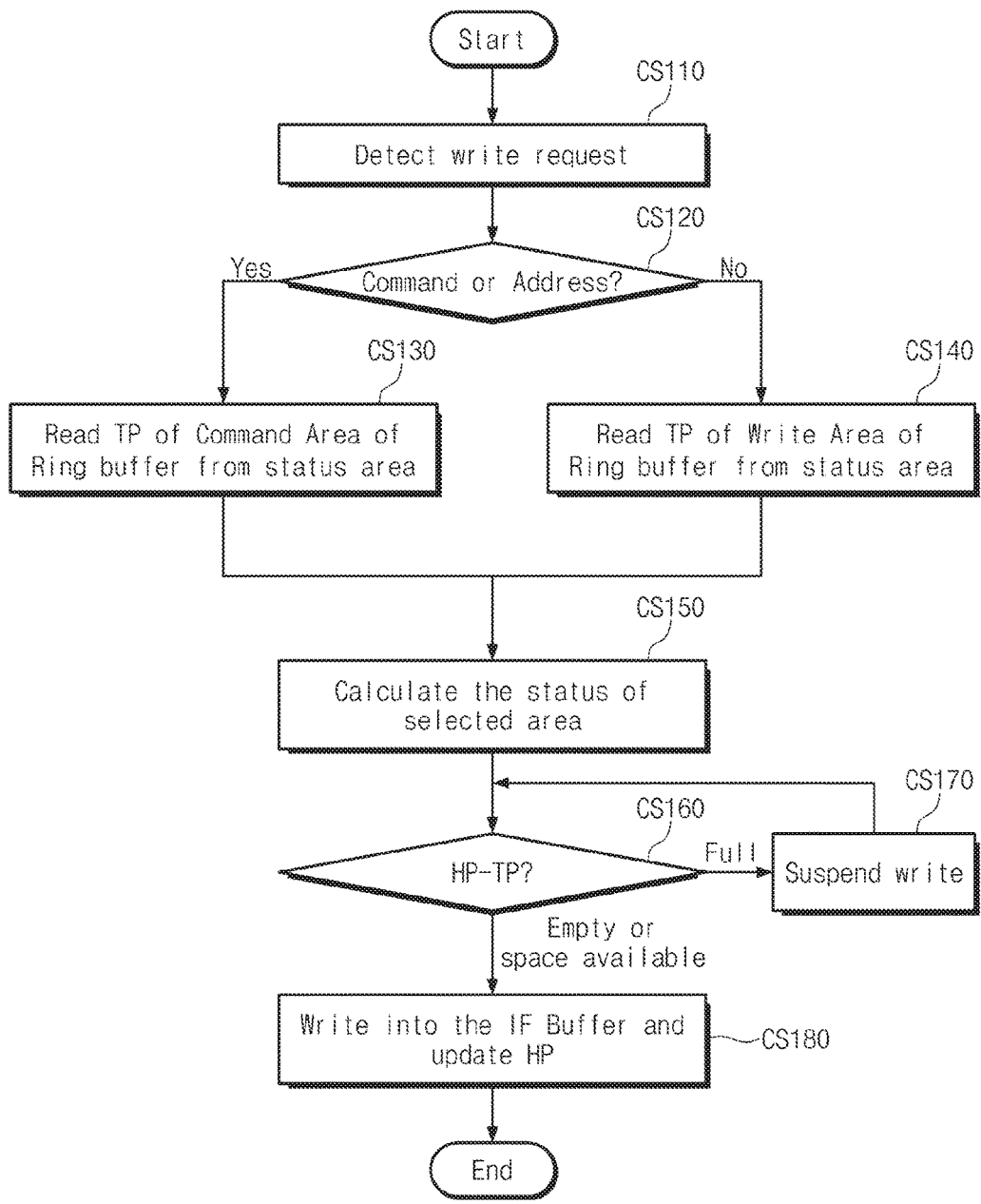
FIG. 28 is a flow chart illustrating a tail pointer managing method of a processor described in FIG. 27.

FIG. 28 is a flow chart illustrating a tail pointer managing method of a processor described in FIG. 27. Referring to FIG. 28, the processor C100 may be provided with position information about a tail pointer through the status area C214_d of the interface buffer C214. The processor C100 may determine a status about a command area of the interface buffer C214 with reference to the provided information.

In step CS110, the processor C100 may detect a data write request about the nonvolatile memory module C200. If a write request occurs at the processor C100, the processor C100 may be able to detect the size of write-requested data. For example, the write-requested data may be a command or an address or may be data to be stored in the nonvolatile memory module C200.

In step CS120, the processor C100 may determine whether the write request is associated with any data. For example, the processor C100 may determine whether the write request corresponds to a command or an address to be written at the command area C214_a or to data to be written at the write area C214_b. If the write request corresponds to a command or an address (Yes), the procedure may proceed to step CS130. If the write request corresponds to data (No), the procedure may proceed to step CS140.

In step CS130, the processor C100 may read the tail pointer TP of the command area C214_a. For example, the processor C100 may read position information of the tail pointer TP of the command area C214_a written at the status area C214_d. However, a method in which the processor C100 obtains position information of the tail pointer of the command area C214_a may not be limited thereto.

In step CS140, the processor C100 may read the tail pointer TP of the write area C214_b. For example, the processor C100 may read position information of the tail pointer TP of the write area C214_b written at the status area C214_d. However, a method in which the processor C100 obtains position information of the tail pointer of the write area C214_b may not be limited thereto.

In step CS150, the first pointer manager C110 of the processor C100 may calculate a status about an area of the interface buffer C214 write-requested. That is, the first pointer manager C110 may determine whether a corresponding area is at a write-available state, with reference to positions of the head pointer HP and the tail pointer TP. The head pointer HP may be data which the processor C100 retains in advance, and the tail pointer TP may be data read from the status area C214_d.

In step CS160, the first pointer manager C110 may calculate whether the command area C214_a or the write area C214_b is full or at a write-available state. In the case where a difference between a head pointer HP and a tail pointer TP is the same as the size of a corresponding area or greater than or equal to a specific size, a status of the corresponding area may be determined as being full. In this case, the procedure may proceed to step CS170. In contrast, in the case where a difference between a head pointer HP and a tail pointer TP is "0" or smaller than the specific size, a status of the corresponding area may be determined as being space-available or empty. In this case, the procedure may proceed to step CS180.

In step CS170, the processor C100 may suspend data writing with reference to the calculation result of the first pointer manager C110. The processor C100 may wait until a status of the corresponding area is space-available.

In step CS180, the processor C100 may write write-requested data at the corresponding area of the interface buffer C214. If the data writing is completed, the processor C100 may update the head pointer HP.

An embodiment of the inventive concept is exemplified as the first tail pointer C110 manages a tail pointer with respect to areas C214_a and C214_c of the interface buffer C214 where the processor C100 writes data. This may make it possible to reduce a burden in managing points at the nonvolatile memory module C200.

Figure 29:
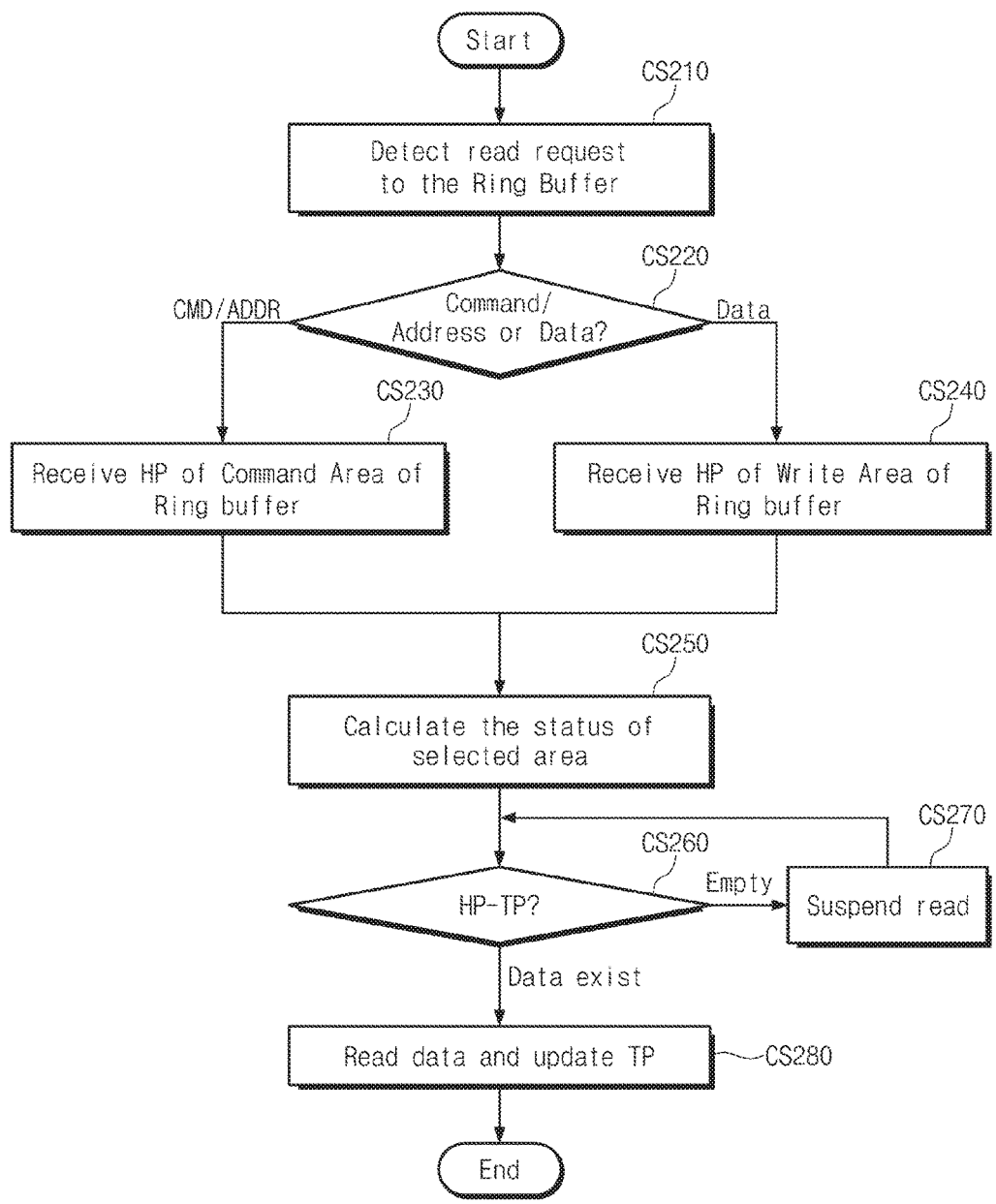
FIG. 29 is a flow chart of a method for managing a head pointer of an interface buffer of a DIMM controller.

FIG. 29 is a flow chart illustrating a method for managing a head pointer of an interface buffer of a DIMM controller, a method in which the second pointer manager C216 manages pointers about an area of the interface buffer C214 at which the processor C100 writes data and from which the DIMM controller C215 reads data.

In step CS120, the DIMM controller C215 may receive a read request about the interface buffer C214. For example, the DIMM controller C215 may receive a read request about a command or an address for accessing the nonvolatile memory C230 or the buffer memory C250 or a read request for reading data to be stored in the nonvolatile memory C230 or the buffer memory C250 from the interface buffer C214. Such a read request may be issued by an internal control operation of the DIMM controller C215.

In step CS220, the processor C215 may determine whether the read request is associated with any data. For example, the DIMM controller C215 may determine whether the read request is a read request about a command/address stored in the command area C214_a or a read request about data stored in the write area C214_b. If the read request corresponds to a command/address (Yes), the procedure may proceed to step CS230. If the read request corresponds to data (No), the procedure may proceed to step CS240.

In step CS230, the DIMM controller C215 may read the head pointer HP about the command area C214_a. For example, the DIMM controller C215 may receive information about the command area C214_a of the interface buffer C214 provided from the buffer controller C214_1. Alternatively, the DIMM controller C215 may read position information of the head pointer HP of the command area C214_a written by the processor C100 at the status area C214_d. However, a method in which the DIMM controller C215 obtains position information of the head pointer of the command area C214_a may not be limited thereto.

In step CS240, the DIMM controller C215 may read the head pointer HP of the write area C214_b. For example, the DIMM controller C215 may receive information about the write area C214_b of the interface buffer C214 provided from the buffer controller C214_1. Alternatively, the DIMM controller C215 may read position information of the head pointer HP of the write area C214_b written by the processor C100 at the status area C214_d. However, a method in which the DIMM controller C215 obtains position information of the head pointer of the write area C214_b may not be limited thereto.

In step CS250, the second pointer manager C216 of the DIMM controller C215 may calculate a status about the command area C214_a or the write area C214_b of the interface buffer C214. That is, the second pointer manager C216 may determine whether an access to a corresponding area is possible, with reference to the received head pointer HP of the command area C214_a or the write area C214_b and a position of an internally retained tail pointer. The head pointer HP may be a value provided from the processor C100 or the buffer controller C214_1, the tail pointer TP may be a value determined by the DIMM controller C215.

In step CS260, the second pointer manager C216 may calculate whether the command area C214_a or the write area C214_b is full or at a write-available state. In the case where a difference between a head pointer HP and a tail pointer TP is "0" or smaller than a specific size, a status of the corresponding area may be determined as being empty. In this case, the procedure may proceed to step CS270. In contrast, in the case where a difference between a head pointer HP and a tail pointer TP is greater than or equal to the specific value, a status of the corresponding area may be determined as data to be read exists. In this case, the procedure may proceed to step CS280.

In step CS270, the second pointer manager C216 of the DIMM controller C215 may suspend reading data about the command area C214_a or the write area C214_b based on the calculation result of the second pointer manager C216. The DIMM controller C215 may wait until the data to be read is written at a corresponding area.

In step CS280, the DIMM controller C215 may read read-requested data from the corresponding area of the interface buffer C214. If the data reading is completed, the DIMM controller C215 may update the head pointer HP used to read data.

An embodiment of the inventive concept is exemplified as the second pointer manager C216 manages a head pointer with respect to areas C214_a and C214_b of the interface buffer C214 where the DIMM controller reads data. This may make it possible to reduce a burden in managing points at the physical layer C213.

Figure 30:
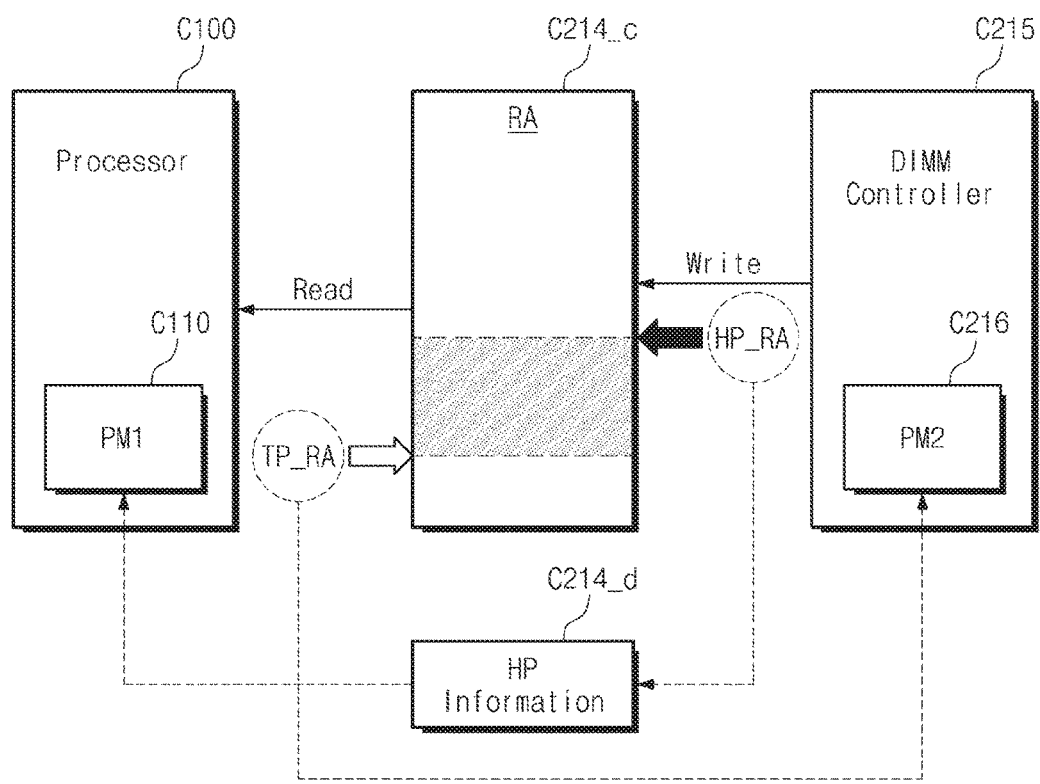
FIG. 30 is a block diagram illustrating a pointer managing method according to another embodiment of the inventive concept.

FIG. 30 is a block diagram illustrating a pointer managing method according to another embodiment of the inventive concept. Features of the inventive concept will be described with reference to FIG. 30 under condition that a read area C214_c is an area of the interface buffer C214 at which the processor C100 writes data. However, it may be understood that a pointer managing method to be described below is applied to the status area C214_d.

The processor C100 may detect and retain a position of a tail pointer TP_RA of the read area C214_c in real time. The reason may be that the processor C100 increases a tail pointer TP_RA after performing a read operation with respect to the read area C214_c. In addition, the processor C100 may confirm information about a position of a head pointer HP_RA of the read area C214_c through head pointer information HP Information stored in the status area C214_d. That is, after writing data at the read area C214_c, the DIMM controller C215 may inform the processor C100 of head pointer information HP Information, information about a position of the head pointer HP_RA about the read area C214_c. For example, the head pointer information HPI may be written by the DIMM controller C215 at the status area C214_d and may be fetched by the processor C100. The head pointer HP_RA transferred to the first pointer manager C110 of the processor C100 may be compared with the tail pointer TP_RA and may be used as information for determining a status of the read area C214_c.

The second pointer manager C216 of the DIMM controller C215 may manage the tail pointer TP_RA of the read area C214_c. The second pointer manager C216 may store and retain a position of the tail pointer TP_RA after a write operation of the DIMM controller C215 is performed with respect to the read area C214_c. In addition, the second pointer manager C216 may receive position information of the tail pointer TP_RA from the processor C100 after the processor C100 accesses the read area C214_c. For example, information about a position of the tail pointer TP_RA may be written by the processor C100 at the status area C214_d and may be fetched by the DIMM controller C215. Alternatively, information about a position of the tail pointer TP_RA may be obtained from address status information of the buffer controller C214_1. The second pointer manager C216 may receive a position of the tail pointer TP_RA of the read area C214_c from the processor C100 through various paths.

The second pointer manager C216 may determine a full state or an empty state of the read area C214_c with reference to a position of the tail pointer TP_RA and a position of the head pointer HP_RA. An access of the DIMM controller C215 to the interface buffer C214 may be controlled according to a status of the read area C214_c.

An embodiment of the inventive concept is exemplified as the head pointer HP_RA about the read area C214_c of the interface buffer C214 is managed by the first pointer manager C110 and the tail pointer TP_RA of the read area C214_c is managed by the second pointer manager C216 of the DIMM controller C215. With the above-described pointer managing method, it may be possible to remove a pointer managing function of the interface buffer C214, thereby making the nonvolatile memory module C200 thin and markedly reducing involvement thereof. A method for managing the head pointer HP_RA and the tail pointer TP_RA of the read area C214_c is exemplified, but it may be understood that a head pointer HP_SA and a tail pointer TP_SA of the status area C214_d is managed in the same manner as described above.

Figure 31:
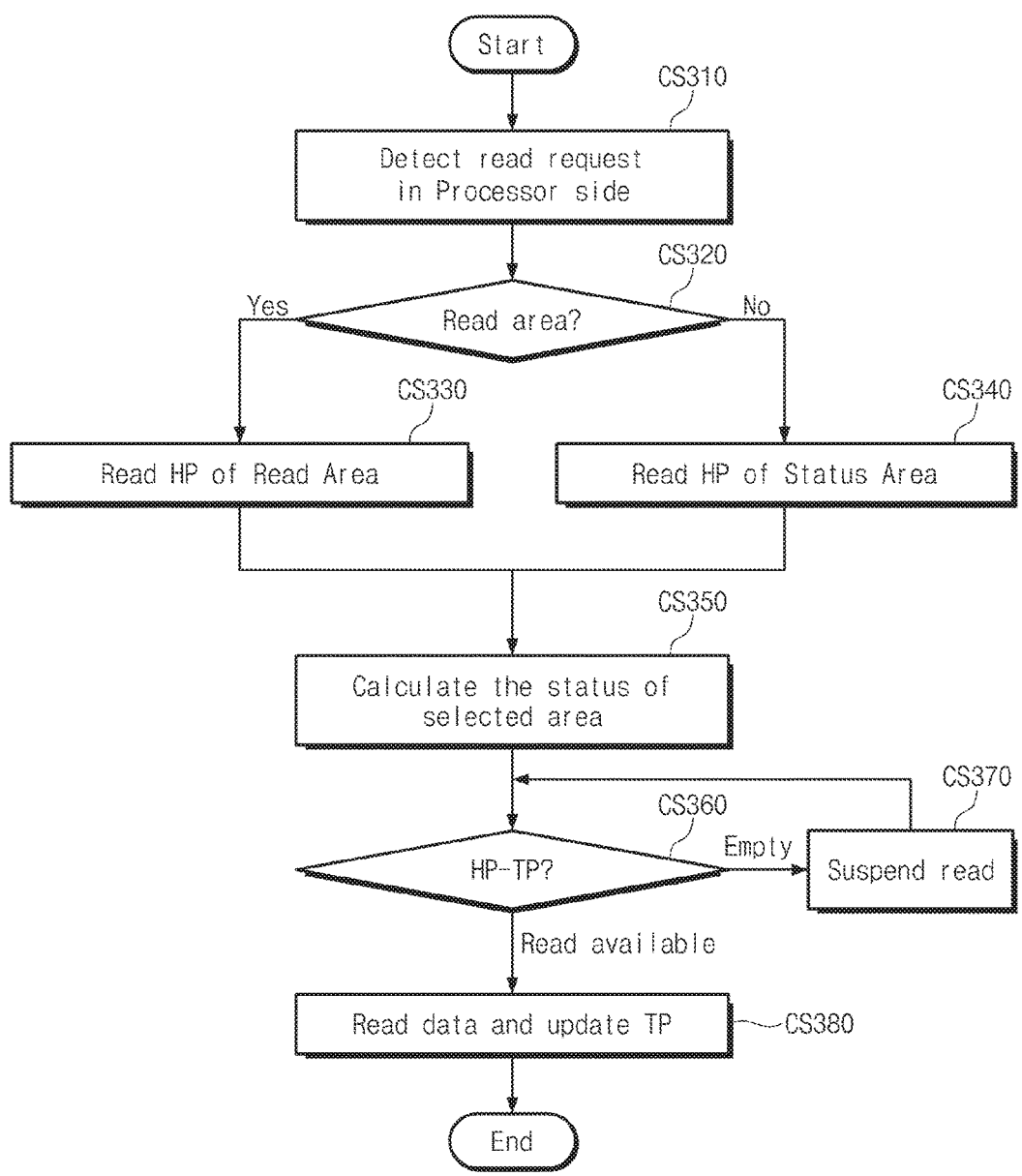
FIG. 31 is a flow chart illustrating a tail pointer managing method of a processor described in FIG. 30.

FIG. 31 is a flow chart illustrating a tail pointer managing method of a processor described in FIG. 30. Referring to FIG. 30, the processor C100 may be provided with position information about a head pointer HP about a read area C214_c or the status area C214_d through the status area C214_d of the interface buffer C214. The processor C100 may determine a buffer status about the read area C214_c or the status area C214_d of the interface buffer C214 with reference to the provided information.

In step CS310, the processor C100 may detect whether a read request about the nonvolatile memory module C200 exists. A read request may be issued in various cases. For example, a read request may be issued in the case where there is received status information indicating that data which the processor C100 requests from the nonvolatile memory module C200 is stored in the read area. Alternatively, a read request may be a periodically issued read request about the status area C214_d of the interface buffer C214.

In step CS320, the processor C100 may determine whether the read request corresponds to any area of the interface buffer C214. For example, the processor C100 may determine whether the read request is associated with data stored in the read area C214_c or information stored in the status area C214_d. If the read request corresponds to the read area C214_c (Yes), the procedure may proceed to step CS330. If the read request corresponds to status data (No), the procedure may proceed to step CS340.

In step CS330, the processor C100 may read the head pointer HP of the read area C214_c. For example, the processor C100 may read position information of the head pointer HP of the read area C214_c written at the status area C214_d. However, a method in which the processor C100 obtains a position of the head pointer HP of the read area C214_c may not be limited thereto.

In step CS340, the processor C100 may read the head pointer HP of the status area C214_d. For example, the processor C100 may read position information of the head pointer HP of the status area C214_d written at the status area C214_d. However, a method in which the processor C100 obtains position information of the head pointer HP of the status area C214_d may not be limited thereto.

In step CS350, the first pointer manager C110 of the processor C100 may calculate a status about an area of the interface buffer C214 read-requested. That is, the first pointer manager C110 may determine whether a status of a corresponding area is a status allowing an access to a read-requested area, with reference to positions of the head pointer HP and the tail pointer TP. The tail pointer TP may be data which the processor C100 retains in advance, and the head pointer HP may be data read from the status area C214_d.

In step CS360, the first pointer manager C110 may calculate whether the read area C214_c or the status area C214_d is empty or at a data-readable state. In contrast, in the case where a difference between the head pointer HP and the tail pointer TP is "0" or smaller than the specific size, a status of the corresponding area may be determined as being empty (read-unavailable). In this case, the procedure may proceed to step CS370. In the case where a difference between the head pointer HP and the tail pointer TP is the same as the size of the read area C214_c or greater than or equal to a specific size, a status of the corresponding area may be determined as being read-available. In this case, the procedure may proceed to step CS380.

In step CS370, the processor C100 may suspend data reading with reference to the calculation result of the first pointer manager C110. The processor C100 may wait until a status of the corresponding area is space-available.

In step CS380, the processor C100 may read read-requested data from the corresponding area of the interface buffer C214. If the data reading is completed, the processor C100 may update the tail pointer TP.

An embodiment of the inventive concept is exemplified as the first tail pointer C110 manages a head pointer with respect to areas C214_c and C214_d of the interface buffer C214 from which the processor C100 reads data. This may make it possible to reduce a burden in managing points at the nonvolatile memory module C200.

Figure 32:
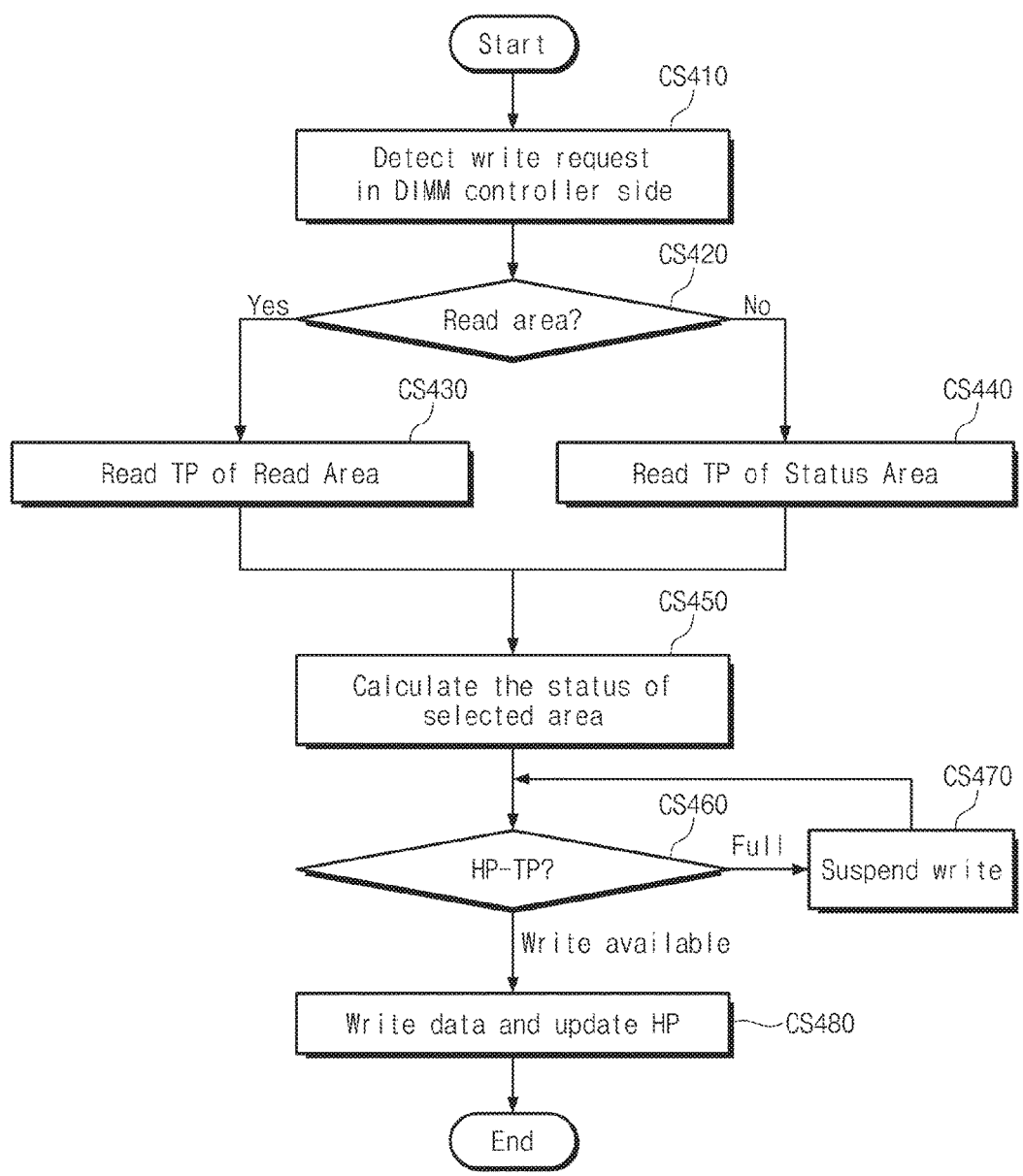
FIG. 32 is a flow chart of a method for managing a head pointer of a ring buffer of a DIMM controller.

FIG. 32 is a flow chart illustrating a method for managing a head pointer of a ring buffer of a DIMM controller, a method in which the second pointer manager C216 manages pointers about an area of the interface buffer C214 at which the DIMM controller C215 writes data and from which the processor C100 reads data.

In step CS410, the DIMM controller C215 may detect whether a write request about the interface buffer C214 exists. A write request may be issued in various cases. For example, a write request may be issued in the case where data read from the nonvolatile memory C230 is to be stored in the read area C214_c of the interface buffer C214.

In step CS420, the DIMM controller C215 may determine whether write-requested data is data to be stored in any area of the interface buffer C214. For example, the DIMM controller C215 may determine whether the write-requested data is data to be stored in the read area C214_c or data to be stored in the status area C214_d. If the write-requested data is data to be stored in the read area C214_c (Yes), the procedure may proceed to step CS430. If the write-requested data is data to be stored in the status area C214_d (Yes), the procedure may proceed to step CS440.

In step CS430, the DIMM controller C215 may read a tail pointer TP of the read area C214_c. For example, the DIMM controller C215 may receive information about the read area C214_c of the interface buffer C214 provided from the buffer controller C214_1. Alternatively, the DIMM controller C215 may read position information of a tail pointer TP of the read area C214_c written by the processor C100 at the status area C214_d. However, a method in which the DIMM controller C215 obtains position information of the tail pointer of the read area C214_c may not be limited thereto.

In step CS440, the DIMM controller C215 may read a tail pointer TP of the status area C214_d. For example, the DIMM controller C215 may receive information about the read area C214_c of the interface buffer C214 provided from the buffer controller C214_1. Alternatively, the DIMM controller C215 may read position information of the tail pointer TP of the status area C214_d written by the processor C100 at the status area C214_d. However, a method in which the DIMM controller C215 obtains position information of the tail pointer of the status area C214_d may not be limited thereto.

In step CS450, the second pointer manager C216 of the DIMM controller C215 may calculate a buffer status about the read area C214_c or the status area C214_d of the interface buffer C214. That is, the second pointer manager C216 may determine whether an access to a corresponding area is possible, with reference to the received tail pointer TP of the read area C214_c or the status area C214_d and a position of an internally retained head pointer HP. The tail pointer TP may be a value provided from the processor C100 or the buffer controller C214_1, the here HP may be a value determined by the DIMM controller C215.

In step CS460, the second pointer manager C216 may calculate whether the read area C214_c or the status area C214_d is full or at a write-available state. In contrast, in the case where a difference between the head pointer HP and the tail pointer TP is equal to the size of a corresponding size or greater than the specific size, a status of the corresponding area may be determined as being full (write-unavailable). In this case, the procedure may proceed to step CS470. In the case where a difference between the head pointer HP and the tail pointer TP is "0" or smaller than the specific size, a status of the corresponding area may be determined as being write-available. In this case, the procedure may proceed to step CS480.

In step CS470, the DIMM controller C215 may suspend data writing about the read area C214_c or the status area C214_d based on the calculation result of the second pointer manager C216. The DIMM controller C215 may wait until a status of the corresponding area is write-available.

In step CS480, the DIMM controller C215 may write write-requested data at the corresponding area of the interface buffer C214. If the data writing is completed, the DIMM controller C215 may update the head pointer HP of an area where data is written.

An embodiment of the inventive concept is exemplified as the second pointer manager C216 manages a tail pointer with respect to areas C214_c and C214_d of the interface buffer C214 where the DIMM controller C215 writes data. This may make it possible to reduce a burden in managing points at the physical layer C213.

D. Validity Guarantee on Data in RAM at Power-off

Figure 33:
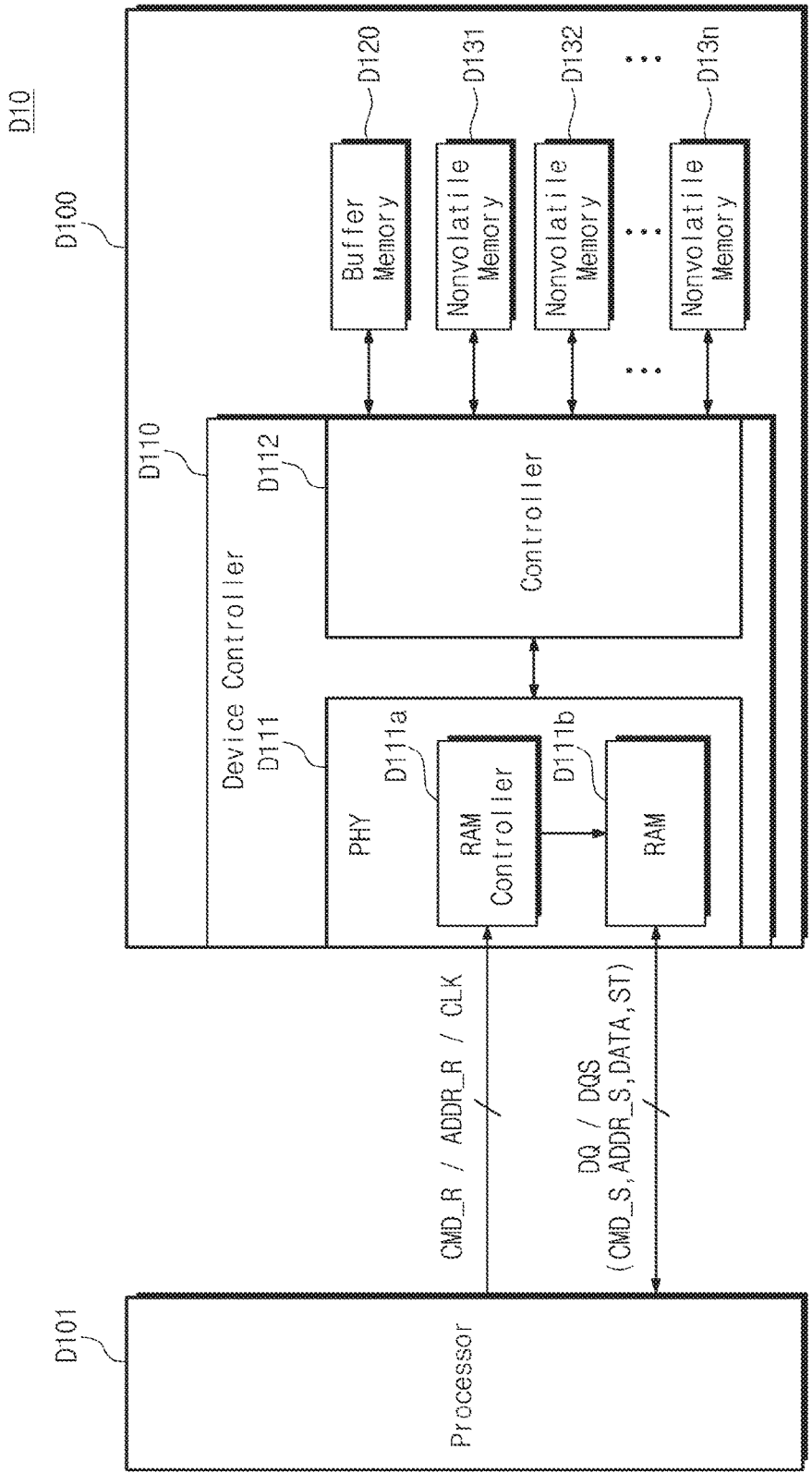
FIG. 33 is a block diagram illustrating a user system according to an embodiment of the inventive concept.
Figure 34:
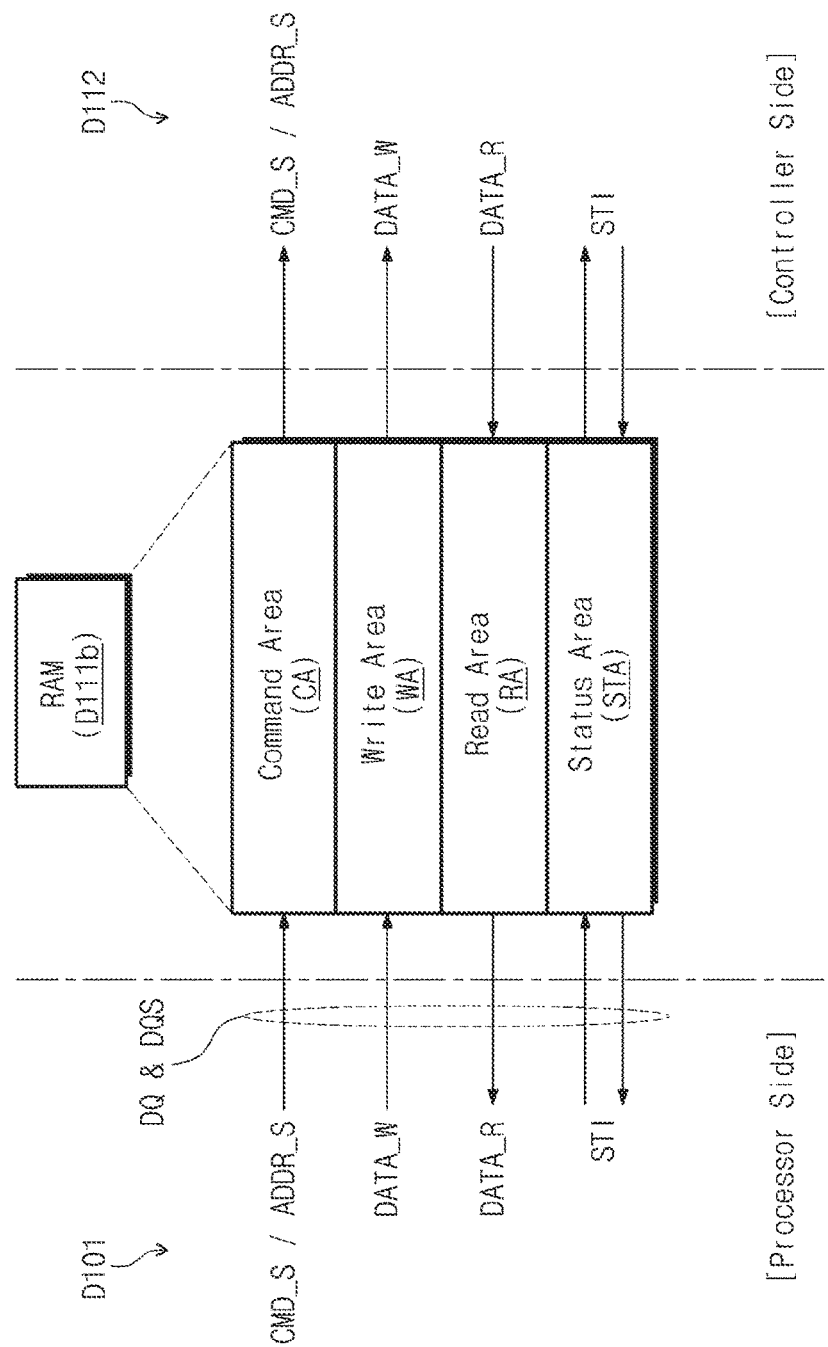
FIG. 34 is a diagram for describing a RAM of FIG. 33.

FIG. 33 is a block diagram illustrating a user system according to an embodiment of the inventive concept. FIG. 34 is a diagram for describing a RAM of FIG. 33. Referring to FIGS. 33 and 34, a user system D10 may include a processor D101 and a nonvolatile memory system D100. The processor D101 may process data or may control components included in the user system D100. For example, the processor D101 may drive various operating systems and may execute various applications on an operating system. The processor D101 may write data at the nonvolatile memory system D100 or may read data stored in the nonvolatile memory system D100.

In an embodiment, the processor D101 may provide the nonvolatile memory system D100 with a RAM command CMD_R, a RAM address ADDR_R, and a clock CK. The processor D101 may exchange a data signal DQ and a data strobe signal DQS with the nonvolatile memory system D100. In an embodiment, the data signal DQ may be a signal which includes a storage command CMD_S, a storage address ADDR_S, data, and state information STI.

In an embodiment, the RAM command CMD_R and the RAM address ADDR_R may be a command and an address which are used to control a RAM D111b included in a physical layer D111 of the nonvolatile memory system D100. The storage command CMD_S and the storage address ADDR_S may be a command and an address which are used to control a plurality of nonvolatile memory devices D131 to D13n included in the nonvolatile memory system D100.

In an embodiment, the RAM command CMD_R, the RAM address ADDR_R, the clock CK, the data signal DQ, and the data strobe signal DQS which are exchanged between the processor D101 and the nonvolatile memory system D100 may comply with a protocol which is defined by an interface between the processor D101 and the nonvolatile memory system D100. In an embodiment, an interface between the processor D101 and the nonvolatile memory system D100 may be based on a double data rate (DDR) interface. For example, the RAM command CMD_R, the RAM address ADDR_R, and the clock CK may be signals in compliance with the protocol defined by the DDR interface.

However, the scope and spirit of the inventive concept may not be limited thereto. for example, the interface between the processor D101 and the nonvolatile memory system D100 may include at least one of DDR, DDR2, DDR3, DDR4, low power DDR (LPDDR), universal serial bus (USB), multimedia card (MMC), embedded MMC, peripheral component interconnection (PCI), PCI-express (PCI-E), advanced technology attachment (ATA), serial-ATA, parallel-ATA, small computer small interface (SCSI), enhanced small disk interface (ESDI), integrated drive electronics (IDE), firewire, universal flash storage (UFS), nonvolatile memory express (NVMe), or the like.

The nonvolatile memory system D100 may include a device controller D110, a buffer memory D120, the plurality of nonvolatile memory devices D131 to D13n, and an auxiliary power device (not shown). In an embodiment, the nonvolatile memory system D100 may store data, which is received from the processor D101 through the data signal DQ and the data strobe signal DQS, in at least one of the nonvolatile memory devices D131 to D13n in response to the storage command CMD_S and the storage address ADDR_S received from the processor D101 through the data signal DQ and the data strobe signal DQS. Alternatively, the nonvolatile memory system D100 may provide the processor D101 with data, stored in at least one of the nonvolatile memory devices D131 to D13n, through the data signal DQ and the data strobe signal DQS in response to the storage command CMD_S and the storage address ADDR_S received from the processor D101 through the data signal DQ and the data strobe signal DQS.

In an embodiment, although not shown, the nonvolatile memory system D100 may have the form of a dual in-line memory module (DIMM) and may be mounted on a DIMM socket electrically or directly connected with the processor D101.

The device controller D110 may include a physical layer (PHY) D111 and a controller D112. The physical layer D111 may include a RAM controller D111a and a RAM D111b. The physical layer D111 may be electrically directly connected with the processor D101 and may provide an interface between the processor D101 and the controller D112.

In response to the RAM command CMD_R, the RAM address ADDR_R, and the clock CK received from the processor D101, the RAM controller D111a may store in the RAM D111b information or data received through the data signal DQ and the data strobe signal DQS or may provide information or data stored in the RAM D111b to the processor D101 through the data signal DQ and the data strobe signal DQS. In an embodiment, the RAM D111b may include a multi-port RAM such as dual port SRAM or a shared RAM. That is, the processor D101 or the controller D112 may access the RAM D111b through independent ports or paths, respectively.

In an embodiment, as illustrated in FIG. 34, the RAM D111b may include a command area CA, a write area WA, a read area RA, and a status area SA. Each of the command area CA, the write area WA, the read area RA, and the status area SA may be selected according to the RAM command CMD_R, the RAM address ADDR_R, and the clock CK which are received from the processor D101.

The command area CA of the RAM D111b may store the storage command CMD_S which is received from the processor D101 through the data signal DQ and the data strobe signal DQS, under control of the RAM controller D111a. The controller D112 may read the storage command CMD_S stored in the command area CA of the RAM D111b. In an embodiment, the storage command CMD_S may include the storage address ADDR_S, and the storage command CMD_S and the storage address ADDR_S may be stored in the command area CA.

The write area WA of the RAM D111b may store write data DATA_W which is received through the data signal DQ and the data strobe signal DQS, under control of the RAM controller D111a. The controller D111b may read write data DATA_W stored in the write area WA of the RAM D111b.

The read area RA of the RAM D111b may store read data DATA_R under control of the controller D112. The read area RA of the RAM D111b may be provided to the processor D101 through the data signal DQ and the data strobe signal DQS.

The status area STA of the RAM D111b may store the status information STI received from the processor D101 through the data signal DQ and the data strobe signal DQS or may transmit the stored status information STI to the processor D101. Under control of the controller D112, the status area STA of the RAM D111b may provide the controller D112 with the stored status information STI or may store the status information STI received from the controller D112.

The controller D112 may communicate with the physical layer D111. The controller D112 may control the buffer memory D120 and the nonvolatile memory devices D131 to D13n, respectively. In the case where the storage command CMD_S is written in the RAM D111b of the physical layer D111, the controller D112 may perform an operation corresponding to the storage command CMD_S written in the RAM D111b. For example, in the case where the storage command CMD_S stored in the RAM D111b is a write command, the controller D112 may read write data DATA_W written in the write area WA of the RAM D111b and may program the read write data DATA_W in at least one of the nonvolatile memory devices D131 to D13n. In the case where the storage command CMD_S stored in the RAM D111b is a read command, the controller D112 may read data, corresponding to the storage address ADDR_S, from the nonvolatile memory devices D131 to D13n and may write the read data at the read area RA of the RAM D111b as read data DATA_W. In an embodiment, after the write operation and the read operation are completed, the controller D112 may write status information STI, indicating that the operation is completed, at the status area STA.

Although not shown, the controller D112 may access the RAM D111b through a specific system bus or an internal system bus. Although not shown, the controller D112 may further include hardware or software components such as a scrambler, a data buffer, a flash translation layer, and the like. The controller D112 may descramble data read from the RAM D111b through the scrambler or may scramble data to be written at the RAM D111b. The controller D112 may temporarily store data read from the RAM D111b in the data buffer or may temporarily store data read from the nonvolatile memory devices D131 to D13n in the data buffer.

The controller D112 may perform an address translation operation through the flash translation layer. For example, the storage address ADDR_S may be a logical address. The controller D112 may convert a storage address ADDRS received from the processor D101 through the flash translation layer into a physical address of the nonvolatile memory devices D131 to D13n. In an embodiment, a physical location where write data DATA_W is to be stored or a physical location where read data DATA_R is to be stored may be determined according to the address translation operation. In an embodiment, the physical location may indicate a physical address about the nonvolatile memory devices D131 to D13n.

In an embodiment, the controller D112 may packetize a storage command CMD_S or data stored in the RAM D111b. For example, the controller D112 may read write data DATA_W stored in the write area DQ of the RAM D111b, may packetize the write data DATA_W thus read, and may store the packetized data in the nonvolatile memory devices D131 to D13n or temporarily in the data buffer.

The buffer memory D120 may be used as a working memory, a buffer memory, or a cache memory of the device controller D110. The buffer memory D120 may include various information required to operate the nonvolatile memory system D100. In an embodiment, the buffer memory D120 may include data for managing the nonvolatile memory devices D131 o D13n. For example, the buffer memory D120 may include a mapping table between a physical address of the nonvolatile memory devices D131 to D13n and the nonvolatile address ADDR_S received from the processor D101 through the data signal DQ and the data strobe signal DQS. In an embodiment, the buffer memory D120 may include random access memories such as DRAM, SRAM, PRAM, MRAM, RRAM, FeRAM, and the like.

The nonvolatile memory devices D13n may be connected with the device controller D110 through a plurality of channels CH1 to CHn. Each of the nonvolatile memory devices D131 to D13n may store or output data under control of the device controller D110. Each of the nonvolatile memory devices D131 to D13n may be implemented with nonvolatile memory elements such as electrically erasable and programmable ROM (EEPROM), NAND flash memory, NOR flash memory, phase-change RAM (PRAM), resistive RAM (ReRAM), ferroelectric RAM (FRAM), spin-torque magnetic RAM (STT-MRAM), and the like. For descriptive convenience, it may be assumed that each of the nonvolatile memory devices D131 to D13n is a NAND flash memory.

As described above, the nonvolatile memory system D100 may transmit and receive the storage command CMD_S, data, the storage address ADDR_S, and the like through the RAM D111b. In an embodiment, as described above, the RAM D111b may be a volatile memory such as an SRAM. That is, in the case where a power of the user system D10 is interrupted (or in the case where sudden power-off (SPO) occurs), the storage command CMD_S, data, and status information STI stored in the RAM D111*b* may be lost. The nonvolatile memory system D100 according to an embodiment of the inventive concept may detect a sudden power-off situation and may flush data of the RAM D111*b* into the nonvolatile memory devices D131 to D13*n*. In this case, the nonvolatile memory system D100 may determine validity of data stored in the RAM D111*b* and may selectively flush data of the RAM D111*b* into the nonvolatile memory devices D131 to D13*n* based on the determination result.

Figure 35:
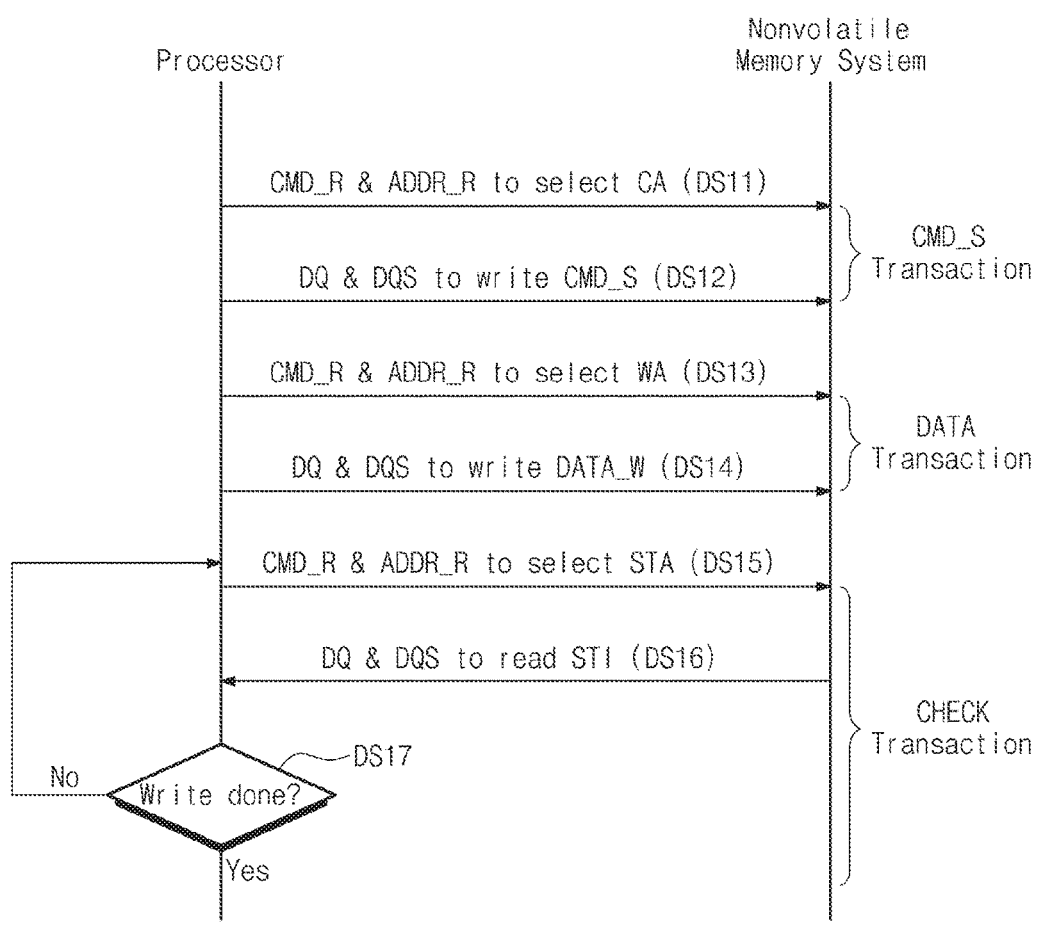
FIG. 35 is a flow chart for describing a write operation of a user system illustrated in FIG. 33.
Figure 36:
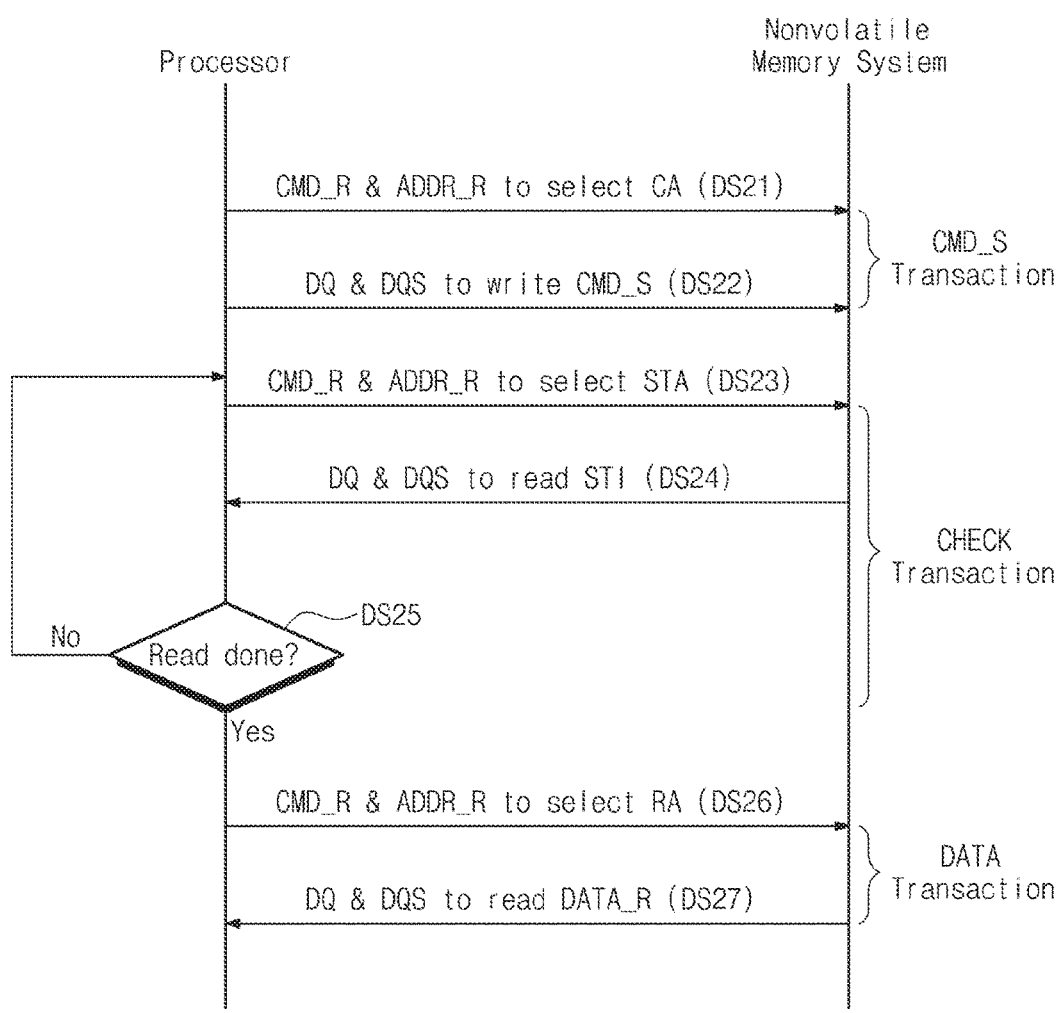
FIG. 36 is a flow chart for describing a read operation of a user system illustrated in FIG. 33.

FIG. 35 is a flow chart for describing a write operation of a user system illustrated in FIG. 33. FIG. 36 is a flow chart for describing a read operation of a user system illustrated in FIG. 33. Referring to FIGS. 33, 34, and 35, in step DS11, the processor D101 may provide the nonvolatile memory system D100 with a RAM command CMD_R and a RAM address ADDR_R for selecting a command area CA of the RAM A111. In step DS12, the processor D101 may transmit, to the nonvolatile memory system D100, a data signal DQ and a data strobe signal DQS for writing a storage command CMD_S at the selected command area CA. For example, the data signal DQ and the data strobe signal DQS of step DS12 may include the storage command CMD_S for a write operation. For example, steps DS11 and DS12 may be a transaction about the storage command CMD_S.

In step DS13, the processor D101 may provide the nonvolatile memory system D100 with a RAM command CMD_R and a RAM address ADDR_R for selecting a write area WA of the RAM D111*b*. In step DS14, the processor D101 may transmit, to the nonvolatile memory system D100, the data signal DQ and the data strobe signal DQS for writing the write data DATA_W at the selected write area WA. For example, the data signal DQ and the data strobe signal DQS of step DS14 may include the write data DATA_W. For example, steps DS13 and DS14 may be a transaction about the write data DATA_W.

In step DS15, the processor D101 may provide the nonvolatile memory system D100 with a RAM command CMD_R and a RAM address ADDR_R to select a status area STA of the RAM D111*b*. In step DS16, the processor D101 may read the status information STI, which is written in the status area STA, through the data signal DQ and the data strobe signal DQS. In an embodiment, the data signal DQ and the data strobe signal DQS of step DS16 may include the status information STI and may be signals provided to the processor D101 from the RAM D111*b*.

In step DS17, the processor D101 may determine whether the write operation is completed, based on the read status information STI. For example, in the case where processing of the write data DATA_W stored in the write area WA of the RAM D111*b* is completed, the controller D112 of the nonvolatile memory system D100 may write the status information STI, indicating that the write operation is completed, at the status area STA of the RAM D111*b*. In this case, in step DS16, the status information STI indicating that the write operation is completed may be provided to the processor D101. The processor D101 may determine whether the write operation is completed, based on the received status information STI.

In the case where the received status information STI indicates that the write operation is not completed, the processor D101 may iteratively perform steps DS15 to DS17. In the case where the received status information STI indicates that the write operation is completed, the write operation of the user system D10 may be ended. In an embodiment, operations of steps DS15 to DS17 may be a transaction for checking whether the write operation is completed.

In an embodiment, in the case where the write operation is not completed, the controller D112 of the nonvolatile memory system D100 may not write status information STI at the RAM D111*b*. In this case, in step DS16, the status information STI may not be transferred to the processor D101, or any other status information may be transferred thereto. If not receiving the status information STI or receiving any other status information, the processor D101 may determine the write operation as being not completed and may iteratively perform steps DS15 to DS17.

Referring to FIGS. 33, 34, and 36, in step DS21, the processor D101 may provide the nonvolatile memory system D100 with a RAM command CMD_R and a RAM address ADDR_R for selecting a command area CA of the RAM D111*b*. In step DS22, the processor D101 may transmit, to the nonvolatile memory system D100, a data signal DQ and a data strobe signal DQS to write a storage command CMD_S at the selected command area CA. For example, the data signal DQ and the data strobe signal DQS of step DS22 may include the storage command CMD_S for a read operation. For example, operations of steps DS21 and DS22 may be a transaction about the storage command CMD_S.

In step DS23, the processor D101 may provide the nonvolatile memory system D100 with the RAM address CMD_R and the RAM address ADDR_R for selecting the status area STA. In step DS24, the processor D101 may read the status information STI, which is written in the status area STA, through the data signal DQ and the data strobe signal DQS. In an embodiment, the data signal DQ and the data strobe signal DQS of step DS24 may include the status information STI and may be signals provided to the processor D101 from the RAM D111*b*.

In step DS25, the processor D101 may determine whether the read operation is completed, based on the read status information STI. In the case where the read operation is not completed, the processor D101 may iteratively perform operations of steps DS23 and DS24 periodically. In an embodiment, operations of steps DS23 to DS25 may be a transaction for checking whether the write operation is completed.

In an embodiment, in the case where the nonvolatile memory system D100 does not complete the read operation, the controller D112 of the nonvolatile memory system D100 may not write status information STI, indicating that the read operation is completed, at the RAM D111*b*. In this case, in step DS24, the status information STI may not be transferred to the processor D101. In the case where the status information STI is not transferred, the processor D101 may iteratively perform steps DS23 to DS25.

In the case where the read status information STI indicates that the read operation is completed, in step DS26, the processor D101 may provide the nonvolatile memory system D100 with a RAM command CMD_R and a RAM address ADDR_R for selecting the read area RA of the RAM D111*b*. In step DS27, the processor D101 may read the read data DATA_R, which is stored in the read area RA, through the data signal DQ and the data strobe signal DQS. For example, the data signal DQ and the data strobe signal DQS of step DS27 may include the read data DATA_R and may be signals provided to the processor D101 from the RAM D111*b*.

Figure 37:
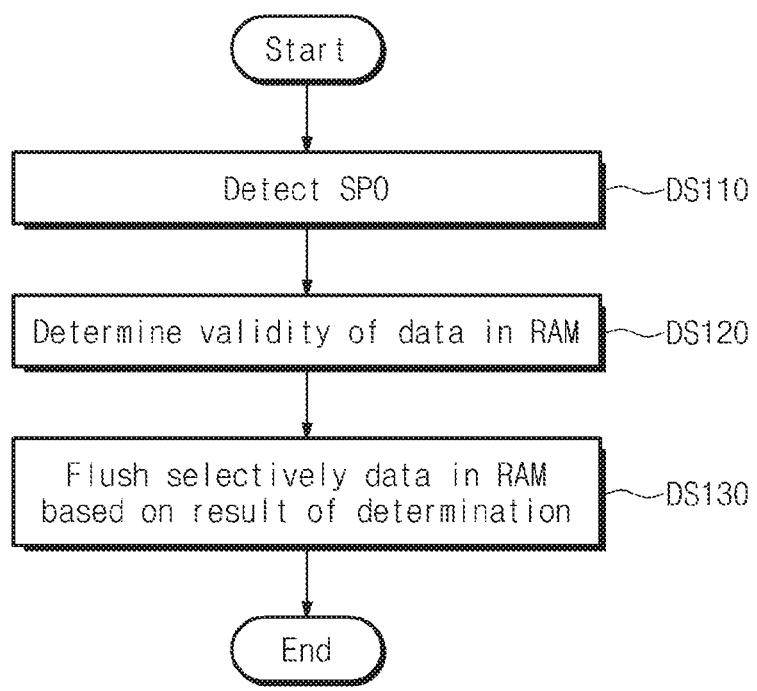
FIG. 37 is a flow chart illustrating an operation of a nonvolatile memory system of FIG. 33.

FIG. 37 is a flow chart illustrating an operation of a nonvolatile memory system of FIG. 33. Referring to FIGS.

33, 34 and 37, in step DS110, the nonvolatile memory system D100 may detect an SPO. In an embodiment, the nonvolatile memory system D100 may directly detect interruption of a power provided from the processor D101 or an external device. Alternatively, the nonvolatile memory system D100 may receive a save signal (SAVE_n, not shown) from the processor D101 and may detect an SPO situation based on the received save signal.

In step DS120, the nonvolatile memory system D100 may determine validity of data stored in the RAM D111b. For example, the nonvolatile memory system D100 may detect the SPO while receiving write data DATA_W from the processor D101. The case that a part of the write data DATA_W is received from the processor D101 may occur. In this case, a part of the write data DATA_W stored in the RAM D111b may be invalid data. The controller D112 of the nonvolatile memory system D100 may determine validity of data stored in the RAM D111b. In an embodiment, the controller D112 may determine the validity based on a size, a phase bit, and the like of data stored in the RAM D111b.

In step DS130, the nonvolatile memory system D100 may selectively flush the data stored in the RAM D111b based on the determination result. For example, the nonvolatile memory system D100 may flush data, which is determined as being valid, from among data stored in the RAM D111b stored in the RAM D111b into the nonvolatile memory devices D131 to D13n.

However, the scope and spirit of the inventive concept may not be limited to data stored in the RAM D111b as described above, the RAM D111b may store a storage command CMD_S, a storage address ADDR_S, write data DATA_W, read data DATA_R, or status information STI. The nonvolatile memory system D100 may determine validity of each of the storage command CMD_S, the storage address ADDR_S, the write data DATA_W, the read data DATA_R, or the status information STI stored in the RAM D111b and may flush information, which is determined as being valid, into the nonvolatile memories D131 to D13n based on the determination result.

Below, it may be assumed that the nonvolatile memory system D100 determines validity of data stored in the RAM D111b. However, the scope and spirit of the inventive concept may not be limited thereto.

Figure 38:
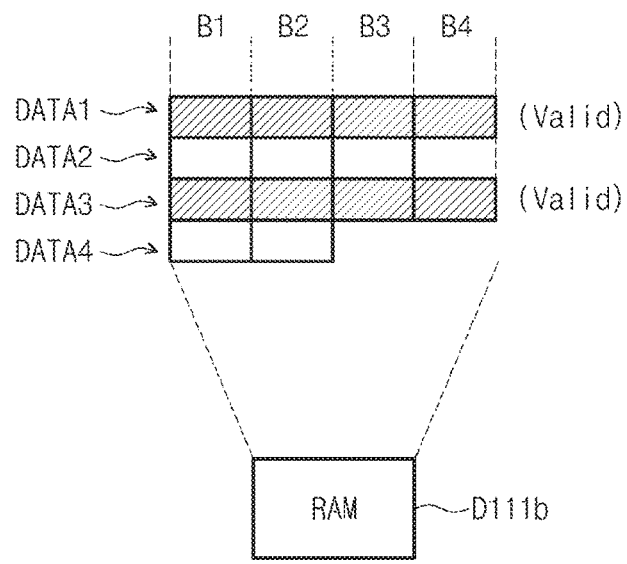
FIGS. 38 and 39 are diagrams for describing a data validity determining operation.
Figure 39:
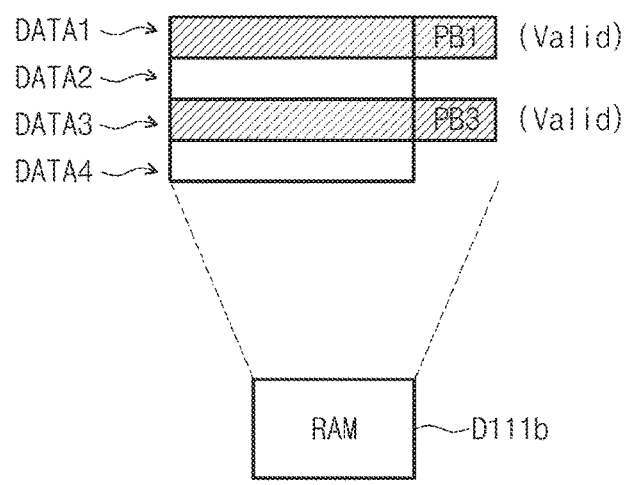

FIGS. 38 and 39 are diagrams for describing a data validity determining operation. A method for determining validity of data based on a data size will be described with reference to FIG. 38. A method for determining validity of data based on a phase bit will be described with reference to FIG. 39.

Referring to FIGS. 33, 34, and 38, the nonvolatile memory system D100 may determine data validity based on the size of data stored in the RAMD111b. For example, the nonvolatile memory system D100 and the processor D101 may exchange data with each other based on a data unit. The data unit may indicate a data size which is managed by the processor D101. Alternatively, the data unit may be a write or read unit of the nonvolatile memory system D100.

In an embodiment, in the case where the nonvolatile memory system D100 receives data (e.g., write data) from the processor D101, the processor D101 may transfer the data to the nonvolatile memory system D100 through a data signal DQ and a data strobe signal DQS. The data may include a plurality of bits, and the bits included in the data may be sequentially transferred to the nonvolatile memory system D100 through the data signal DQ and the data strobe signal DQS. The SPO may be able to occur while the data bits are transferred to the nonvolatile memory system D100.

In this case, validity of data being transferred may not be ensured because all bits of the data are not stored in the RAM D111b of the nonvolatile memory system D100.

That is, the nonvolatile memory system D100 may determine validity of the received data (data stored in the RAM D111b). For example, first to fourth data DATA1 to DATA4 may be stored. It may be assumed that each of the first to fourth data DATA1 to DATA4 is composed of first to fourth bytes B1 to B4 and each of the first to fourth bytes B1 to B4 corresponds to a data size managed by the processor D101. However, the scope and spirit of the inventive concept may not be limited thereto.

As illustrated in FIG. 38, the first to fourth data DATA1 to DATA4 may be stored in the RAM D111b. All bytes (i.e., first to fourth bytes B1 to B4) of the first to third data DATA1 and DATA3 may be stored in the RAM D111b. In contrast, first to third bytes B1 to B3 of the second data DATA2 and first and second bytes B1 and B2 of the fourth data DATA4 may be stored in the RAM D111b. With the above assumption, the first and third data DATA1 and DATA3 may be valid because all bytes thereof are received. However, the second and fourth data DATA2 and DATA4 may be invalid because all bytes thereof are not received.

The nonvolatile memory system D100 may determine data, which satisfies the above-described data unit, from among data stored in the RAM D111b as being valid. For example, the nonvolatile memory system D100 may determine the first and third data DATA1 and DATA3, of which all bytes are received, as being valid. In this case, the size of each of the first and third data DATA1 and DATA3 may be equal to the data unit managed by the processor D101.

The nonvolatile memory system D100 may flush the first and third data DATA1 and DATA3, which are determined as being valid, into the nonvolatile memory devices D131 to D13n.

Referring to FIGS. 33, 34, and 39, the processor D101 may write a phase bit PB after transferring all write data to the nonvolatile memory system D100. The phase bit PB may include information indicating that all of corresponding write data is written at the RAM D111b. That is, in the case where a corresponding phase bit PB is written, corresponding write data may be written at the RAM D111b and may be valid. However, in the case where the phase bit PB is not written, validity of corresponding write data may not be ensured.

The nonvolatile memory system D100 may determine validity of data stored in the RAM D111b based on the phase bit PB. For example, when the SPO occurs, the first to fourth data DATA1 to DATA4 may have been written at the RAM D111b. The first and second data DATA1 and DATA2 and first and second phase bits PB1 and PB2 corresponding thereto may be written at a specific area of the RAM D111b. That the first and second phase bits PB1 and PB2 are written at the RAM D111b may mean that the first and second data DATA1 and DATA2 are valid.

In an embodiment, the first and second phase bits PB1 and PB2 may be written by the processor D101. For example, after writing all of the first data DATA1 at the RAM D111b, the processor D101 may write the first phase bit PB1 corresponding to the first data DATA1 at the RAM D111b. Likewise, after writing all of the third data DATA3 at the RAM D111b, the processor D101 may write the third phase bit PB3 corresponding to the third data DATA3 at the RAM D111b.

When the SPO is detected, the nonvolatile memory system D100 may determine that the first and third data DATA1 and DATA3 are valid, based on the first and third phase bits PB1 and PB3. The nonvolatile memory system D100 may flush the first and third data DATA1 and DATA3, which are determined as being valid, into the nonvolatile memory devices D131 to D13n.

In an embodiment, data flushed into the nonvolatile memory devices D131 to D13n may be restored onto the RAM D111b after powered on or during a restoration operation.

As described above, when the SPO occurs, the nonvolatile memory system D100 according to an embodiment of the inventive concept may flush data stored in the RAM D111b into the nonvolatile memory devices D131 to D13n to ensure the data stored in the RAM D111b. In this case, the nonvolatile memory system D100 may determine validity of data stored in the RAM D111b and may selectively flush data of the RAM D111b into the nonvolatile memory devices D131 to D13n. With the above description, data validity may be ensured by selectively flushing valid data. Also, since invalid data is not stored in the nonvolatile memory devices D131 to D13n, data integrity may be improved. In addition, since only valid data is selectively flushed, overhead of a flush operation may be reduced. Accordingly, a nonvolatile memory system (or a nonvolatile memory module) with improved data integrity and performance may be provided.

Figure 40:
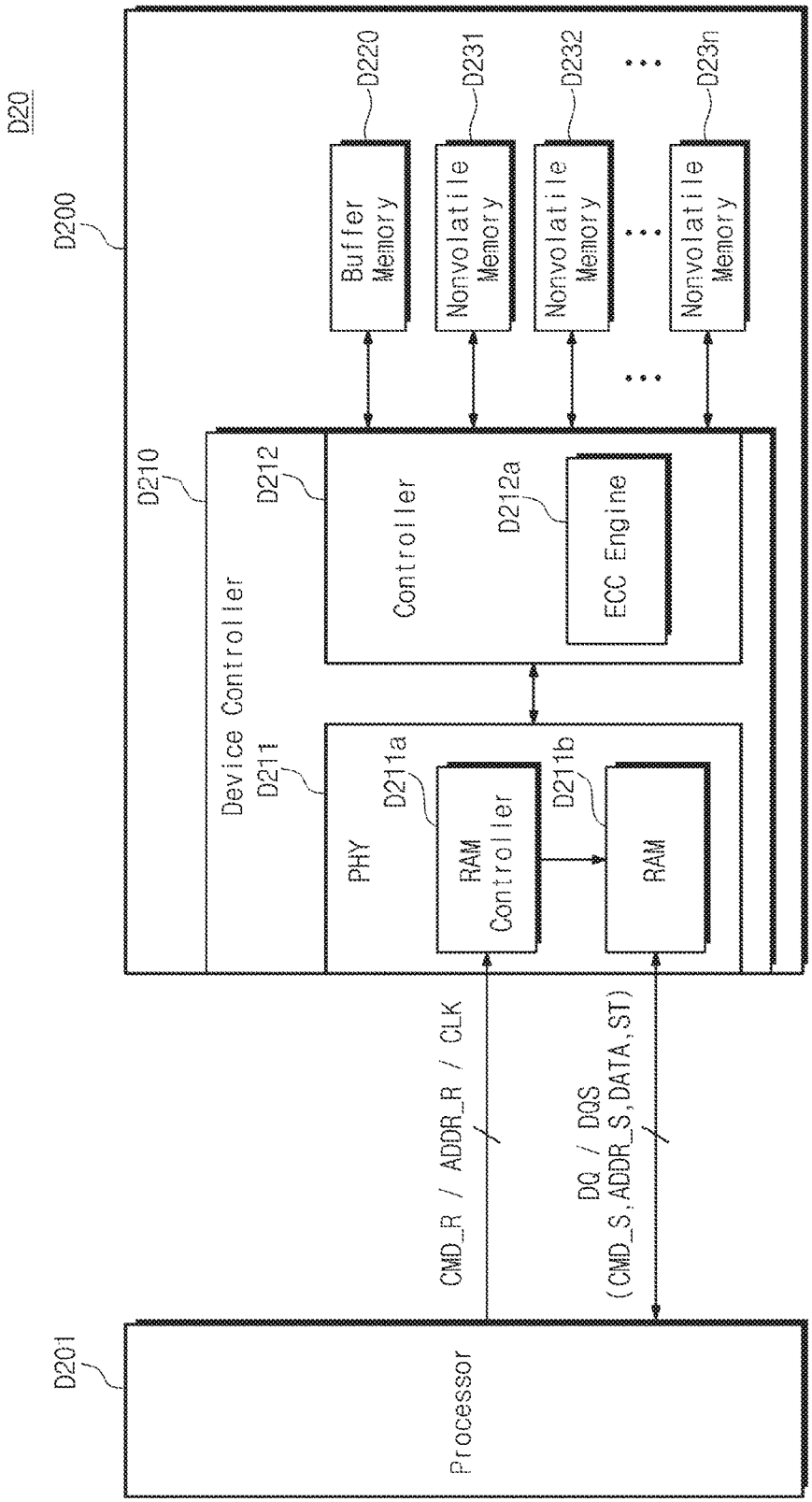
FIG. 40 is a block diagram illustrating a user system including a nonvolatile memory system according to another embodiment of the inventive concepts.

FIG. 40 is a block diagram illustrating a user system including a nonvolatile memory system according to another embodiment of the inventive concept. Referring to FIG. 40, a user system D20 may include a processor D201 and a nonvolatile memory system D200. The nonvolatile memory system D200 may include a device controller D210, a buffer memory D220, and a plurality of nonvolatile memory devices D231 to D23n. The device controller D210 may include a physical layer D211 and a controller D212. The physical layer circuit D211 may include a RAM controller D211a and a RAM D211b. The processor D201, the nonvolatile memory system D200, the device controller D210, the buffer memory D220, the nonvolatile memory devices D231 to D23n, the physical layer D211, the controller D211, the RAM controller D221a, and the RAM D221b are described with reference to FIG. 33, and a detailed description thereof is thus omitted.

The controller D212 may include an error correction code (ECC) engine D212a. The ECC engine D212a may detect and correct an error of data or a storage command CMD_S received from the processor D201. For example, the processor D201 may generate an error correction code about the storage command CMD_S, data, and the like. The processor D201 may transfer the storage command CMD_S and the data to the nonvolatile memory system D200 together with the error correction code. The ECC engine D212a may detect and correct an error of the write data DATA_W or the storage command CMD_S based on the error correction code.

In an embodiment, in the case where the storage command CMD_S or the data is normally received, an error thereof may be detected and corrected by the ECC engine D212a. However, in the case where the storage command CMD_S or the data is not normally received, an error thereof may not be corrected by the ECC engine D212a. In this case, it may be impossible to ensure validity of the data or the storage command CMD_S stored in the RAM D211b or received from the processor D201.

The nonvolatile memory system D200 according to an embodiment of the inventive concept may detect an SPO, may determine validity of data stored in the RAM D211b, and may selectively flush data based on the determination result. In this case, the nonvolatile memory system D200 may determine validity of data stored in the RAM D211b based on an error correction result. For example, in the case where data received from the processor D201 is valid, as described above, an error of the received data may be corrected by the ECC engine D212a. In contrast, in the case where data received from the processor D201 is invalid (i.e., all bits of the data are not received), an error of the received data may not be corrected by the ECC engine D212a. The nonvolatile memory system D200 may determine validity of data based on an error correction result of the ECC engine D212a and may selectively flush data.

Figure 41:
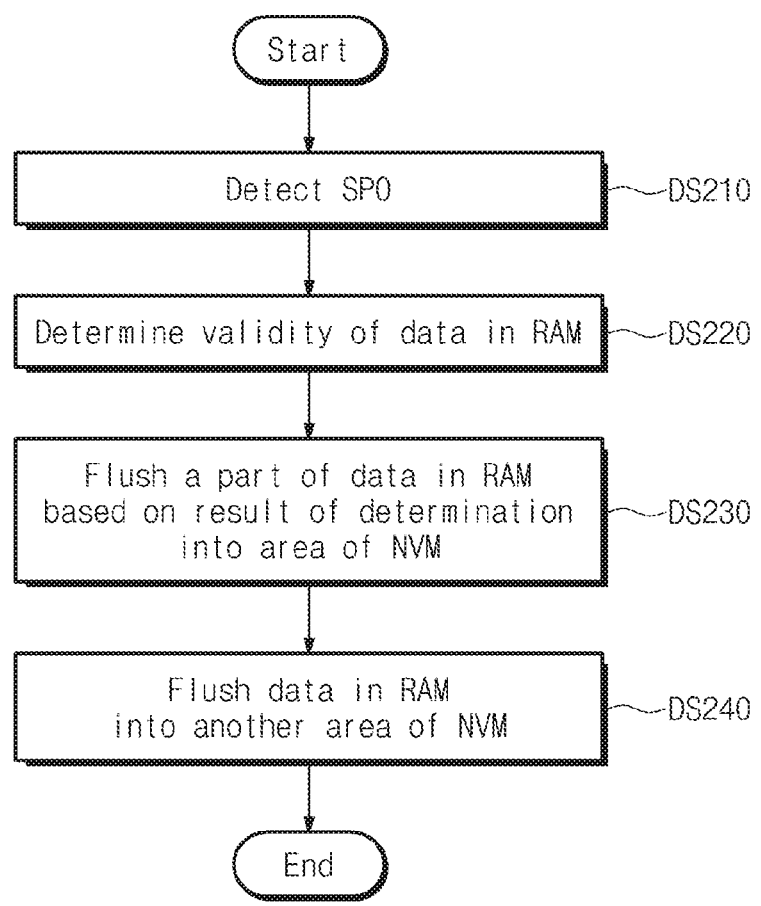
FIG. 41 is a flow chart illustrating an operation of a nonvolatile memory system according to another embodiment of the inventive concept.

FIG. 41 is a flow chart illustrating an operation of a nonvolatile memory system according to another embodiment of the inventive concept. Referring to FIGS. 33 and 41, the nonvolatile memory system D100 may perform operations of steps DS210 to DS230. Operations of steps DS210 to DS230 may be similar to those of steps DS110 to DS130 of FIG. 37, and a detailed description thereof is thus omitted.

In step DS240, the nonvolatile memory system D200 may flush data, which is written at the RAM D211b, into the nonvolatile memory devices D231 to D23n. In this case, unlike step DS230, the nonvolatile memory system D100 may flush all data stored in the RAM D211b to the nonvolatile memory devices D231 to D23n. That is, the nonvolatile memory system D100 may selectively flush valid data through a flush operation of step DS230 and may flush all information stored in the RAM D211b through a flush operation of step DS240. As all information stored in the RAM D211b is flushed, reliability of the following restoration operation may be improved As described above, when the SPO occurs, the nonvolatile memory system according to an embodiment of the inventive concept may determine validity of data stored in a RAM and may selectively flush data based on the determination result. At this time, the nonvolatile memory system may determine validity of data based on at least one of a size of data stored in the RAM, a phase bit, or a result of an ECC operation. This may mean that the performance of the nonvolatile memory system is improved.

E. Embodiment

Figure 42:
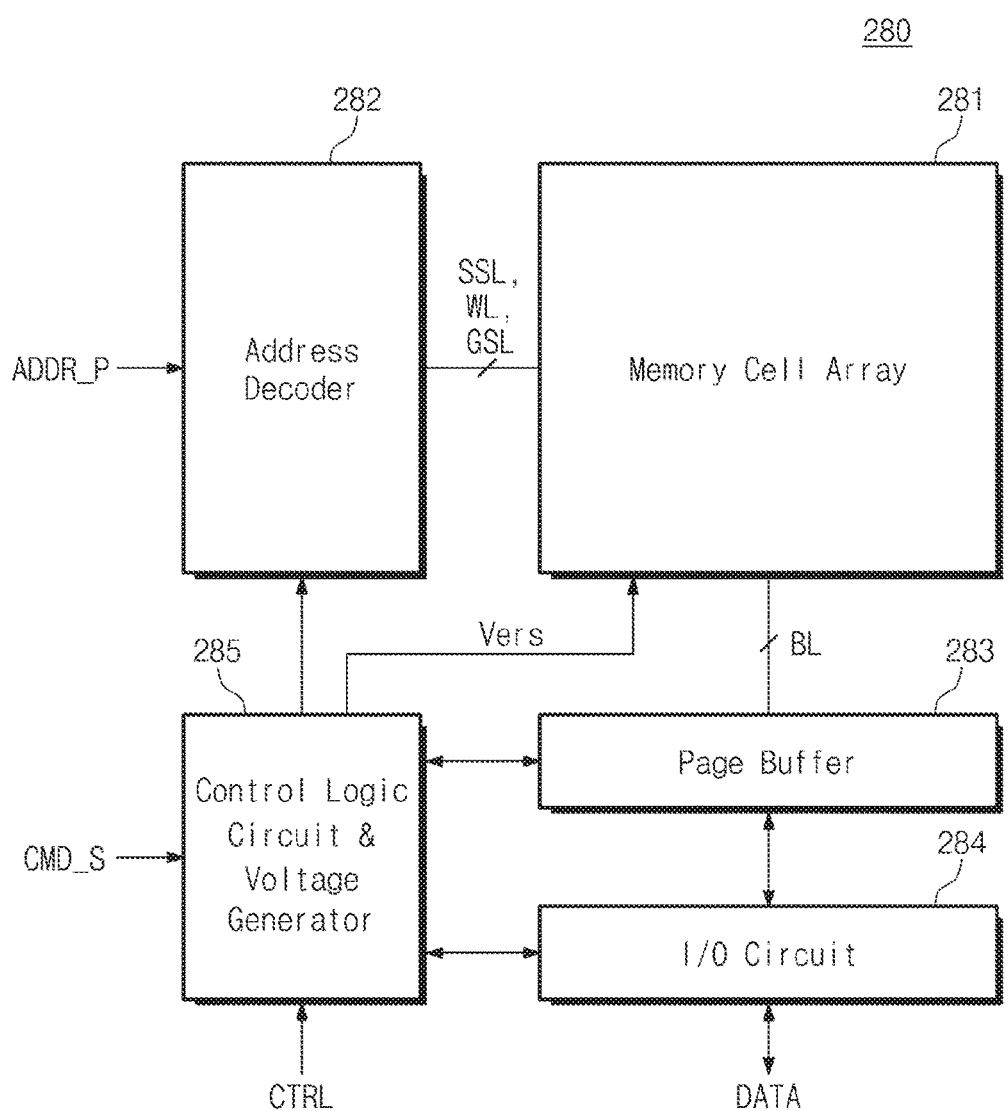
FIG. 42 is a block diagram illustrating one of nonvolatile memories described with reference to FIGS. 1, 10, 23, and 33.

FIG. 42 is a block diagram illustrating one of nonvolatile memories described with reference to FIGS. 1, 10, 23, and 33 to 40. Referring to FIG. 42, a nonvolatile memory 280 may include a memory cell array 281, an address decoder 282, a page buffer 283, an input/output circuit 284, and a control logic and voltage generator circuit 285.

The memory cell array 281 may include a plurality of memory cells. Each of the memory blocks may include a plurality of cell strings. Each of the cell strings may include a plurality of memory cells. The memory cells may be connected with a plurality of word lines WL. Each memory cell may be a single level cell (SLC) storing one bit or a multi-level cell (MLC) storing at least two bits.

The address decoder 282 may be connected with the memory cell array 281 through the word lines WL, string selection lines SSL, and ground selection lines GSL. The address decoder 282 may receive and decode an address ADD_P from an external device and may drive the word lines based on the decoding result. For example, the address decoder 282 may decode a physical address ADD_P received from the external device, may select at least one of the word lines based on the decoded physical address ADD_P, and may drive the selected word line. In an embodiment, the physical address ADD_P may be a physical address of the nonvolatile memory 280 which is obtained by converting a storage address ADDR_S. The above-described address conversion operation may be performed by the device controller 230 or by a flash translation layer (FTL) which is driven by the device controller 230.

The page buffer 283 may be connected to the memory cell array 281 through the bit lines BL. Under control of the control logic and voltage generator circuit 285, the page buffer 283 may control the bit lines BL such that data provided from the input/output circuit 284 is stored in the memory cell array 281. Under control of the control logic and voltage generator circuit 285, the page buffer 283 may read data stored in the memory cell array 281 and may provide the read data to the input/output circuit 284. For example, the page buffer 283 may be provided with data from the input/output circuit 284 by the page or may read data from the memory cell array 281 by the page.

The input/output circuit 284 may receive data from the external device and may transfer the received data to the page buffer 283. Alternatively, the input/output circuit 284 may receive data from the page buffer 283 and may transmit the received data to the external device (e.g., the DIMM controller A240). For example, the input/output circuit 284 may exchange data with the external device in synchronization with the control signal CTRL.

The control logic and voltage generator circuit 285 may control the address decoder 282, the page buffer 283, and the input/output circuit 284 in response to a storage command CMD_S and a control logic CTRL from the external device. For example, the control logic and voltage generator circuit 285 may control other components in response to the signals CMD_S and CTRL such that data is stored in the memory cell array 281. Alternatively, the control logic and voltage generator circuit 285 may control other components in response to the signals CMD_S and CTRL such that data stored in the memory cell array 281 is transmitted to the external device. In an embodiment, the storage command CMD_S received from the external device may be a modified version of the storage command CMD_S of FIG. 2. The control signal CTRL may be a signal which the device controller 230 provides to control the nonvolatile memory 280.

The control logic and voltage generator circuit 285 may generate various voltages required for the nonvolatile memory 280 to operate. For example, the control logic and voltage generator circuit 285 may generate a plurality of program voltages, a plurality of pass voltages, a plurality of verification voltages, a plurality of selection read voltages, a plurality of non-selection read voltages, a plurality of erase voltages, and the like. The control logic and voltage generator circuit 285 may provide the generated voltages to the address decoder 282 or to a substrate of the memory cell array 281.

Figure 43:
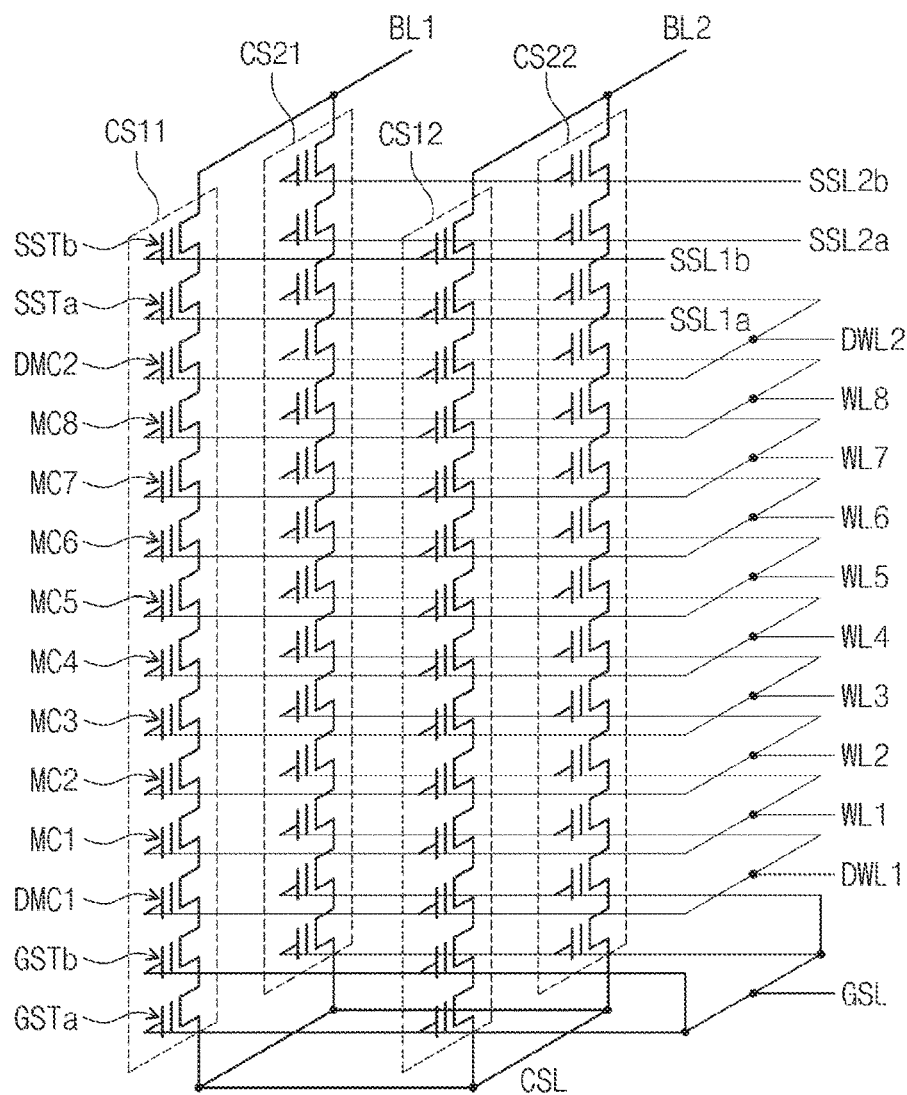
FIG. 43 is a circuit diagram illustrating one of memory blocks included in a memory cell array in FIG. 42.

FIG. 43 is a circuit diagram illustrating one of memory blocks included in a memory cell array in FIG. 42. In an embodiment, a memory block BLK1 having a three-dimensional structure will be described with reference to FIG. 43. Other memory blocks respectively included in the nonvolatile memories 280 may have, but not limited to, a structure which is similar to the memory block BLK1.

Referring to FIG. 43, the memory block BLK1 may include a plurality of cell strings CS11, CS12, CS21, and CS22. The cell strings CS11, CS12, CS21, and CS22 may be arranged along a row direction and a column direction and may form rows and columns.

For example, the cell strings CS11 and CS12 may be connected to string selection lines SSL1a and SSL1b to define a first row. The cell strings CS21 and CS22 may be connected to string selection lines SSL2a and SSL2b to define a second row.

For example, the cell strings CS11 and CS21 may be connected to a first bit line BL1 to define a first column. The cell strings CS12 and CS22 may be connected to a second bit line BL2 to define a second column.

Each of the cell strings CS11, CS12, CS21, and CS22 may include a plurality of cell transistors. Each of the cell strings CS11, CS12, CS21, and CS22 may include string selection transistor SSTa and SSTb, a plurality of memory cells MC1 to MC8, ground selection transistors GSTa and GSTb, and dummy memory cells DMC1 and DMC2. In an embodiment, each of the memory cells included in the cell strings CS11, CS12, CS21, and CS22 may be a charge trap flash (CTF) memory cell.

The memory cells MC1 to MC8 may be serially connected and may be stacked a height direction being a direction perpendicular to a plane defined by a row direction and a column direction. The string selection transistors SSTa and SSTb may be serially connected and may be disposed between the memory cells MC1 to MC8 and a bit line BL. The ground selection transistors GSTa and GSTb may be serially connected and may be disposed between the memory cells MC1 to MC8 and a common source line CSL.

In an embodiment, a first dummy memory cell DMC1 may be disposed between the memory cells MC1 to MC8 and the ground selection transistors GSTa and GSTb. In an embodiment, a second dummy memory cell DMC2 may be disposed between the memory cells MC1 to MC8 and the string selection transistors SSTa and SSTb.

The ground selection transistors GSTa and GSTb of the cell strings CS11, CS12, CS21, and CS22 may be connected in common to a ground selection line GSL. In an embodiment, ground selection transistors in the same row may be connected to the same ground selection line, and ground selection transistors in different rows may be connected to different ground selection lines. For example, the first ground selection transistors GSTa of the cell strings CS11 and CS12 in the first row may be connected to the first ground selection line, and the first ground selection transistors GSTa of the cell strings CS21 and CS22 in the second row may be connected to the second ground selection line.

In an embodiment, even though not illustrated in FIG. 43, ground selection transistors provided at the same height from a substrate (not shown) may be connected to the same ground selection line, and ground selection transistors provided at different heights may be connected to different ground selection lines. For example, in the cell strings CS11, CS12, CS21, and CS22, the first ground selection transistors GSTa may be connected to the ground selection line GSL, and the second ground selection transistors GSTb may be connected to the ground selection line GSL.

Memory cells placed at the same height from the substrate (or the ground selection transistors GSTa and GSTb) may be connected in common to the same word line, and memory cells placed at different heights therefrom may be connected to different word lines. For example, memory cells MC1 to MC8 of the cell strings CS11, CS12, CS21, and CS22 may be connected in common to first to eighth word lines WL1 to WL8.

String selection transistors, belonging to the same row, from among the first string selection transistors SSTa placed at the same height may be connected to the same string selection line, and string selection transistors belonging to different rows may be connected to different string selection lines. For example, the first string selection transistors SSTa of the cell strings CS11 and CS12 in the first row may be connected in common to the string selection line SSL1a, and the first string selection transistors SSTa of the cell strings CS21 and CS22 in the second row may be connected in common to the string selection line SSL1a.

Likewise, string selection transistors, belonging to the same row, from among the second string selection transistors SSTb at the same height may be connected to the same string selection line, and string selection transistors in different rows may be connected to different string selection lines. For example, the second string selection transistors SSTb of the cell strings CS11 and CS12 in the first row may be connected in common to a string selection line SSL1b, and the second string selection transistors SSTb of the cell strings CS21 and CS22 in the second row may be connected in common to a string selection line SSL2b.

Although not shown, string selection transistors of cell strings in the same row may be connected in common to the same string selection line. For example, the first and second string selection transistors SSTa and SSTb of the cell strings CS11 and CS12 in the first row may be connected in common to the same string selection line. The first and second string selection transistors SSTa and SSTb of the cell strings CS21 and CS22 in the second row may be connected in common to the same string selection line.

In an embodiment, dummy memory cells at the same height may be connected with the same dummy word line, and dummy memory cells at different heights may be connected with different dummy word lines. For example, the first dummy memory cells DMC1 may be connected to a first dummy word line DWL1, and the second dummy memory cells DMC2 may be connected to a second dummy word line DWL2.

In the memory block BLK1, read and write operations may be performed by the row. For example, one row of the memory block BLK1 may be selected by the string selection lines SSL1a, SSL1b, SSL2a, and SSL2b.

The cell strings CS11 and CS12 in the first row may be respectively connected to the bit lines BL1 and BL2 when a turn-on voltage is supplied to the string selection lines SSL1a and SSL1b and a turn-off voltage is supplied to the string selection lines SSL2a and SSL2b. The cell strings CS21 and CS22 in the second row may be respectively connected to the bit lines BL1 and BL2 when the turn-on voltage is supplied to the string selection lines SSL2a and SSL2b and the turn-off voltage is supplied to the string selection lines SSL1a and SSL1b. As a word line is driven, memory cells, placed at the same height, from among memory cells in cell strings connected to the driven word line may be selected. Read and write operations may be performed with respect to the selected memory cells. The selected memory cells may define a physical page.

In the memory block BLK1, memory cells may be erased by the memory block or by the sub-block. When erasing is performed by the memory block, all memory cells MC in the memory block BLK1 may be simultaneously erased according to an erase request. When erasing is performed by the sub-block, a portion of memory cells MC in the memory block BLK1 may be simultaneously erased according to an erase request, and the other thereof may be erase-inhibited. A low voltage (e.g., a ground voltage) may be supplied to a word line connected to erased memory cells, and a word line connected to erase-inhibited memory cells MC may be floated.

The memory block BLK1 illustrated may be an example. The number of cell strings may increase or decrease, and the number of rows of cell strings and the number of columns of cell strings may increase or decrease according to the number of cell strings. In the memory block BLK1, the number of cell strings (GST, MC, DMC, SST, or the like) may increase or decrease, and a height of the memory block BLK1 may increase or decrease according to the number of cell strings (GST, MC, DMC, SST, or the like). Furthermore, the number of lines (GSL, WL, DWL, SSL, or the like) connected with cell transistors may increase or decrease according to the number of cell strings (GST, MC, DMC, SST, or the like).

Figure 44:
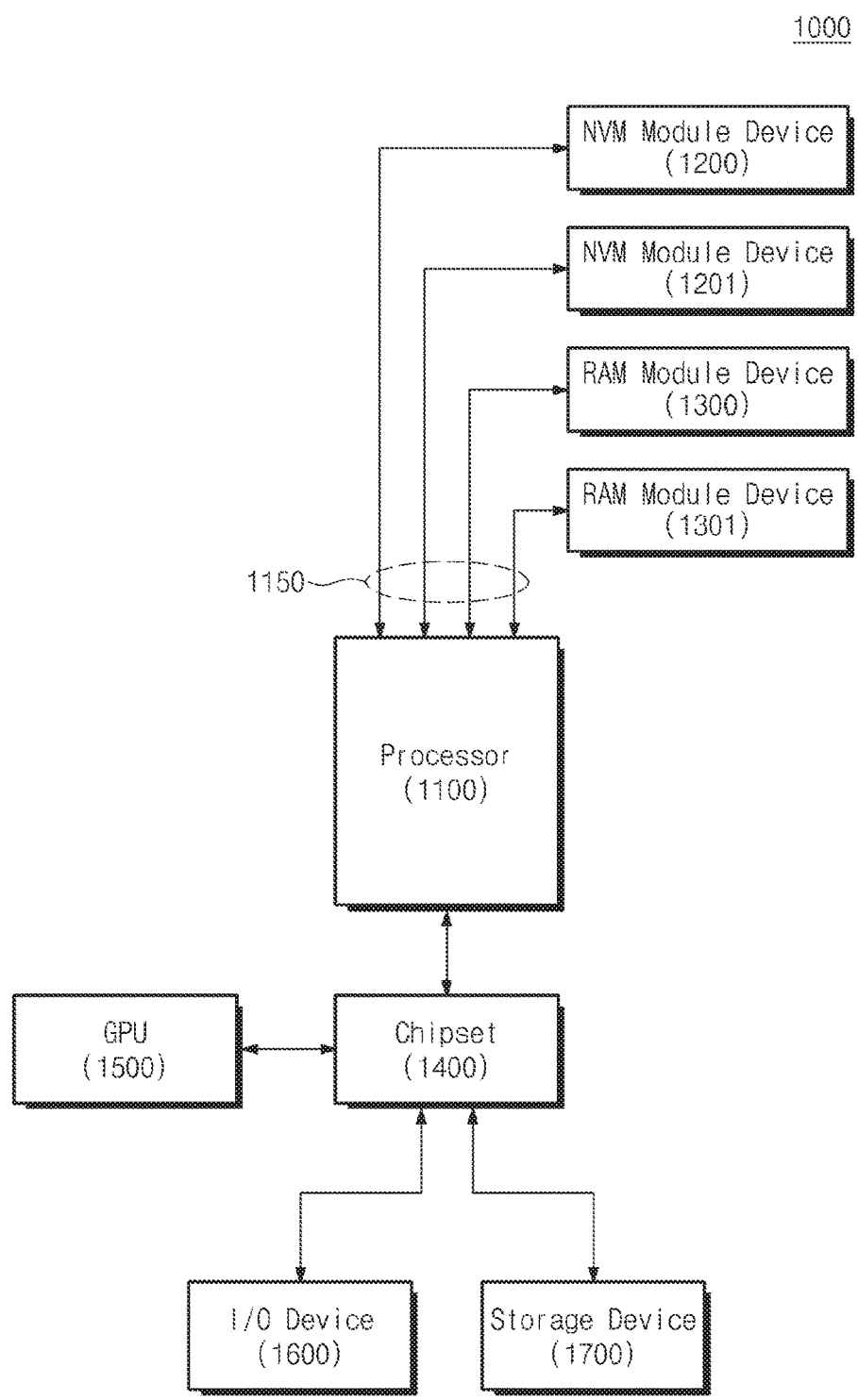
FIG. 44 is a block diagram illustrating a computing system to which a nonvolatile memory module according to the inventive concept is applied.

FIG. 44 is a block diagram illustrating a computing system to which a nonvolatile memory module according to the inventive concept is applied. Referring to FIG. 44, a computing device 1000 may include a processor 1100, nonvolatile memory modules 1200 and 1201, RAM modules 1300 and 1301, a chipset 1400, a graphic processing unit (GPU) 1500, an input/output device 1600, and a storage device 1700.

The processor 1100 may perform an overall operation of the computing system 1000. The processor 1100 may perform various operations to be executed on the computing system 1000.

The nonvolatile memory modules 1200 and 1201 and the RAM modules 1300 and 1301 may be directly connected with the processor 1100. For example, each of the nonvolatile memory modules 1200 and 1201 and the RAM modules 1300 and 1301 may have a DIMM shape. Alternatively, each of the nonvolatile memory modules 1200 and 1201 and the RAM modules 1300 and 1301 may be mounted on a DIMM socket directly connected with the processor 1100 and may communicate with the processor 1100. In an embodiment, the nonvolatile memory modules 1200 and 1201 may be a nonvolatile memory module described with reference to FIGS. 1 to 43.

The nonvolatile memory modules 1200 and 1201 and the RAM modules 1300 and 1301 may communicate with the processor 1100 through the same interface 1150. For example, the nonvolatile memory modules 1200 and 1201 and the RAM modules 1300 and 1301 may communicate with each other through the DDR interface 1150. In an embodiment, the processor 1100 may use the RAM modules 1300 and 1301 as a working memory, a buffer memory, or a cache memory of the computing system 1000.

The chipset 1400 may be electrically connected with the processor 1100 and may control hardware of the computing system 1000 under control of the processor 1100. For example, the chipset 1400 may be connected to each of the GPU 1500, the input/output device 1600, and the storage device 1700 through main buses and may perform a bridge operation of the main buses.

The GPU 1500 may perform a set of arithmetic operations for outputting image data of the computing system 1000. In an embodiment, the GPU 1500 may be embedded in the processor 1100 in the form of a system on chip.

The input/output device 1600 may include various devices which receive data or commands provided to the computing system 1000 or may output data to an external device. For example, the input/output device 1600 may include user input devices such as a keyboard, a keypad, a button, a touch panel, a touch screen, a touch pad, a touch ball, a microphone, a gyroscope sensor, a vibration sensor, a piezoelectric sensor, and the like and user output devices such as a liquid crystal display (LCD), an organic light emitting diode (OLED) display device, an active matrix OLED (AMOLED) display device, a light emitting diode, a speaker, a motor, and the like.

The storage device 1700 may be used as a storage medium of the computing system 1000. The storage device 1700 may include mass storage media such as a hard disk drive (HDD), a solid state drive (SSD), a memory card, a memory stick, and the like.

In an embodiment, the nonvolatile memory modules 1200 and 1201 may be used as a storage medium of the computing system 1000 through the processor 1100. An interface 5150 between the nonvolatile memory modules 1200 and 1201 and the processor 1100 may be faster in speed than that between the storage device 1700 and the processor 1100. That is, the processor 1100 may use the nonvolatile memory modules 1200 and 1201 as a storage medium, thereby improving the performance of the computing system 1000.

The nonvolatile memory modules 1200 and 1201 may include an SRAM having a structure enhanced for the interface protocol with the processor 1100. That is, the processor 1100 may provide the nonvolatile memory modules 1200 and 1201 with a command, an address, and data, for accessing the nonvolatile memory, through a plurality of RAMs which are separated by a bank group unit or a bank unit.

Figure 45:
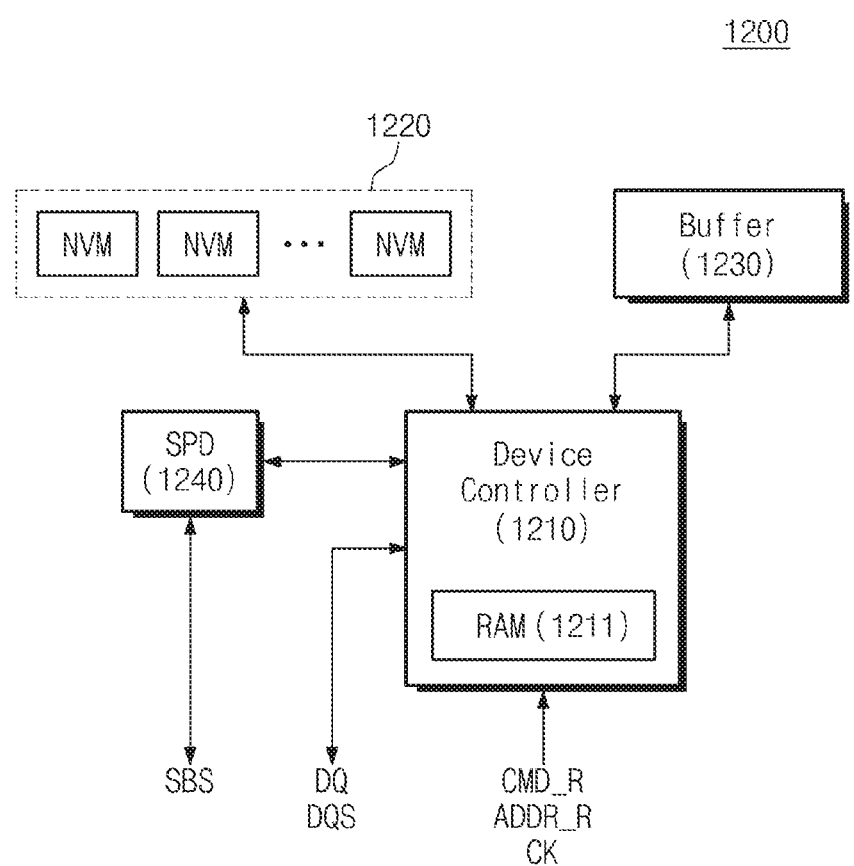
FIG. 45 is a block diagram illustrating one of nonvolatile memory modules of FIG. 44.

FIG. 45 is a block diagram illustrating one of nonvolatile memory modules of FIG. 44. In an embodiment, FIG. 45 shows the nonvolatile memory module 1200 with a load reduced DIMM (LRDIMM) form. In an embodiment, the nonvolatile memory module 1200 illustrated in FIG. 45 may be of the form of a dual in-line memory module (DIMM) and may be mounted on a DIMM socket so as to communicate with the processor 1100.

Referring to FIG. 45, the nonvolatile memory module 1200 may include a device controller 1210, a nonvolatile memory device 1220, a buffer 1230, and a serial presence detect chip (SPD) 1240. The device controller 1210 may include a RAM 1211. In an embodiment, the nonvolatile memory device 1220 may include a plurality of nonvolatile memories NVM. Each of the nonvolatile memories NVM included in the nonvolatile memory device 1220 may be implemented with a chip, a package, a device, or a module. Alternatively, the nonvolatile memory device 1220 may be implemented with a chip or a package.

In an embodiment, the device controller 1210, the RAM 1211, the nonvolatile memory device 1220, and the buffer 1230 may operate to be the same as or similar to the device controller A210, the RAM A234, the buffer A290, and the nonvolatile memory A280 of FIG. 1. The nonvolatile memory module 1200 may include an SRAM having a structure enhanced for the interface protocol with the processor 1100. That is, the processor 1100 may provide the nonvolatile memory modules 1200 and 1201 with a command, an address, and data, for accessing the nonvolatile memory device 1220, through a RAM 1211 which is separated by a bank group unit or a bank unit.

The device controller 1210 may transmit and receive a plurality of data signals DQ and a plurality of data strobe signals DQS to and from the processor 1100 and may receive a RAM command CMD_R, a RAM address ADDR_R, and a clock CK through separate signal lines.

The SPD 1240 may be a programmable read only memory device (e.g., EEPROM). The SPD 1240 may include initial information or device information of the nonvolatile memory module 1200. In an embodiment, the SPD 1240 may include initial information or device information such as a module type, a module configuration, a storage capacity, a module kind, an execution environment, and the like of the nonvolatile memory module 1300. When a computing system including the nonvolatile memory module 1200 is booted up, the processor 1100 of the computing system may read the SPD 1240 and may recognize the nonvolatile memory module 1200 based on the read result. The processor 1100 may use the nonvolatile memory module 1200 as a storage medium based on the SPD 1240.

In an embodiment, the SPD 1240 may communicate with the processor 1100 through a side-band communication channel. The processor 1100 may exchange a side-band signal SBS with the SPD 1240 through the side-band communication channel. In an embodiment, the SPD 1240 may communicate with the device controller 1210 through the side-band communication channel. In an embodiment, the side-band communication channel may be an I2C communication based channel. In an embodiment, the SPD 1240, the device controller 1210, and the processor 1100 may communicate with each other through I2C communication or may exchange information through the I2C communication.

Figure 46:
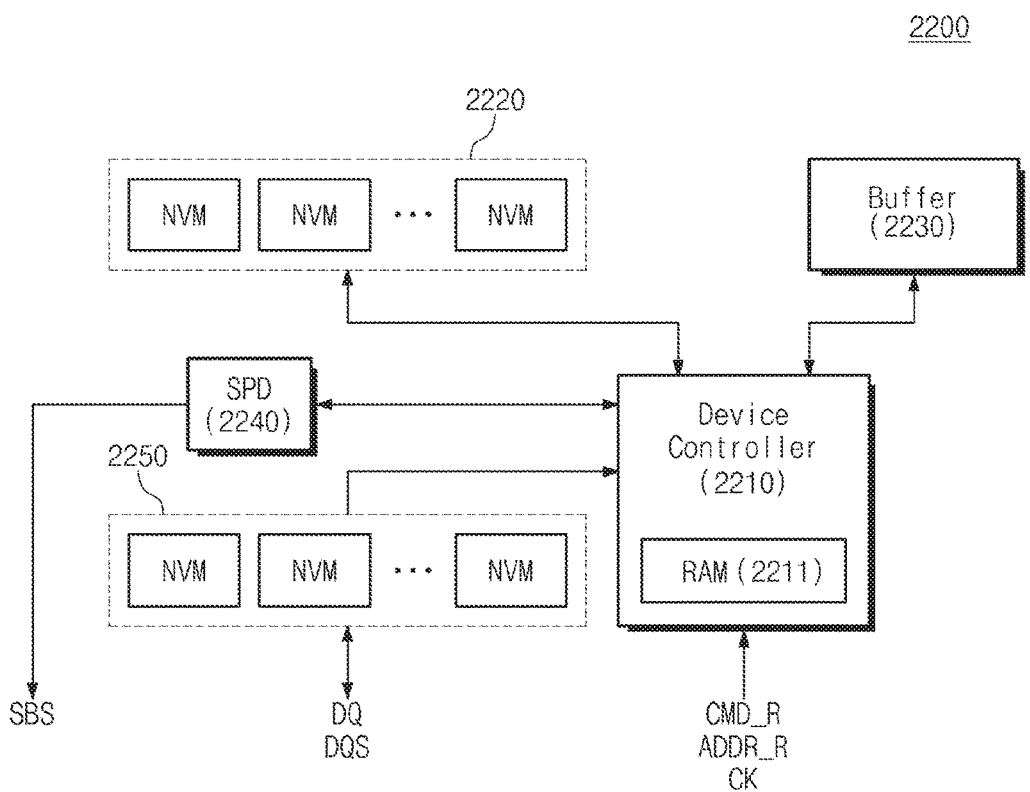
FIG. 46 is a block diagram illustrating one of nonvolatile memory modules of FIG. 44.

FIG. 46 is a block diagram illustrating one of nonvolatile memory modules of FIG. 44. In an embodiment, FIG. 46 is a block diagram of a nonvolatile memory module 2200 with a registered DIMM (RDIMM) form. In an embodiment, the nonvolatile memory module 2200 illustrated in FIG. 46 may be of the form of a dual in-line memory module (DIMM) and may be mounted on a DIMM socket so as to communicate with the processor 1100.

Referring to FIG. 46, the nonvolatile memory module 2200 may include a device controller 2210, a nonvolatile memory device 2220, a buffer 2230, a serial presence detect chip (SPD) 2240, and a data buffer circuit 2250. The device controller 2210 may include a RAM 2211. The device controller 2210, the RAM 2211, the nonvolatile memory device 2220, and the SPD 2240 are described with reference to FIGS. 1 and 45, and a detailed description thereof is thus omitted.

The data buffer circuit 2250 may receive information or data from the processor 1100 (refer to FIG. 44) through a data signal DQ and a data strobe signal DQS and may transfer the received information or data to the device controller 2210. Alternatively, the data buffer circuit 2250 may receive information or data from the device controller 2210 and may transfer the received information or data to the processor 1100 through a data signal DQ and a data strobe signal DQS.

In an embodiment, the data buffer circuit 2250 may include a plurality of data buffers NVM. Each of the data buffers NVM may exchange the data signal DQ and the data strobe signal DQS with the processor 1100. Alternatively, each of the data buffers NVM may exchange a signal with the device controller 2210. In an embodiment, each of the data buffers NVM may operate according to control of the device controller 2210.

In an embodiment, the nonvolatile memory module 2220 may include an SRAM having a structure enhanced for the interface protocol with the processor 1100. That is, the processor 1100 may provide the nonvolatile memory modules 2200 and 1201 with a command, an address, and data, for accessing the nonvolatile memory device 2230, through a RAM 2211 which is separated by a bank group unit or a bank unit.

Figure 47:
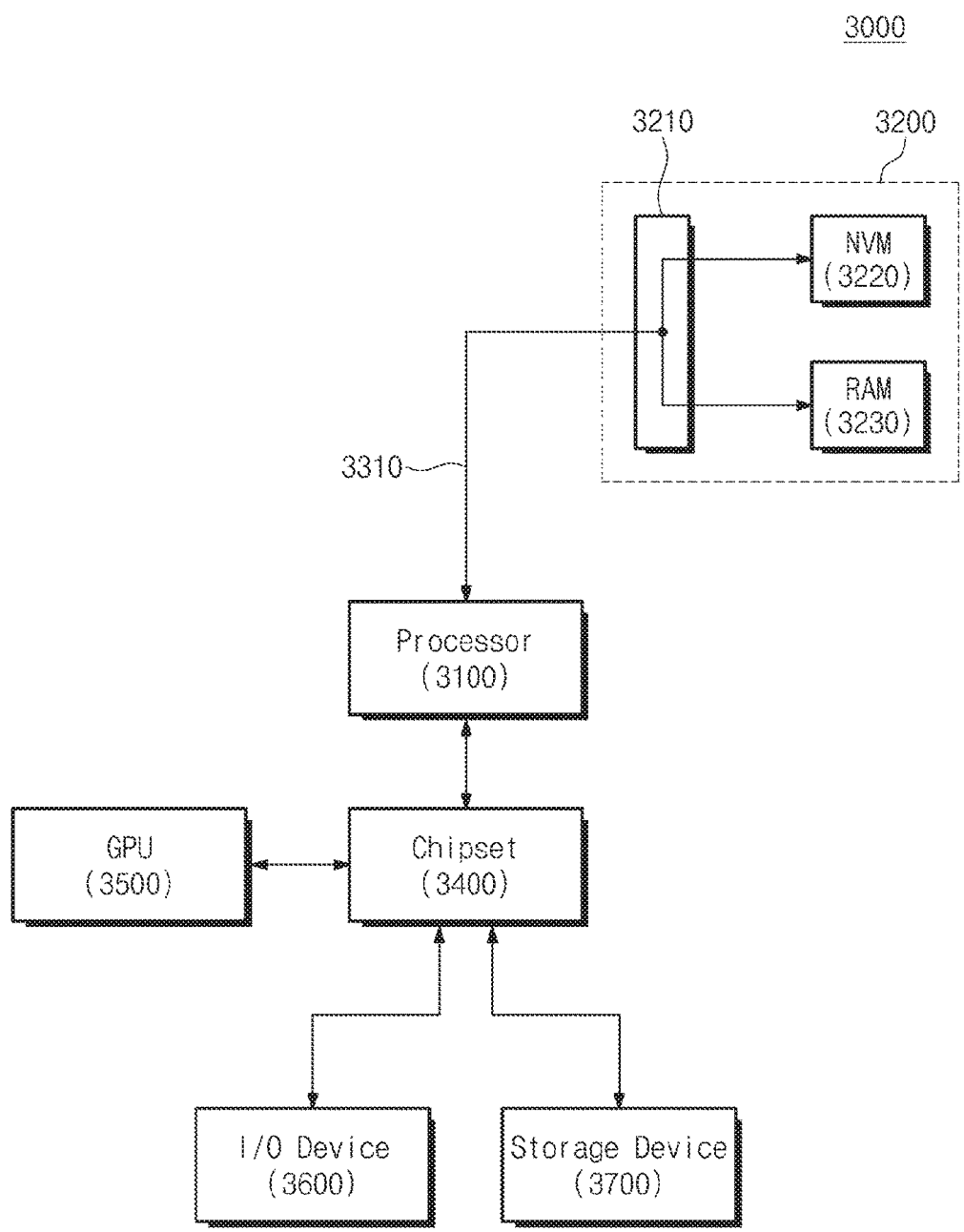
FIG. 47 is a block diagram illustrating another example of a computing system to which a nonvolatile memory module according to the inventive concept is applied.

FIG. 47 is a block diagram illustrating another example of a computing system to which a nonvolatile memory module according to the inventive concept is applied. For descriptive convenience, a detailed description about above-described components may be omitted. Referring to FIG. 47, a computing system 3000 may include a processor 3100, a nonvolatile memory module 3200, a chipset 3400, a graphic processing unit (GPU) 3500, an input/output device 3600, and a storage device 3700. The processor 3100, the chipset 3400, the GPU 3500, the input/output device 3600, and the storage device 3700 are substantially the same as those of FIG. 44, and a detailed description thereof is thus omitted.

The nonvolatile memory module 3200 may be directly connected to the processor 3100. In an embodiment, the nonvolatile memory module 3200 may be of the form of a dual in-line memory module (DIMM) and may be mounted on a DIMM socket so as to communicate with the processor 3100.

The nonvolatile memory module 3200 may include a control circuit 3210, a nonvolatile memory device 3220, and a RAM device 3230. Unlike the nonvolatile memory modules 1200 and 2200 described with reference to FIGS. 44 to 46, the processor 3100 may respectively access the nonvolatile memory device 3220 and the RAM device 3230 of the nonvolatile memory module 3200. In detail, the control circuit 3210 may store received data in the nonvolatile memory device 3220 or the RAM device 3230 in response to control of the processor 3100. Alternatively, under control of the processor 3100, the control circuit 3210 may transmit data stored in the nonvolatile memory device 3220 to the processor 3100 or data stored in the RAM device 3230 to the processor 3100. That is, the processor 3100 may respectively recognize the nonvolatile memory device 3220 and the RAM device 3230 included in the nonvolatile memory module 3200. The processor 3100 may store data in the nonvolatile memory device 3220 of the nonvolatile memory module 3200 or may read data therefrom. Alternatively, the processor 3100 may store data in the RAM device 3230 or may read data therefrom.

In an embodiment, the processor 3100 may use the nonvolatile memory device 3220 of the nonvolatile memory module 3200 as a storage medium of the computing system 3000 and may use the RAM device 3230 of the nonvolatile memory module 3200 as a main memory of the computing system 3000. That is, the processor 3100 may selectively access the nonvolatile memory device or the RAM device included in a memory module which is mounted on a DIMM socket.

In an embodiment, the processor 3100 may communicate with the nonvolatile memory module 3200 through a DDR interface.

Figure 48:
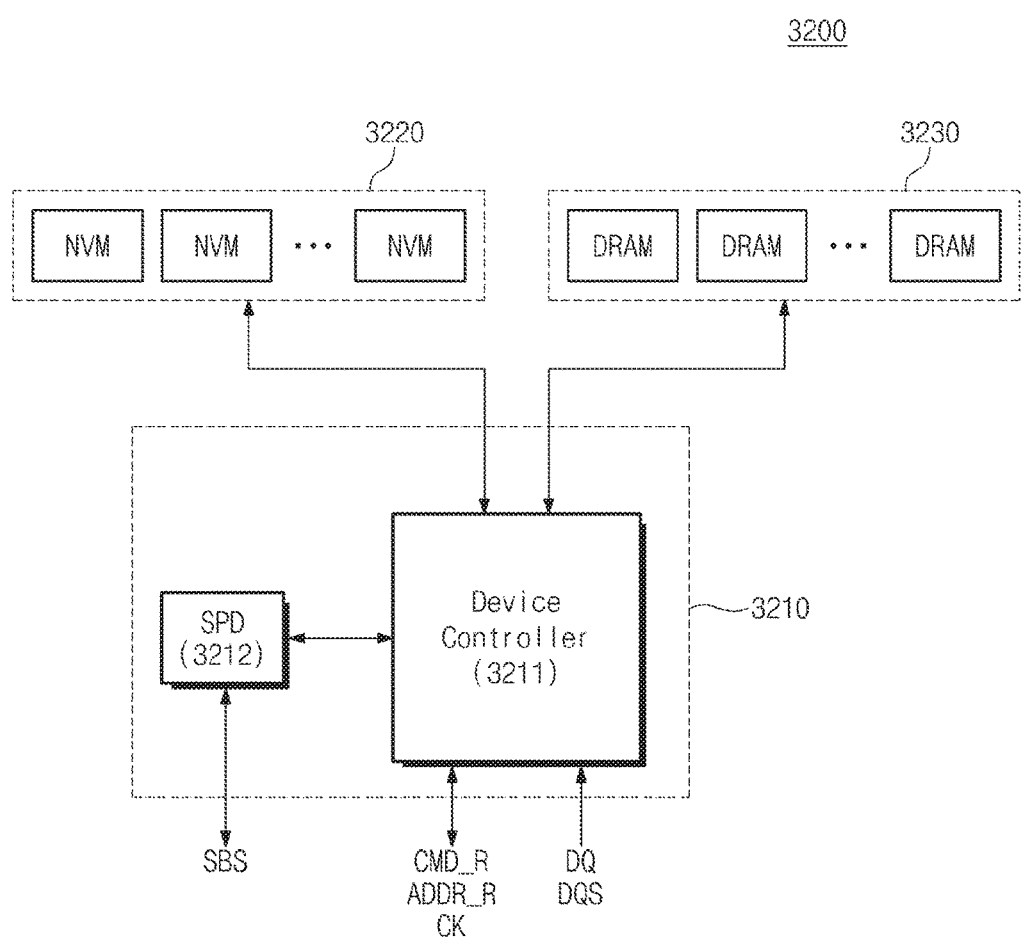
FIG. 48 is a block diagram illustrating a nonvolatile memory module illustrated in FIG. 47.

FIG. 48 is a block diagram illustrating a nonvolatile memory module illustrated in FIG. 47. Referring to FIG. 48, the nonvolatile memory module 3200 may include a control circuit 3210, a nonvolatile memory device 3220, and a RAM device 3220. In an embodiment, the nonvolatile memory device 3220 may include a plurality of nonvolatile memories, and the RAM device 3230 may include a plurality of DRAMs. In an embodiment, the nonvolatile memories may be used as storage of the computing system 3000 through the processor 3100. In an embodiment, each of the nonvolatile memories may include nonvolatile memory elements such as an electrically erasable and programmable ROM (EEPROM), a NAND flash memory, a phase-change RAM (PRAM), a resistive RAM (ReRAM), a ferroelectric RAM (FRAM), a spin-torque magnetic RAM (STT-MRAM), and the like.

The DRAMs may be used as a main memory of the computing system 3000 through the processor 3100. In an embodiment, the RAM device 3230 may include random access memory elements such as a DRAM, an SRAM, an SDRAM, a PRAM, an ReRAM, a FRAM, an MRAM, and the like.

The control circuit 3210 may include a device controller 3211 and a SPD chip 3212. The device controller 3211 may receive a command CMD, an address ADDR, and a clock CK from the processor 3100. The device controller 3211 may selectively store data, received through the data signal DQ and the data strobe signal DQS, in the nonvolatile memory device 3220 or the RAM device 3230 in response to signals received from the processor 3100. Alternatively, the device controller 3211 may selectively transfer data, stored in the nonvolatile memory device 3220 or the RAM device 3230, to the processor 3100 through the data signal DQ and the data strobe signal DQS in response to signals received from the processor 3100.

In an embodiment, the processor 3100 may selectively access the nonvolatile memory device 3220 or the RAM device 3230 through a command CMD, an address ADDR, or a separate signal or separate information. That is, the processor 3100 may selectively access the nonvolatile memory device 3220 or the RAM device 3230 included in the nonvolatile memory module 3200. In an embodiment, the device controller 3211 may cumulate sub-data based on an operating method described with reference to FIGS. 1 to 47 and may program the cumulated sub-data at the nonvolatile memory device 3220 in response to a command of the processor 3100.

Figure 49:
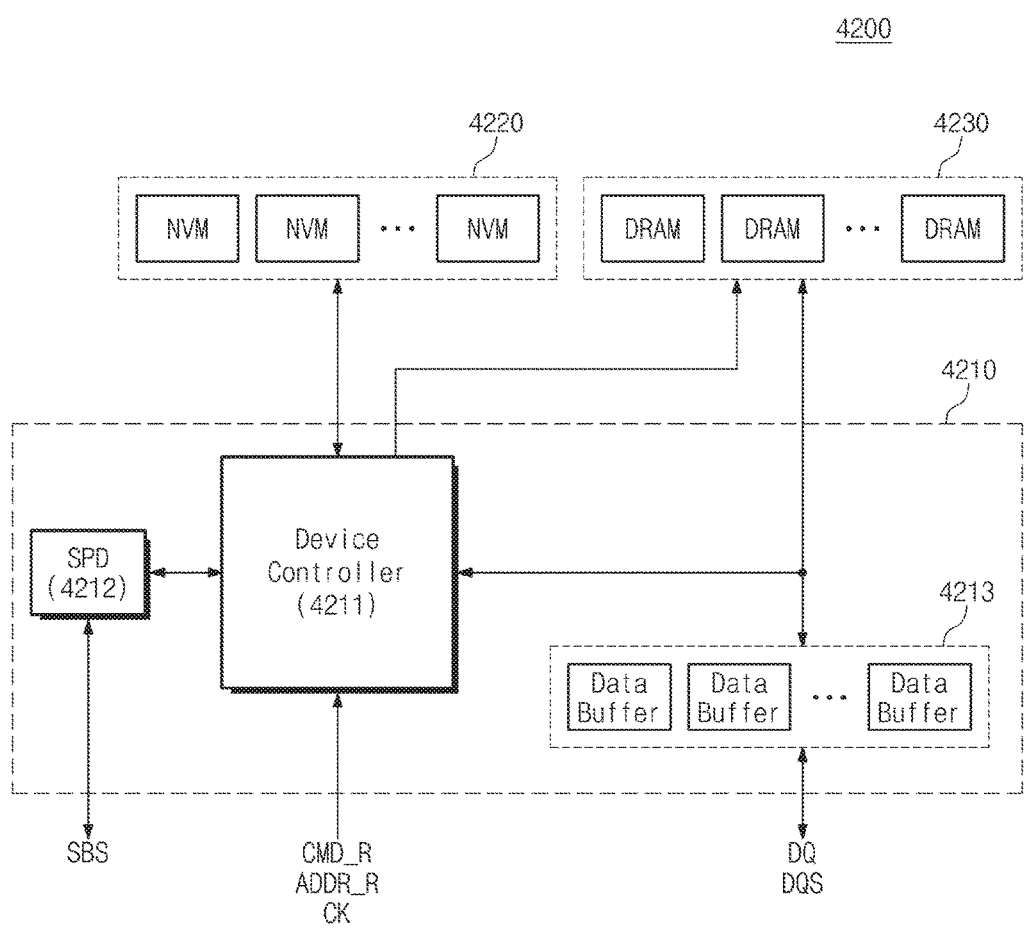
FIG. 49 is a block diagram illustrating a nonvolatile memory module illustrated in FIG. 47.

FIG. 49 is a block diagram illustrating a nonvolatile memory module illustrated in FIG. 47. In an embodiment, a nonvolatile memory module 4200 illustrated in FIG. 49 may be of the form of a dual in-line memory module (DIMM) and may be mounted on a DIMM socket so as to communicate with the processor 3100.

Referring to FIGS. 47 and 49, the nonvolatile memory module 4200 may include a control circuit 4210, a nonvolatile memory device 4220, and a RAM device 4230. The control circuit 4210 may include a device controller 4211, an SPD 4212, and a data buffer circuit 4213.

The device controller 4211 may receive a command CMD, an address ADDR, and a clock CK from the processor 3100. The device controller 4211 may control the nonvolatile memory device 4220 or the RAM device 4230 in response to received signals. The processor 3100 may selectively access the nonvolatile memory device 4220 or the RAM device 4230. The device controller 4231 may control the nonvolatile memory device 4220 or the RAM device 4230 under control of the processor 3100.

The data buffer circuit 4213 may receive the data signal DQ and the data strobe signal DQS from the processor 3100 and may provide the received signals to the device controller 4211 and the RAM device 4230. Alternatively, the data buffer circuit 4213 may provide data, received from the device controller 4211 or the RAM device 4230, to the processor 3100 through the data signal DQ and the data strobe signal DQS.

In an embodiment, in the case where the processor 3100 stores data in the nonvolatile memory device 4220, data received through the data signal DQ and the data strobe signal DQS may be provided to the device controller 4211, and the device controller 4211 may process the received data and may provide the processed data to the nonvolatile memory device 4220. Alternatively, in the case where the processor 3100 reads data stored in the nonvolatile memory device 4220, the data buffer circuit 4213 may provide data provided from the device controller 4211 to the processor 4100 through the data signal DQ and the data strobe signal DQS. In the case where the processor 3100 stores data in the RAM device 4230, data provided to the data buffer circuit 4213 may be provided to the RAM device 4230, and the device 4231 may transfer received command CMD, addresses ADDR, and clock CK to the RAM device 4230. Alternatively, when the processor 3100 reads data stored in the RAM device 4230, the device controller 4211 may transfer the received command CMD, addresses ADDR, and clock CK to the RAM device 4230, and the RAM device 4230 may provide data to the data buffer circuit 4213 in response to the transferred signals. At this time, the data buffer circuit 4213 may provide data to the processor 3100 through the data signal DQ and the data strobe signal DQS. In an embodiment, the device controller 3211 may cumulate sub-data in a RAM (not shown) based on an operating method described with reference to FIG. 1 and may program the cumulated sub-data at the nonvolatile memory device 4220 in response to a command of the processor 3100.

Figure 50:
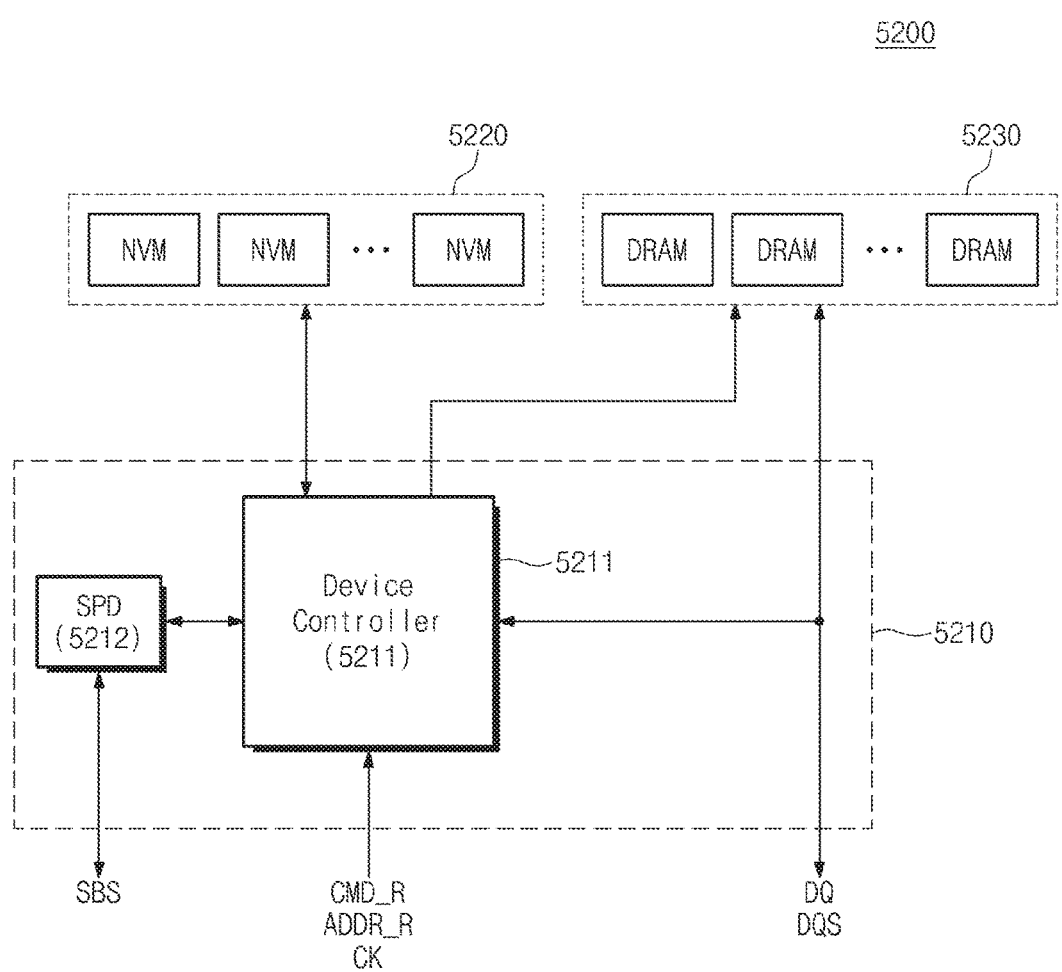
FIG. 50 is a block diagram illustrating a nonvolatile memory module illustrated in FIG. 47.

FIG. 50 is a block diagram illustrating a nonvolatile memory module illustrated in FIG. 47. Referring to FIG. 50, the nonvolatile memory module 5200 may include a control circuit 5210, a nonvolatile memory device 5220, and a RAM device 5230. The control circuit 5210 may include a device controller 5211 and a SPD chip 5212. The nonvolatile memory module 5200 may operate to be similar to the nonvolatile memory module 4200 of FIG. 49. However, the nonvolatile memory module 5200 may not include the data buffer circuit 4213 unlike the nonvolatile memory module 4200 of FIG. 49. That is, the nonvolatile memory module 5200 of FIG. 50 may directly provide data, received from the processor 3100 through the data signal DQ and the data strobe signal DQS, to the device controller 5211 or the RAM device 5230. Alternatively, data from the device controller 5211 of the nonvolatile memory module 5200 of FIG. 50 or data from the RAM device 5230 thereof may be directly provided to the processor 3100 through the data signal DQ and the data strobe signal DQS.

In an embodiment, the nonvolatile memory module 4200 of FIG. 49 may be a memory module of a Load-Reduced DIMM (LRDIMM) shape, and the nonvolatile memory module 5200 of FIG. 50 may be a memory module of a Registered DIMM (RDIMM) shape.

In an embodiment, the device controller 5211 may include a RAM which has a configuration and an arrangement described with reference to FIGS. 1 to 8.

Figure 51:
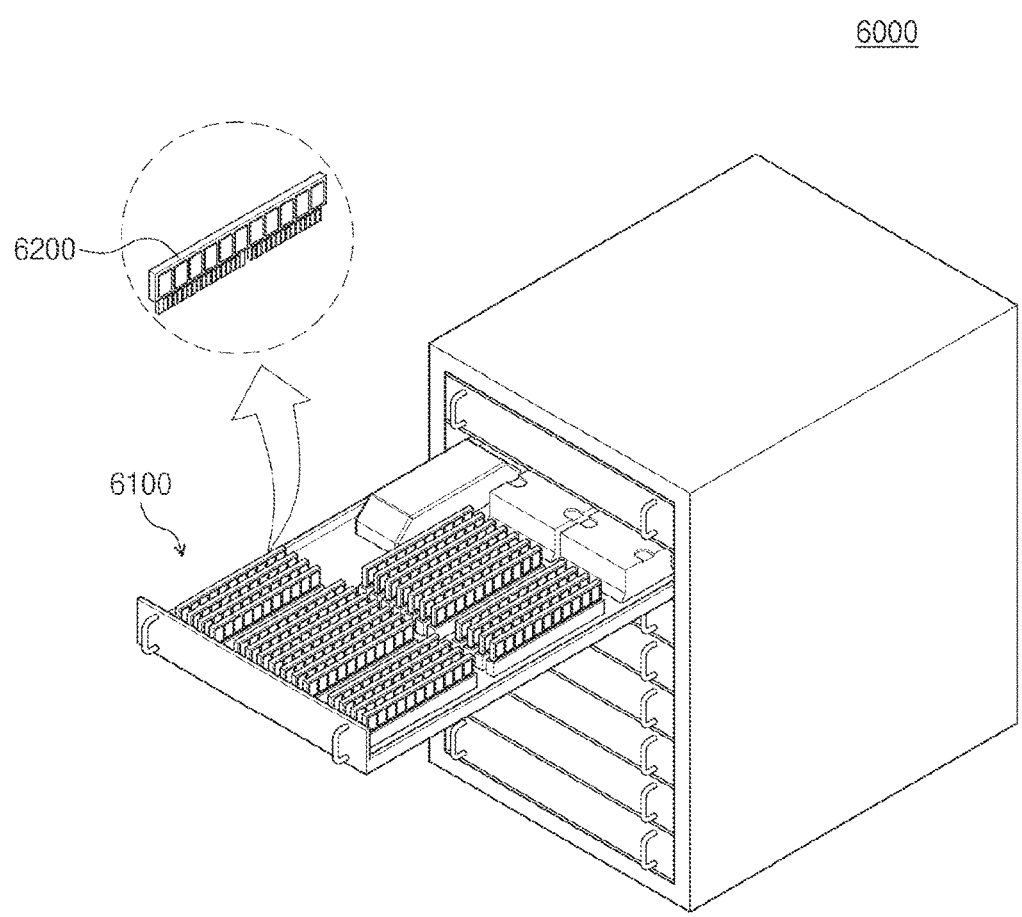
FIG. 51 is a diagram illustrating a server system to which a nonvolatile memory system according to an embodiment of the inventive concept is applied.

FIG. 51 is a diagram illustrating a server system to which a nonvolatile memory system according to an embodiment of the inventive concept is applied. Referring to FIG. 51, a server system 6000 may include a plurality of server racks 6100. Each of the server racks 6100 may include a plurality of nonvolatile memory modules 6200. The nonvolatile memory modules 6200 may be directly connected with processors respectively included in the server racks 6100. For example, the nonvolatile memory modules 6200 may have the form of a dual in-line memory module and may be mounted on a DIMM socket electrically connected with a processor so as to communicate with the processor 1100. In an embodiment, the nonvolatile memory modules 6200 may be used as storage of the server system 6000.

A nonvolatile memory and/or a device controller according to the inventive concept may be packaged according to any of a variety of different packaging technologies. Examples of such packaging technologies may include the following: package on package (PoP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), small outline (SOIC), shrink small outline package (SSOP), thin small outline (TSOP), thin quad flatpack (TQFP), system in package (SIP), multi-chip package (MCP), wafer-level fabricated package (WFP), and wafer-level processed stack package (WSP).

While the inventive concept has been described with reference to exemplary embodiments, it will be apparent to those skilled in the art that various changes and modifications may be made without departing from the spirit and scope of the inventive concept. Therefore, it should be understood that the above embodiments are not limiting, but illustrative.

What is claimed is:

1. A nonvolatile memory module comprising:
at least one nonvolatile memory; and
a device controller including a random access memory (RAM) configured to store data exchanged between a host and the at least one nonvolatile memory, and a dual in-line memory module (DIMM) controller configured to control data exchanged between the RAM and the at least one nonvolatile memory,
wherein an allocation of an access area for an access to the RAM is performed during a write transaction in which the data is stored in the RAM, and the allocation of the access area is released by the host when the host reads the data stored in the RAM and is released by the DIMM controller when the DIMM controller reads the data stored in the RAM.

2. The nonvolatile memory module of claim 1, wherein during performing of a write operation on the nonvolatile memory module, the access area at which the data is to be stored when storing the data in the RAM is allocated by the host, and the DIMM controller is configured to release the allocation for the allocated access area at which the data is stored in the RAM when reading the data stored in the RAM.

3. The nonvolatile memory module of claim 1, wherein during performing of a read operation on the nonvolatile memory module, the DIMM controller is configured to allocate the access area in the RAM at which the data is to be stored when storing the data in the RAM, and the allocation for the allocated access area in the RAM at which the data is stored is released by the host when reading the data stored in the RAM.

4. The nonvolatile memory module of claim 1, wherein the DIMM controller comprises an area manager configured to generate status information indicating whether the DIMM controller has read the data stored in the RAM.

5. The nonvolatile memory module of claim 4, wherein the RAM comprises a status area configured to store the status information.

6. The nonvolatile memory module of claim 1, wherein an overwrite operation on the allocated access area is inhibited, and an overwrite operation on a released access area is permitted.

7. The nonvolatile memory module of claim 1, wherein the at least one nonvolatile memory communicates with the host through a dual data rate (DDR) interface.

8. The nonvolatile memory module of claim 1, wherein the at least one nonvolatile memory comprises a dual in-line memory module (DIMM).

9. The nonvolatile memory module of claim 1, wherein the at least one nonvolatile memory comprises a three-dimensional memory array.

10. A storage system, including:
a host; and
a nonvolatile memory module comprising at least one nonvolatile memory, a RAM configured to store data exchanged between the host and the at least one nonvolatile memory, and a device controller comprising a DIMM controller configured to control data exchanged between the RAM and the at least one nonvolatile memory, wherein an allocation of an access area for an access to the RAM is performed during a write transaction in which the data is stored in the RAM, and the allocation of the access area is released by the host when the host reads the data stored in the RAM and is released by the DIMM controller when the DIMM controller reads the data stored in the RAM.

11. The storage system of claim 10, wherein during performing of a write operation on the nonvolatile memory module, the host is configured to allocate the access area at which the data is to be stored in the RAM when storing the data in the RAM, and the DIMM controller is configured to release the allocation for the allocated access area at which the data is stored in the RAM when reading the data stored in the RAM.

12. The storage system of claim 11, wherein the DIMM controller comprises a first area manager configured to generate status information indicating whether the DIMM controller reads the data stored in the RAM.

13. The storage system of claim 10, wherein during performing of a read operation on the nonvolatile memory module, the DIMM controller is configured to allocate the access area at which the data is to be stored in the RAM when storing the data in the RAM, and the host is configured to release the allocation for the allocated access area at which the data is stored in the RAM when reading the data stored in the RAM.

14. The storage system of claim 13, wherein the host comprises a second area manager configured to generate status information indicating whether the host reads the data stored in the RAM.

15. The storage system of claim 10, wherein an overwrite operation on the allocated access area is inhibited, and an overwrite operation on a released access area is permitted.

16. A nonvolatile memory module to comprising:
a plurality of nonvolatile memories comprising dual in-line memory modules (DIMM); and
a device controller comprising
a random access memory (RAM) configured to store data exchanged between a host and the plurality of nonvolatile memories, and
a DIMM controller configured to control data exchanged between the RAM and the plurality of nonvolatile memories, wherein an allocation of an access area for an access to the RAM is performed during a write transaction in which the data is stored in the RAM, and the allocation of the access area is released by the host when the host reads the data stored in the RAM and is released by the DIMM controller when the DIMM controller reads the data stored in the RAM.

17. The nonvolatile memory module of claim 16, wherein during performing of a write operation on the nonvolatile memory module, the access area is at which the data is to be stored when storing the data in the RAM is allocated by the host, and the DIMM controller is configured to release the allocation for the allocated access area at which the data is stored in the RAM when reading the data stored in the RAM.

18. The nonvolatile memory module of claim 16, wherein during performing of a read operation on the nonvolatile memory module, the DIMM controller is configured to allocate the access area in the RAM at which the data is to be stored when storing the data in the RAM, and the allocation for the allocated access area in the RAM at which the data is stored is released by the host when reading the data stored in the RAM.

19. The nonvolatile memory module of claim 16, wherein the DIMM controller comprises an area manager configured to generate status information indicating whether the DIMM controller reads the data stored in the RAM.

20. The nonvolatile memory module of claim 16, wherein an overwrite operation on the allocated access area is inhibited, and an overwrite operation on a released access area is permitted.

* * * * *